US012625669B2

(12) United States Patent
Lee et al.

(10) Patent No.: US 12,625,669 B2
(45) Date of Patent: May 12, 2026

(54) ELECTRONIC DEVICE, METHOD, AND NON-TRANSITORY COMPUTER READABLE STORAGE MEDIUM FOR CONTROL OF DISPLAY ACCORDING TO FRAME INTERVAL

(71) Applicant: Samsung Electronics Co., Ltd., Suwon-si (KR)

(72) Inventors: Jaesung Lee, Suwon-si (KR); Kyounghwan Kwon, Suwon-si (KR); Siwoo Kim, Suwon-si (KR); Jongkon Bae, Suwon-si (KR); Byungduk Yang, Suwon-si (KR); Woonyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/933,035

(22) Filed: Oct. 31, 2024

(65) Prior Publication Data

US 2025/0199749 A1 Jun. 19, 2025

Related U.S. Application Data

(63) Continuation of application No. PCT/KR2024/014067, filed on Sep. 13, 2024.

(30) Foreign Application Priority Data

Dec. 13, 2023 (KR) ........................ 10-2023-0181302
Feb. 6, 2024 (KR) ........................ 10-2024-0018292

(51) Int. Cl.
*G06F 3/147* (2006.01)

(52) U.S. Cl.
CPC ................................... *G06F 3/147* (2013.01)

(58) Field of Classification Search
CPC .............................................. G09G 2320/0233
See application file for complete search history.

(56) References Cited

U.S. PATENT DOCUMENTS 6,836,265 B1 * 12/2004 Lee ...................... G09G 3/3677
345/55
7,710,376 B2 5/2010 Edo et al.
(Continued)

FOREIGN PATENT DOCUMENTS

JP 2016-123122 A 7/2016
JP 2023-113421 A 8/2023
(Continued)

OTHER PUBLICATIONS

International Search Report dated Jan. 6, 2025, issued in International Application No. PCT/KR2024/014067.

*Primary Examiner* — Nan-Ying Yang
(74) *Attorney, Agent, or Firm* — Jefferson IP Law, LLP

(57) ABSTRACT

An electronic device is described. The electronic device incudes memory comprising one or more storage mediums and storing instructions. The electronic device incudes at least one processor comprising processing circuitry. The electronic device incudes a display including display driving circuitry and a display panel. The instructions, when executed by the at least one processor individually or collectively, cause the electronic device to change, from a first frame interval to a second frame interval longer than the first frame interval, a frame interval indicating a shortest time interval between image transmissions from the at least one processor to the display driving circuitry, the image transmissions being to be executed for changing an image displayed on the display panel. The instructions, when executed by the at least one processor individually or collectively, cause the electronic device to control the display driving circuitry to perform display of a first image on (Continued)

the display panel by executing a first image transmission from the at least one processor to the display driving circuitry. The instructions, when executed by the at least one processor individually or collectively, cause the electronic device to control the display driving circuitry to complete, before a start timing of a second image transmission from the at least one processor to the display driving circuitry to be executed according to the second frame interval to perform display of a second image, one or more scans for repeated display of the first image performed on the display panel based on the change from the first frame interval to the second frame interval.

20 Claims, 16 Drawing Sheets

(56) References Cited

U.S. PATENT DOCUMENTS

| | | | |
|---|---|---|---|
| 8,542,221 | B1 | 9/2013 | Wyatt et al. |
| 10,600,379 | B2 | 3/2020 | Nambi et al. |
| 11,842,670 | B2 | 12/2023 | Lee et al. |
| 11,854,475 | B2 | 12/2023 | Chun |
| 11,875,725 | B2 | 1/2024 | Cho et al. |
| 12,046,193 | B2 | 7/2024 | Yang et al. |
| 2011/0157202 | A1* | 6/2011 | Kwa ...................... G09G 5/395 |
| | | | 345/545 |
| 2015/0355762 | A1* | 12/2015 | Tripathi ................... H04N 3/24 |
| | | | 345/173 |
| 2019/0045278 | A1* | 2/2019 | Ansari ...................... G09G 5/12 |
| 2021/0248980 | A1* | 8/2021 | Lee ........................... G09G 5/18 |
| 2021/0304681 | A1 | 9/2021 | Noh et al. |
| 2023/0020872 | A1 | 1/2023 | Lee et al. |
| 2023/0123776 | A1* | 4/2023 | Lee ........................... G09G 5/39 |
| | | | 345/204 |
| 2024/0038155 | A1 | 2/2024 | Chung et al. |

FOREIGN PATENT DOCUMENTS

| | | |
|---|---|---|
| KR | 10-0783238 B1 | 12/2007 |
| KR | 10-1774127 B1 | 9/2017 |
| KR | 10-2019-0023632 A | 3/2019 |
| KR | 10-2020-0075945 A | 6/2020 |
| KR | 10-2021-0101679 A | 8/2021 |
| KR | 10-2021-0101968 A | 8/2021 |
| KR | 10-2021-0158110 A | 12/2021 |
| KR | 10-2022-0025449 A | 3/2022 |
| KR | 10-2022-0041509 A | 4/2022 |
| KR | 10-2022-0116873 A | 8/2022 |
| KR | 10-2023-0061837 A | 5/2023 |
| KR | 10-2023-0151655 A | 11/2023 |
| KR | 10-2024-0112164 A | 7/2024 |
| KR | 10-2765379 B1 | 2/2025 |

* cited by examiner

1600

1

ELECTRONIC DEVICE, METHOD, AND NON-TRANSITORY COMPUTER READABLE STORAGE MEDIUM FOR CONTROL OF DISPLAY ACCORDING TO FRAME INTERVAL

CROSS-REFERENCE TO RELATED APPLICATION(S)

This application is a continuation application, claiming priority under § 365 (c), of an International application No. PCT/KR2024/014067, filed on Sep. 13, 2024, which is based on and claims the benefit of a Korean patent application number 10-2023-0181302, filed on Dec. 13, 2023, in the Korean Intellectual Property Office, and of a Korean patent application number 10-2024-0018292, filed on Feb. 6, 2024, in the Korean Intellectual Property Office, the disclosure of each of which is incorporated by reference herein in its entirety.

TECHNICAL FIELD

The disclosure relates to an electronic device, a method, and a non-transitory computer readable storage medium for control of a display according to a frame interval.

BACKGROUND ART

An electronic device may include a display and a processor. The display may be used to display an image generated (or obtained) by the processor. For example, image transmission from the processor to the display may be performed to display the image. For example, the image transmission may be performed according to a refresh rate.

The above information is presented as background information only to assist with an understanding of the disclosure. No determination has been made, and no assertion is made, as to whether any of the above might be applicable as prior art with regard to the disclosure.

DISCLOSURE

Technical Solution

An electronic device is described. The electronic device may comprise memory comprising one or more storage mediums and storing instructions. The electronic device may comprise at least one processor comprising processing circuitry. The electronic device may comprise a display including display driving circuitry and a display panel. The instructions, when executed by the at least one processor individually or collectively, may cause the electronic device to change, from a first frame interval to a second frame interval longer than the first frame interval, a frame interval indicating a shortest time interval between image transmissions from the at least one processor to the display driving circuitry, the image transmissions being to be executed for changing an image displayed on the display panel. The instructions, when executed by the at least one processor individually or collectively, may cause the electronic device to control the display driving circuitry to perform display of a first image on the display panel by executing a first image transmission from the at least one processor to the display driving circuitry. The instructions, when executed by the at least one processor individually or collectively, may cause the electronic device to control the display driving circuitry to complete, before a start timing of a second image transmission from the at least one processor to the display driving circuitry to be executed according to the second frame interval to perform display of a second image, one or more scans for repeated display of the first image performed on the display panel based on the change from the first frame interval to the second frame interval.

A method is described. The method may be executed in an electronic device comprising at least one processor and a display including display driving circuitry and a display panel. The method may comprise changing, from a first frame interval to a second frame interval longer than the first frame interval, a frame interval indicating a shortest time interval between image transmissions from the at least one processor to the display driving circuitry, the image transmissions being to be executed for changing an image displayed on the display panel. The method may comprise controlling the display driving circuitry to perform display of a first image on the display panel by executing a first image transmission from the at least one processor to the display driving circuitry. The method may comprise controlling the display driving circuitry to complete, before a start timing of a second image transmission from the at least one processor to the display driving circuitry to be executed according to the second frame interval to perform display of a second image, one or more scans for repeated display of the first image performed on the display panel based on the change from the first frame interval to the second frame interval.

A non-transitory computer readable storage medium is described. The non-transitory computer readable storage medium may store one or more programs. The one or more programs may comprise instructions which, when executed by an electronic device including at least one processor and a display including display driving circuitry and a display panel, cause the electronic device to change, from a first frame interval to a second frame interval longer than the first frame interval, a frame interval indicating a shortest time interval between image transmissions from the at least one processor to the display driving circuitry, the image transmissions being to be executed for changing an image displayed on the display panel. The one or more programs may comprise instructions which, when executed by the electronic device, cause the electronic device to control the display driving circuitry to perform display of a first image on the display panel by executing a first image transmission from the at least one processor to the display driving circuitry. The one or more programs may comprise instructions which, when executed by the electronic device, cause the electronic device to control the display driving circuitry to perform display of a first image on the display panel by executing a first image transmission from the at least one processor to the display driving circuitry.

An electronic device is described. The electronic device may comprise memory comprising one or more storage mediums and storing instructions. The electronic device may comprise at least one processor comprising processing circuitry. The electronic device may comprise a display including display driving circuitry and a display panel. The instructions, when executed by the at least one processor individually or collectively, may cause the electronic device to, while displaying an image on the display panel set according to a first brightness level, generate a command to change a brightness level of the display panel to a second brightness level. The instructions, when executed by the at least one processor individually or collectively, may cause the electronic device to, based on the command, allocate, for controlling the display driving circuitry to gradually change the brightness level from the first brightness to the second brightness level using a plurality of time intervals within a brightness change period, the plurality of time intervals such that a first frame interval does not includes one or more blank periods not used for the gradual change and a second frame interval includes the one or more blank periods, the first frame interval corresponding to a first value divided by a value corresponding to length of each of the plurality of time intervals, the second frame interval corresponding to a second value not divided by the value. The first frame interval and the second frame interval may indicate a shortest time interval between image transmissions, from the at least one processor to the display driving circuitry, executed to change an image displayed on the display panel.

A method is described. The method may be executed in an electronic device comprising at least one processor and a display including display driving circuitry and a display panel. The method may comprise, while displaying an image on the display panel set according to a first brightness level, generating a command to change a brightness level of the display panel to a second brightness level. The method may comprise, based on the command, allocating, for controlling the display driving circuitry to gradually change the brightness level from the first brightness to the second brightness level using a plurality of time intervals within a brightness change period, the plurality of time intervals such that a first frame interval does not includes one or more blank periods not used for the gradual change and a second frame interval includes the one or more blank periods, the first frame interval corresponding to a first value divided by a value corresponding to length of each of the plurality of time intervals, the second frame interval corresponding to a second value not divided by the value. The first frame interval and the second frame interval may indicate a shortest time interval between image transmissions, from the at least one processor to the display driving circuitry, executed to change an image displayed on the display panel.

A non-transitory computer readable storage medium is described. The non-transitory computer readable storage medium may store one or more programs. The one or more programs may comprise instructions which, when executed by an electronic device including at least one processor and a display including display driving circuitry and a display panel, cause the electronic device to, while displaying an image on the display panel set according to a first brightness level, generate a command to change a brightness level of the display panel to a second brightness level. The one or more programs may comprise instructions which, when executed by the electronic device, cause the electronic device to, based on the command, allocate, for controlling the display driving circuitry to gradually change the brightness level from the first brightness to the second brightness level using a plurality of time intervals within a brightness change period, the plurality of time intervals such that a first frame interval does not includes one or more blank periods not used for the gradual change and a second frame interval includes the one or more blank periods, the first frame interval corresponding to a first value divided by a value corresponding to length of each of the plurality of time intervals, the second frame interval corresponding to a second value not divided by the value. The first frame interval and the second frame interval may indicate a shortest time interval between image transmissions, from the at least one processor to the display driving circuitry, executed to change an image displayed on the display panel.

MODE FOR INVENTION

Figure 1:
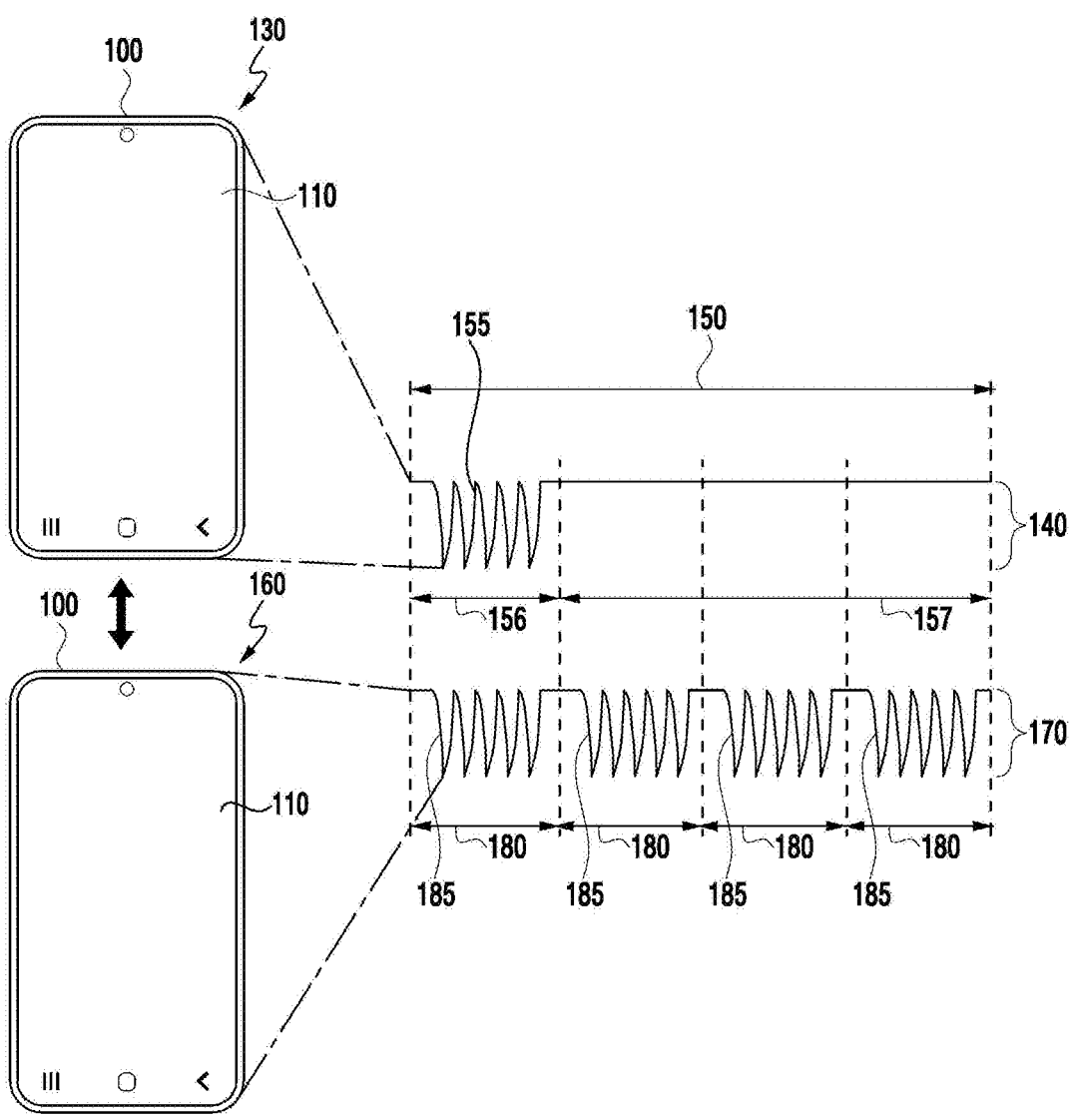
FIG. 1 illustrates an exemplary electronic device that adaptively changes a refresh rate to display an image on a display panel.

FIG. 1 illustrates an exemplary electronic device that adaptively changes a refresh rate to display an image on a display panel.

Referring to FIG. 1, an electronic device 100 may include a display panel 110. For example, the display panel 110 may be used to display an image. For example, the electronic device 100 may display the image on the display panel 110 based on a refresh rate.

The refresh rate for the image may indicate a frequency targeted for displaying the image when obtaining or rendering the image, or the number of times per second to refresh the image on the display panel 110. For example, the refresh rate for the image may correspond to a period identified (or assigned, or designated, or scheduled) for the image when the image is obtained or rendered.

The electronic device 100 may adaptively change the refresh rate. For example, the electronic device 100 may support a changeable refresh rate (e.g., a variable refresh rate (VRR)). For example, the electronic device 100 may lower the refresh rate to reduce power consumed by displaying an image on the display panel 110. For example, lowering the refresh rate may be executed based on identifying that the display of the image is maintained. For example, lowering the refresh rate may be executed, based on identifying a display of a still image. For example, the electronic device 100 may raise the refresh rate to enhance a quality of an image displayed on the display panel 110. For example, raising the refresh rate may be performed based on identifying a display of a dynamic image (or a moving image) (or a video). For example, raising the refresh rate may be performed based on identifying an event, such as receiving a user input.

The electronic device 100 may display an image based on a first refresh rate, as shown in a state 130. For example, the electronic device 100 may display an image based on a second refresh rate higher than the first refresh rate, as shown in a state 160. For example, the electronic device 100 may change the state 130 to the state 160 to enhance a quality of an image displayed on the display panel 110. For example, the electronic device 100 may change the state 160 to the state 130 to reduce power consumed by displaying an image on the display panel 110.

The state 130 may reduce the power consumed by displaying an image on the display panel 110, but afterimage (or image sticking or image persistence) may be caused within the state 130. For example, the power consumed in the state 130 may be less than the power consumed in the state 160, but probability that the afterimage will be caused in the state 130 may be higher than probability that the afterimage will be caused in the state 160.

A chart 140 illustrates an example of displaying an image in the state 130. A horizontal axis of the chart 140 indicates time, and a vertical axis of the chart 140 indicates a state of a signal outputted from a source driver to display an image on the display panel 110. In the state 130, the electronic device 100 may display the image on the display panel 110 within a time period 150 corresponding to the first refresh rate for the image. In a condition that the first refresh rate is 30 hertz (Hz), the time period 150 may be 1/30 seconds(s). The time period 150 may include a partial time period 156 and a partial time period 157. The electronic device 100 may display the image on the display panel 110 within the time period 150, by outputting a signal 155 within the partial time period 156. The signal 155 may be outputted within the partial time period 156 and may not be outputted within the partial time period 157 in the time period 150.

A chart 170 illustrates an example of displaying an image within the state 160. A horizontal axis of the chart 170 indicates time, and a vertical axis of the chart 170 indicates a state of a signal outputted from a source driver to display an image on the display panel 110. In the state 160, the electronic device 100 may display the image on the display panel 110 within a time period 180 corresponding to the second refresh rate for the image. In a condition that the second refresh rate is 120 (Hz), the time period 180 may be 1/120 (s). The electronic device 100 may display the image on the display panel 110 within the time period 180, by outputting a signal 185 within the time period 180. A length of the time period 180 may correspond to the partial time period 156.

In contrast to the time period 180 for the second refresh rate, since the time period 150 for the first refresh rate includes the partial time period 157 in which the signal 155 is not outputted, the probability that the afterimage will be caused in the state 130 may be higher than the probability that the afterimage will be caused in the state 160. For example, the afterimage may be caused by hysteresis in a driving transistor for driving an emission diode (or organic emission diode) in the display panel 110. The hysteresis may be illustrated through FIG. 2.

Figure 2:
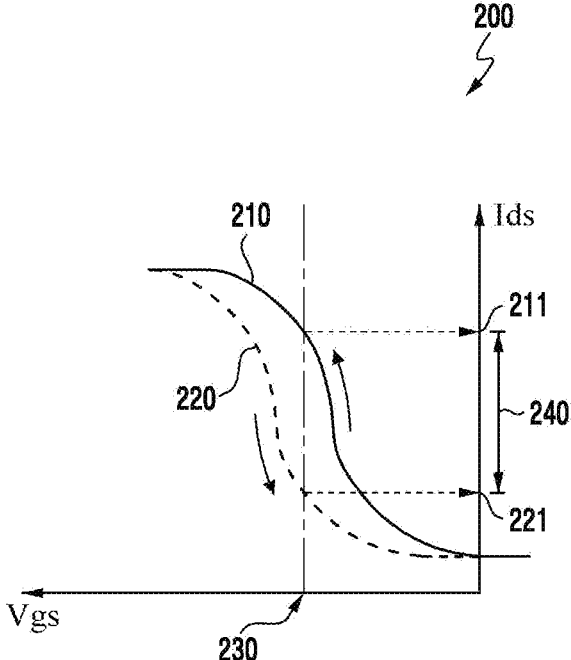
FIG. 2 is a chart illustrating hysteresis in a driving transistor.

FIG. 2 is a chart illustrating hysteresis in a driving transistor.

Referring to FIG. 2, a threshold voltage of the driving transistor may be shifted when an image of a first color (e.g., black) is changed to an image of a second color (e.g., white). For example, the shifting of the threshold voltage may cause a change in luminance provided from an organic light emitting diode driven through the driving transistor.

A chart 200 indicates the change. A horizontal axis of the chart 200 indicates a gate-source voltage (Vgs) of the driving transistor, and a vertical axis of chart 200 indicates a current applied to the organic light emitting diode (Ids) (or a current from a drain of the driving transistor to a source of the driving transistor). A line 210 in the chart 200 indicates a relationship between a gate-source voltage (Vgs) and a current (Ids) with respect to the image of the first color, and a line 220 in the chart 200 indicates a relationship between a gate-source voltage (Vgs) and a current (Ids) with respect to the image of the second color. As shown in the chart 200, the line 220 may be offset with respect to the line 210. A value 211 of the current (Ids) at the line 210 when the gate-source voltage (Vgs) is a value 230 may be different from a value 221 of the current (Ids) at the line 220 when the gate-source voltage (Vgs) is the value 230. A difference 240 between the value 211 and the value 221 may cause the afterimage.

Referring back to FIG. 1, the electronic device 100 may enhance a quality of an image displayed on the display panel 110 by changing the state 130 to the state 160. For example, the electronic device 100 may reduce power consumed while displaying an image on the display panel 110, by changing the state 160 to the state 130. When a difference between the first refresh rate and the second refresh rate is greater than or equal to a certain level, a direct change from the state 130 to the state 160 may enhance a quality of an image, but the direct change from the state 130 to the state 160 may cause flickering. When the difference between the first refresh rate and the second refresh rate is greater than or equal to the certain level, a direct change from the state 160 to the state 130 may reduce power consumption, but the direct change from the state 160 to the state 130 may cause flickering. The flickering is illustrated in FIG. 3.

Figure 3:
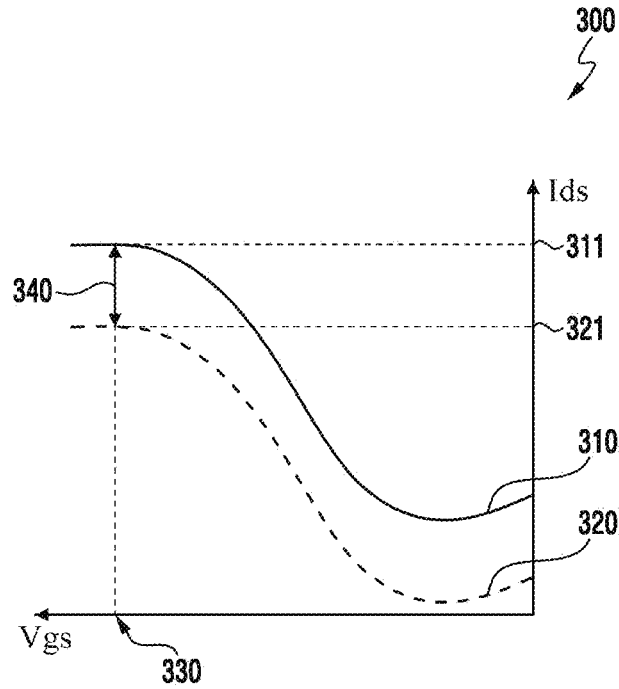
FIG. 3 is a chart illustrating a change in a current applied to an emission diode according to a change in a refresh rate.

FIG. 3 is a chart illustrating a change in a current applied to an emission diode according to a change in a refresh rate.

Referring to FIG. 3, a relationship between a gate-source voltage of the driving transistor and a current (e.g., a current from the drain of the driving transistor to the source of the driving transistor) applied to the light emitting diode (or the organic light emitting diode) may be changed according to a change in the refresh rate. The relationship, which is changed according to the refresh rate, may cause the flickering.

A chart 300 indicates the change in the relationship according to the change in the refresh rate. A horizontal axis of the chart 300 indicates a gate-source voltage (Vgs) of the driving transistor, and a vertical axis of chart 300 indicates a current (Ids) (e.g., the current from the drain of the driving transistor to the source of the driving transistor) applied to the organic light emitting diode. A line 310 in the chart 300 indicates a relationship between a gate-source voltage (Vgs) and a current (Ids) with respect to the first refresh rate, and a line 320 in the chart 300 indicates a relationship between a gate-source voltage (Vgs) and a current (Ids) with respect to the second refresh rate. As shown in the chart 300, the line 320 may be offset with respect to the line 310. A value 311 of the current (Ids) at the line 310 when the gate-source voltage (Vgs) is a value 330 may be different from a value 321 of the current (Ids) at the line 320 when the gate-source voltage (Vgs) is the value 330. When a difference 340 between the value 311 and the value 321 is greater than or equal to a certain level, a direct change from the state 130 to the state 160 and/or a direct change from the state 130 to the state 130 may cause the flickering.

Referring back to FIG. 1, the electronic device 100 may perform operations for reducing the afterimage and/or the flickering as illustrated below. For example, the electronic device 100 may include components for executing the operations. The components are illustrated in a description of FIG. 4.

Figure 4:
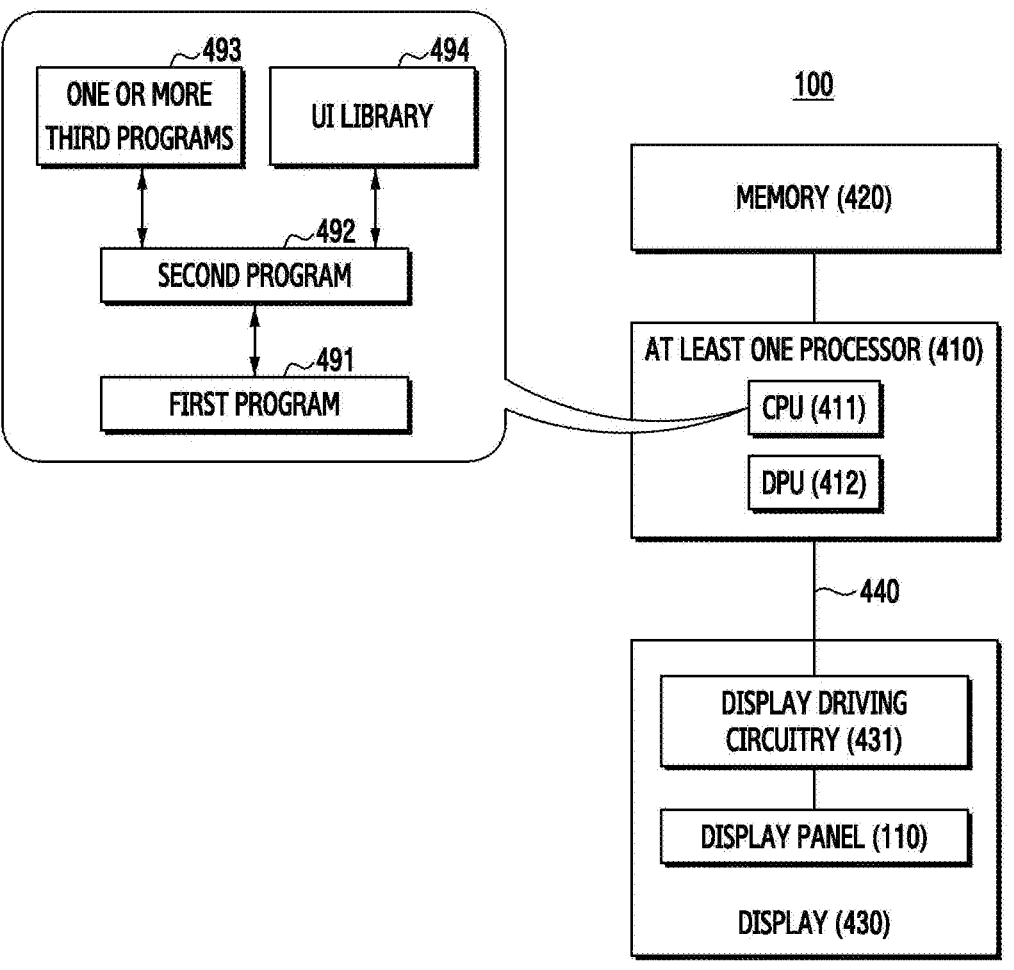
FIG. 4 is a simplified block diagram of an embodiment of an electronic device.

FIG. 4 is a simplified block diagram of an embodiment of an electronic device.

Referring to FIG. 4, an electronic device 100 may be one of various types of electronic devices, such as a laptop, smartphones (e.g., bar-type smartphone, foldable smartphone, or slidable (or rollable) smartphone) with various form factors, a tablet, a cellular phone, and other similar computing devices. Components, their relationships, and their functions shown in FIG. 4 are exemplary and do not limit implementations described or claimed in the disclosure. The electronic device 100 may be referred to as a mobile device, a user device, a multifunction device, a portable device, or a server.

The electronic device 100 may include at least one processor 410, memory 420, and a display 430. The components (e.g., the at least one processor 410, the memory 420, and the display 430) are merely exemplary. The electronic device 100 may include other components (e.g., power management integrated circuitry (PMIC) or rechargeable battery). For example, some components may be omitted from the electronic device 100. Similarly, two or more components may be integrated into one component.

The at least one processor 410 may be implemented with one or more integrated circuitry (IC) chips and may execute various data processes. The at least one processor 410 may include at least one electrical circuit and may individually or collectively distribute and process instructions (or program, data, and the like) stored in the memory 420. The at least one processor 410 may include a processor assembly including one or more processing circuits. The at least one processor 410 may include any operational processing circuitry to control performance and operations of one or more components (e.g., the memory 420 and/or the display 430) of the electronic device 100. For example, the at least one processor 410 (e.g., application processor (AP)) may be implemented with a system on chip (SoC) (e.g., one chip or one chip set). For example, the at least one processor 410 may be implemented with multiple cores (or multiple core circuits), multiple chips, or multiple chip sets. For example, the at least one processor 410 may include one or more processing circuitry configured to individually and/or collectively perform various functions of the disclosure. As a non-limiting example, the at least one processor 410 may include a first processor (e.g., including processing circuitry) included in a first chip and a second processor (e.g., including processing circuitry) included in a second chip different from the first chip.

The at least one processor 410 may include a central processing unit (CPU) 411 and a display processing unit (DPU) 412. The components (e.g., the CPU 411 and the DPU 412) of the at least one processor 410 are merely exemplary. The at least one processor 410 may further include other components (e.g., memory controller (or memory control circuit) for the memory 420 and a storage controller (or storage control circuit) for the memory 420).

One or more (e.g., the DPU 412) of the components of the at least one processor 410 may be omitted from the at least one processor 410.

The at least one processor 410 may cause other components of the electronic device 100 to perform various operations, by executing instructions stored in the memory 420. For example, the CPU 411 (or central processing circuitry 411) may be configured to control another component (e.g., the DPU 412) of the at least one processor 410, based on execution of instructions stored in the memory 420. For example, the DPU 412 (or display processing circuitry 412) may be configured to process an image obtained (or transmitted) from the CPU 411 in a format suitable for the display 430.

Figure 15:
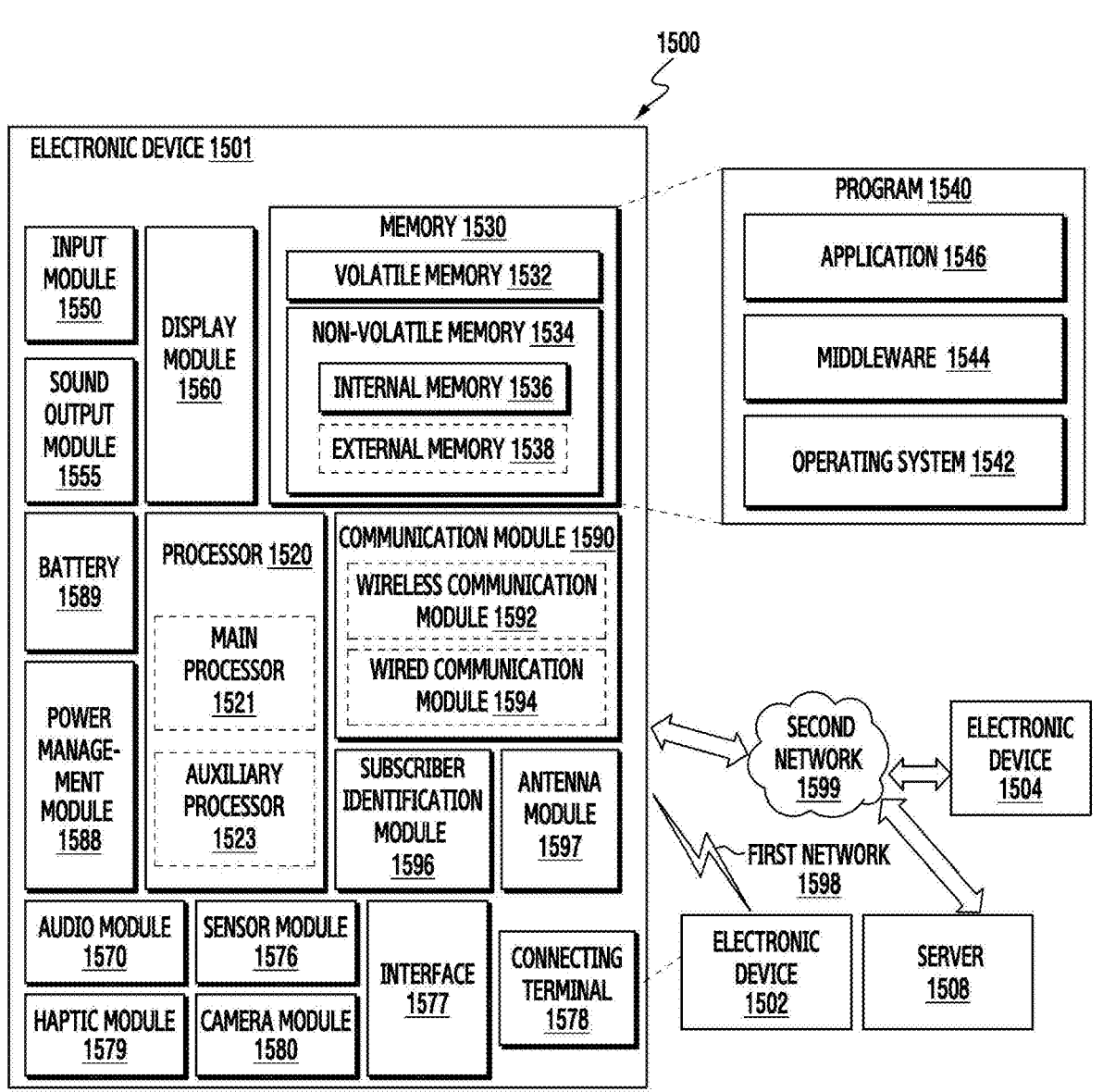
FIG. 15 is a block diagram of an electronic device in a network environment according to various embodiments.

The at least one processor 410 may include at least a portion of a processor 1520 of FIG. 15 or may correspond to at least a portion of the processor 1520 of FIG. 15.

The memory 420 may include one or more storage media (or one or more storage devices). For example, the memory 420 may include memory assembly including one or more storage media. The one or more storage media may include permanent memory such as hard drive, flash memory, read-only memory (ROM), semi-permanent memory such as random access memory (RAM), a storage (or storage assembly) of any other suitable type, or any combination thereof. The memory 420 may include a cache memory, which is memory of one or more different types used to temporarily store data for a function (or feature) of the electronic device 100. As a non-limiting example, the cache memory may be included in the processor 410. The memory 420 may be incorporated onto one or more suitable types of components (e.g., subscriber identity module (SIM) card and/or secure digital (SD) card), which be fixedly embedded in the electronic device 100, or repeatedly inserted into the electronic device 100 and removed from the electronic device 100.

The memory 420 may store one or more software applications such as an operating system (or system software applications), a firmware software application, a driver software applications, a plug-in (e.g., add-in, add-on, and/or applet) software application, and/or any other suitable software applications. For example, the one or more software applications may include instructions executable by the at least one processor 410. The memory 420 may store instructions capable of being invoked by an application programming interface (API). The memory 420 may store instructions in a library.

The memory 420 may store a first program 491 included in a hardware abstraction layer (HAL) to control the display 430 and a second program 492 included in a framework layer to control the display 430. The first program 491 may include instructions for executing (or performing) at least a portion of operations to be illustrated below. The second program 492 may include instructions for executing (or performing) at least another portion of the operations to be illustrated below. As a non-limiting example, each of the first program 491 and the second program 492 may be executable by the CPU 411 of the CPU 411 and the DPU 412.

The memory 420 may store one or more third programs 493 generating at least a portion of images displayed on the display panel 110, and a user interface (UI) library 494 used to generate at least another portion of the images different from the at least portion of the images generated by the one or more third programs 493. For example, the one or more third programs 493 may include a software application for gaming. As a non-limiting example, the one or more third programs 493 may generate the at least portion of the images without using the UI library 494. For example, the UI library

494 may be referred to as a UI toolkit or a user experience (UX) toolkit. The UI library 494 may be used to set visual objects within a user interface provided from other programs (not shown) distinct from the one or more third programs, and/or movement of the visual objects. The one or more third programs 493 and the UI library 494 may determine a frame interval to be illustrated below. As a non-limiting example, the one or more third programs 493 may be executable by the CPU 411 of the CPU 411 and the DPU 412. As a non-limiting example, the UI library 494 may be used by the CPU 411.

The memory 420 may include at least a portion of memory 1530 of FIG. 15 or may correspond to at least a portion of the memory 1530 of FIG. 15.

The display 430 may be used to display an image. The display 430 may include display driving circuitry 431 and a display panel 110 to display an image.

The display driving circuitry 431 may receive data on an image from the at least one processor 410 (or the DPU 412). The data may be transmitted from the at least one processor 410 (or the DPU 412) to the display driving circuitry 431 through an interface 440. The interface 440 (e.g., including at least one circuit) may be usable for a first mode (e.g., a command mode of mobile industry processor interface (MIPI) display serial interface (DSI)), a second mode (e.g., a video mode of MIPI DSI), a third mode (e.g., a video hybrid mode of MIPI DSI), and/or a fourth mode (e.g., adaptive refresh panel (ARP) of MIPI DSI), which will be exemplified below. The interface 440 may operate according to the first mode, the second mode, the third mode, and/or the fourth mode. As a non-limiting example, the interface 440 may include a mobile industry processor interface (MIPI) (or may support MIPI).

The display driving circuitry 431 may display the image on the display panel 110 by scanning the image. For example, the display driving circuitry 431 may display the image on the display panel 110, by applying (or providing) a gate voltage and a source voltage to the display panel 110 through the scan.

The display driving circuitry 431 may include a graphic random access memory (GRAM) for the first mode and/or the third mode. For example, the GRAM may be used to store an image received from the at least one processor 410.

Figure 16:
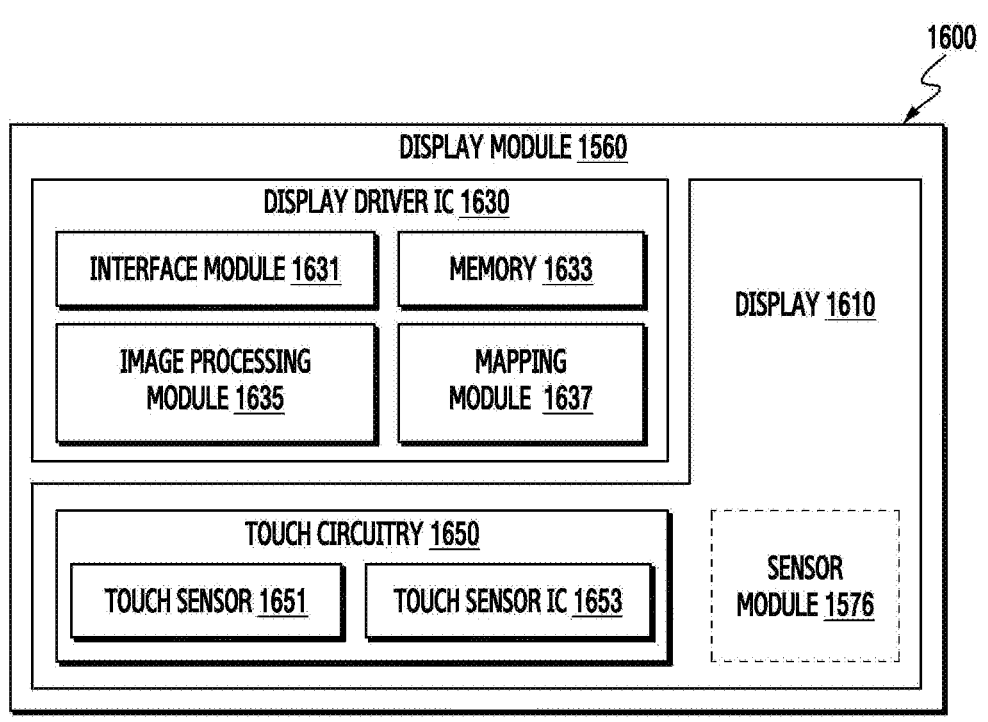
FIG. 16 is a block diagram of a display module according to various embodiments.

The display driving circuitry 431 may include at least a portion of a display driver IC 1630 of FIG. 16 or may correspond to at least a portion of the display driver IC 1630 of FIG. 16.

The display panel 110 may display an image according to control of the display driving circuitry 431. For example, the display panel 110 may include sub-pixels. Each of the sub-pixels may include the driving transistor and the emission diode (or emission element) exemplified above. The display panel 110 may display an image according to a gate voltage and a source voltage from the display driving circuitry 431.

The at least one processor 410 may be configured for a changeable refresh rate (e.g., a variable refresh rate (VRR)). As a non-limiting example, the at least one processor 410 (or the CPU 411) may adaptively change a refresh rate for an image (e.g., an image to be displayed on the display panel 110) generated by the at least one processor 410, without considering a state of the display 430. The at least one processor 410 may change the state 130 to the state 160 or change the state 160 to the state 130 at a timing (or time point) determined by the at least one processor 410 of the at least one processor 410 or the display 430. As a non-limiting example, the at least one processor 410 may adaptively change the refresh rate at the timing determined by the at least one processor 410 according to an emission period (e.g., a cycle of an emission synchronization signal for the at least one processor 410) (or a timing of the emission synchronization signal) for display on the display panel 110.

As a non-limiting example, changing the refresh rate at the timing determined by the at least one processor 410 may not be predicted by the display 430. Since the timing of changing the refresh rate is not predicted by the display 430, the change in the refresh rate determined by the at least one processor 410 of the at least one processor 410 and the display 430 may interfere with operations executed by the display 430 of the at least one processor 410 and the display 430, in order to reduce the afterimage and/or the flickering. For example, an unintended dual scan (or dual scan phenomenon) may be caused on the display panel 110 due to the change in the refresh rate that interferes with the operations of the display 430 for reducing the afterimage and/or the flickering.

As a non-limiting example, in order to reduce the change in the refresh rate that interferes with the operations of the display 430 for reducing the afterimage and/or the flickering, the frame interval may be defined within the electronic device 100. The frame interval may be determined, defined, and/or obtained to execute image transmission from the at least one processor 410 to the display driving circuitry 431, at a timing determined by the at least one processor 410 (e.g., the CPU 411) of the at least one processor 410 and the display 430. The frame interval may indicate a shortest time interval between times (or timings) (e.g., start times) (e.g., end times) that images is respectively generated using the second program 492. The frame interval may indicate the shortest time interval between image transmissions from the second program 492 to the first program 491. The frame interval may indicate a shortest time interval between image transmissions from the at least one processor 410 to the display driving circuitry 431, which are executed to (newly) display an image on the display panel 110. The frame interval may be indicated as the number (e.g., step illustrated below) of one or more emission periods usable to provide time capable of transmitting an image. The frame interval may indicate a shortest time interval between image transmissions from the at least one processor 410 to the display driving circuitry 431, which will be executed to change an image displayed on the display panel 110. Since the frame interval indicates the shortest time interval, a capability of the at least one processor 210 to execute image transmission at each start time of emission periods for each pixel in the display panel 110 may be limited due to the frame interval. Since the frame interval indicates the shortest time interval, the display driving circuitry 430 may execute the operations for reducing the afterimage and/or the flickering within a time period from a first timing (or a first time point) when a first image transmission (e.g., scheduled by the CPU 411) is executed to a second timing (or a second time point) when a second image transmission (e.g., scheduled by the CPU 411) following the first image transmission may be executed according to the frame interval.

The frame interval may be changed according to determination of the at least one processor 410 (e.g., the CPU 411). As a non-limiting example, the change in the frame interval may be executed (or performed) using the second program 492 exemplified above. Since the change in the frame interval is unnoticeable by the display 430 (or the change in the frame interval is transparent to the display 430), a command (or signal) (or data) for notifying (or informing) the display 430 (or the display driving circuitry 431) of the change in the frame interval may be defined within the electronic device 100. Since the change in the frame interval is unnoticeable by the display 430, the command for applying the change in the frame interval to the display 430 may be defined within the electronic device 100. As a non-limiting example, the command may be transmitted from the at least one processor 410 to the display driving circuitry 431. As a non-limiting example, the command may be transmitted from the CPU 411 to the DPU 412.

The at least one processor 410 may change the frame interval from a first frame interval to a second frame interval according to the change in the refresh rate, and control the display driving circuitry 431 (or the display 430), so that the change in the refresh rate does not interfere with operations of the display driving circuitry 431 for reducing the after-image and/or the flickering, based on the change from first frame interval to the second frame interval. For example, the at least one processor 410 may control the display driving circuitry 431 so that one or more scans for repeated display of images performed on the display panel 110 in accordance with a change from the first frame interval to the second frame interval longer than the first frame interval are completed before image transmission to be executed according to the second frame interval. Controlling the display driving circuitry 431 may be executed through the command.

The at least one processor 410 may change the frame interval from the first frame interval to the second frame interval longer than the first frame interval. The change from the first frame interval to the second frame interval may be executed (or performed) using the second program 492 exemplified above. Information on the second frame interval changed from the first frame interval may be provided from the second program 492 to the first program 491.

The at least one processor 410 may control the display driving circuitry 431 to perform display of the first image on the display panel 110, by executing a first image transmission (e.g., image transmission from the at least one processor 410 to the display driving circuitry 431). The at least one processor 410 may control the display driving circuitry 431 to complete one or more scans for repeated display of the first image performed on the display panel 110 based on the change from the first frame interval to the second frame interval before a start timing (or start time) of a second image transmission (e.g., image transmission from the at least one processor 410 to the display driving circuitry 431) to be executed according to the second frame interval to perform the display of a second image (e.g., an image following the first image) on the display panel 110. The one or more scans may be executed to reduce the flickering according to a difference between the first frame interval and the second frame interval. The one or more scans may be executed to reduce the afterimage according to the second frame interval (or a length of the second frame interval).

The at least one processor 410 may not perform the second image transmission at the start timing, but it may execute the second image transmission, so the one or more scans executed after displaying the first image according to the transmission of the first image may be completed before the start timing according to the control of the at least one processor 410. The at least one processor 410 may control the display driving circuitry 431 to complete the one or more scans before the start timing arrives. The at least one processor 410 may control the display driving circuitry 431 so that the start timing does not arrive while the one or more scans are in progress.

Completing the one or more scans before the start timing may be executed through a command generated (or obtained) (or determined) according to the change from the first frame interval to the second frame interval. The command may be transmitted from the at least one processor 410 to the display driving circuitry 431. The command may be transmitted from the CPU 411 to the display driving circuitry 431 through the DPU 412. The command may be transmitted from the CPU 411 to the DPU 412. The command may be used to schedule the one or more scans for completing before the start timing.

As a non-limiting example, the command may be generated using the first program 491 exemplified above. The command may be generated using the first program 491, which obtains the information on the change from the first frame interval to the second frame interval from the second program 492. The command may be transmitted from the at least one processor 410 to the display driving circuitry 431 by using the first program 491. The command may be transmitted from the CPU 411 to the DPU 412 by using the first program 491. As a non-limiting example, the command may be generated by the DPU 412 of the CPU 411 and the DPU 412, and transmitted from the DPU 412 to the display driving circuitry 431.

As a non-limiting example, the command may (explicitly (or directly)) indicate scheduling information on the one or more scans capable of being executed by the display driving circuitry 431. The command may indicate information on the second frame interval changed from the first frame interval. For example, the command may (implicitly (or indirectly)) indicate scheduling information on the one or more scans by indicating the information on the second frame interval.

As a non-limiting example, controlling the display driving circuitry 431 through the command may be performed for image transmission according to the first mode. This operation is illustrated in descriptions of FIGS. 5 to 7.

Figure 5:
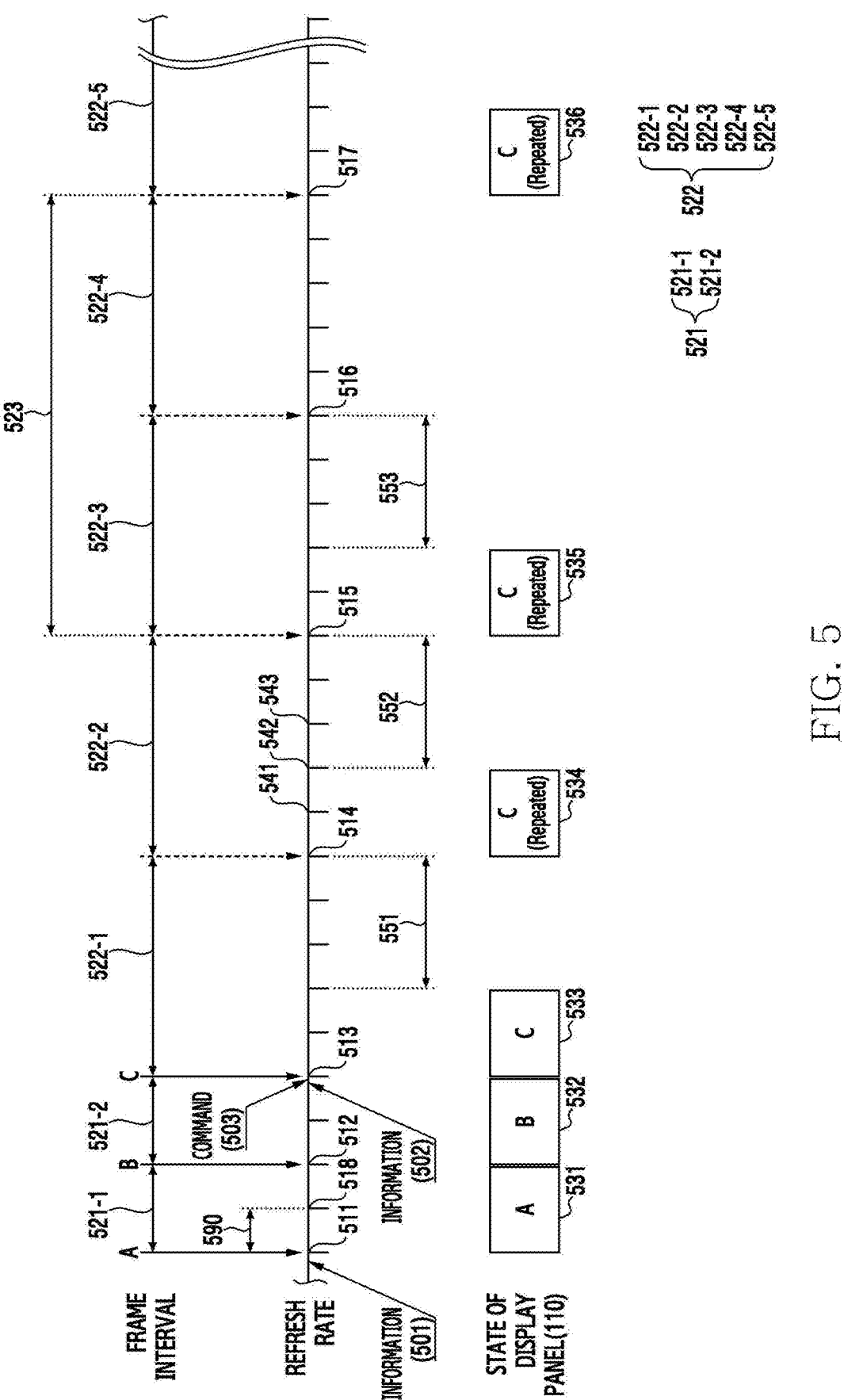
FIGS. 5 and 6 illustrate an exemplary method of completing one or more scans for repeated display of an image based on a first mode, before a start timing of image transmission to be executed according to a frame interval.
Figure 6:
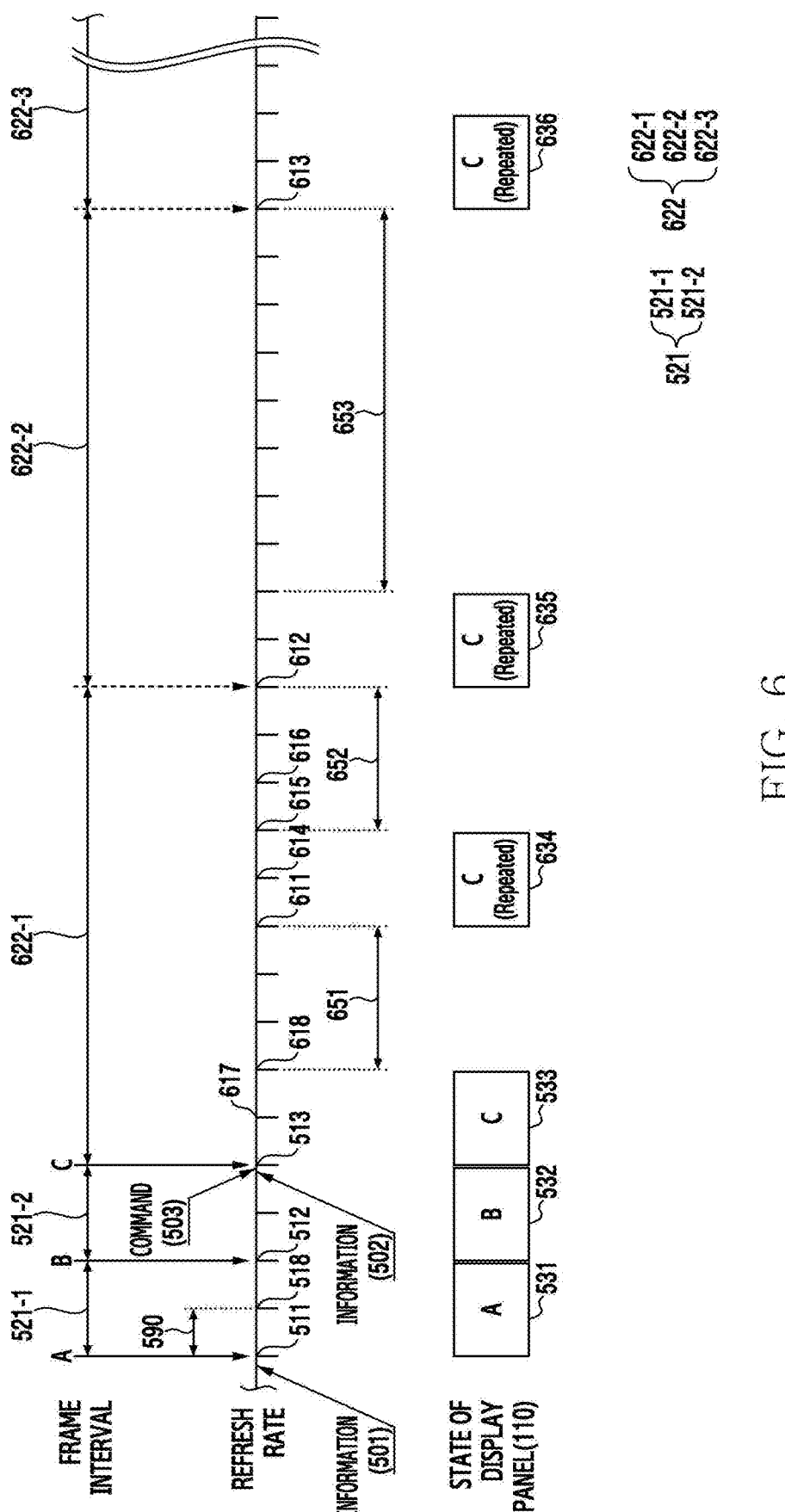

FIGS. 5 and 6 illustrate an exemplary method of completing one or more scans for repeated display of an image based on a first mode, before a start timing of image transmission to be executed according to a frame interval.

Figure 7:
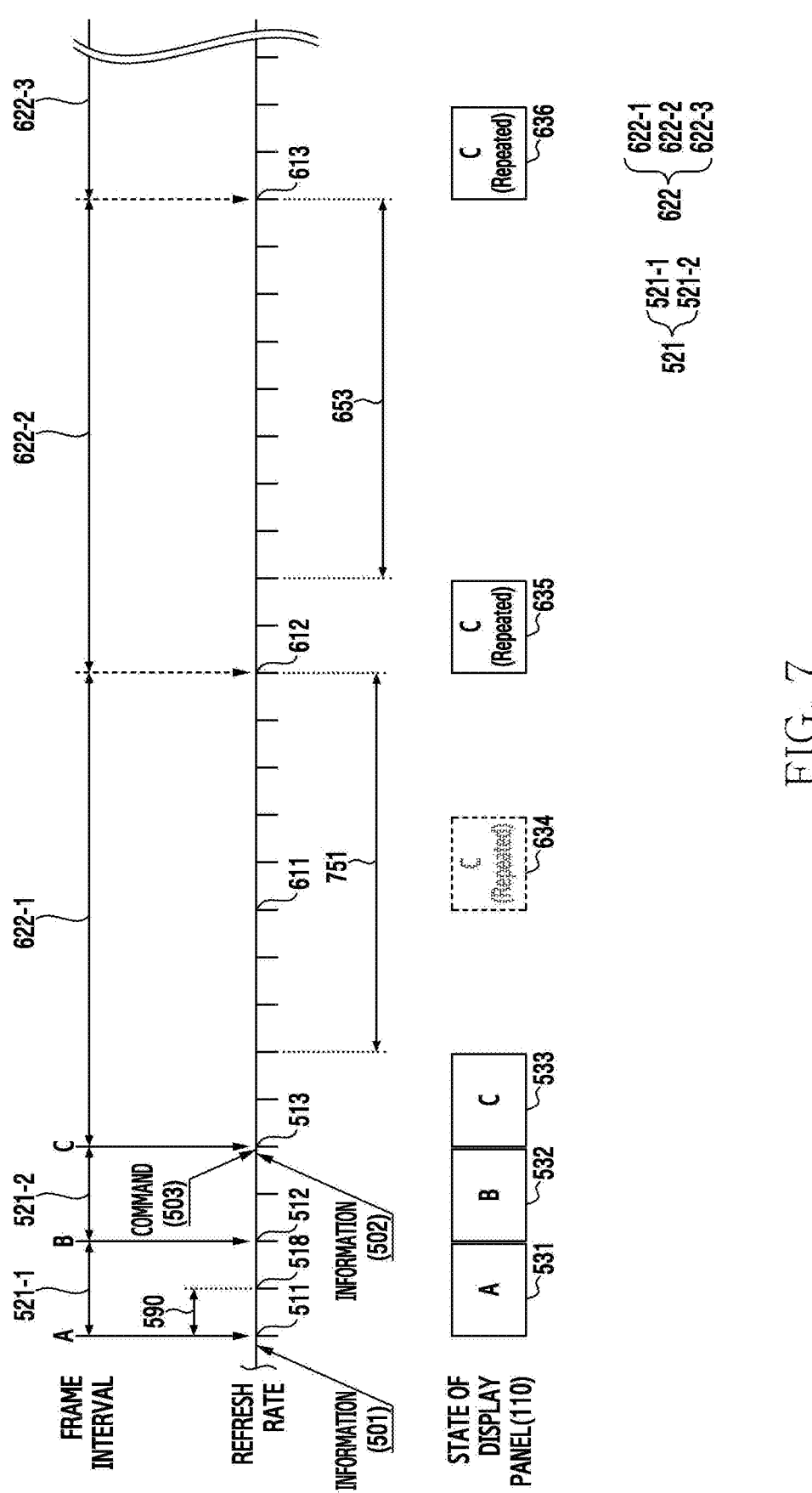
FIG. 7 illustrates an exemplary method of refraining from performing one or more scans for repeated display of an image based on a first mode, according to a type of content provided in accordance with display of the image.

FIG. 7 illustrates an exemplary method of refraining from performing one or more scans for repeated display of an image based on a first mode, according to a type of content provided in accordance with display of the image.

Referring to FIG. 5, information 501 on a first frame interval may be generated (or obtained) (or determined) by a second program 492 executed by at least one processor 410. For example, the information 501 may be transmitted (or provided) from the second program 492 to a first program 491 before (or immediately before) a timing 511 (or time point 511) according to execution of the at least one processor 410. The first frame interval may correspond to a length of a time period 521. The first frame interval may be indicated as a first value. The first frame interval may correspond to the first value. The first value may indicate the length of the time period 521. As a non-limiting example, the first value may correspond to $1/120$ (s), which is the length of the time period 521. When a length of a time period 590 corresponding to the emission period exemplified above is indicated as a 1 step, the first value may be 2 steps. The information 501 may indicate 2 steps.

Since the first frame interval indicates the minimum time interval between image transmissions (e.g., image transmission from the at least one processor 410 to the display driving circuitry 431) to be executed from the timing 511, the information 501 may indicate that image transmission may be executed at the timing 511 and a timing 512. Since the first frame interval indicates the minimum time interval between image transmissions to be executed from the timing 511, the information 501 may indicate that image transmission (or image transmission to change display on the display panel 110) scheduled by the at least one processor 410 (or the CPU 411) is not executed at a timing 518. The timing 512 and the timing 518 may be timings usable for image transmission, but image transmission executed to change the image displayed on the display panel 110 from the timing 518 may be limited within the electronic device 100 according to the information 501.

According to the information 501, the at least one processor 410 may execute image transmission (e.g., image transmission from the at least one processor 410 executed through the interface 440 to the display driving circuitry 431) from the timing 511 within a time period 521-1. The image transmission from the timing 511 may be executed according to the first mode. The display driving circuitry 431 may receive an image A from the at least one processor 410 according to the image transmission from the timing 511, and store the image A received from the at least one processor 410 according to the first mode in the GRAM. For example, the display driving circuitry 431 may display the image A on the display panel 110 as shown in a state 531, by scanning the image A stored in the GRAM.

The at least one processor 410 may execute image transmission (e.g., image transmission from the at least one processor 410 executed through the interface 440 to the display driving circuitry 431) from the timing 512 (or time point 512) within a time period 521-2 according to the information 501. The image transmission from the timing 512 may be executed according to the first mode. The display driving circuitry 431 may receive an image B from the at least one processor 410 according to the image transmission from the timing 512, and store the image B received from the at least one processor 410 according to the first mode in the GRAM. For example, the display driving circuitry 431 may display the image B on the display panel 110 as shown in a state 532, by scanning the image B stored in the GRAM.

The at least one processor 410 may change the frame interval from the first frame interval to the second frame interval longer than the first frame interval. The at least one processor 410 may use the second program 492 to generate (or obtain) (or determine) information 502 on the second frame interval. The information 502 may be transmitted (or provided) from the second program 492 to the first program 491 before (or immediately before) a timing 513 (or time point 513), according to execution of the at least one processor 410. The second frame interval may correspond to a length of the time period 522. The second frame interval may be indicated as a second value. The second frame interval may correspond to the second value. The second value may indicate the length of the time period 522. As a non-limiting example, the second value may correspond to ¼8 (s), which is the length of the time period 522. When the length of the time period 590 is indicated as a 1 step, the second value may be 5 steps. For example, the information 502 may indicate 5 steps.

The at least one processor 410 may generate (or obtain) (or determine) a command 503, by using the first program 491, according to the information 502. The command 503 may be generated according to a difference between the first frame interval and the second frame interval. The command 503 may be generated according to the second frame interval. The command 503 may be generated to reduce the afterimage and/or the flickering. The at least one processor 410 may transmit the command 503 to the display driving circuitry 431, by using the first program 491. The command 503 may be transmitted to the display driving circuitry 431 to indicate the change from the first frame interval to the second frame interval to the display driving circuitry 431.

The at least one processor 410 may control the display driving circuitry 431 to operate as described below, by transmitting the command 503. The at least one processor 410 may execute image transmission (e.g., image transmission from the at least one processor 410 executed through the interface 440 to the display driving circuitry 431) from the timing 513 according to the information 502. The image transmission from the timing 513 may be executed according to the first mode. The display driving circuitry 431 may receive an image C from the at least one processor 410 according to the image transmission from the timing 513, and store the image C received from the at least one processor 410 according to the first mode in the GRAM. The display driving circuitry 431 may display the image C on the display panel 110 as shown in a state 533, by scanning the image C stored in the GRAM. Since a difference between the first frame interval and the second frame interval indicates that occurrence probability of the flickering is relatively low, the display driving circuitry 431 may not perform a scan for repeated display of the image C, within a time period 522-1, after displaying the image C indicated by the state 533, according to the command 503. Since the second frame interval is shorter than a reference frame interval, the display driving circuitry 431 may not perform a scan for repeated display of the image C, within the time period 522-1, after displaying the image C indicated by the state 533, according to the command 503.

Since the second frame interval indicates a shortest time interval between image transmissions, the at least one processor 410 may not execute image transmission (e.g., image transmission from the at least one processor 410 executed through the interface 440 to the display driving circuitry 431) from a timing 514. Since the second frame interval merely indicates that image transmission is not executed within the time period 522-1 except for the timing 513 and does not indicate that the image transmission from the timing 514 is necessarily executed, the at least one processor 410 may not execute the image transmission from the timing 514.

The display driving circuitry 431 may recognize, identify, detect, determine, or confirm that the image transmission from the timing 514 is not executed at the timing 514 or before (or immediately before) the timing 514. For example, the display driving circuitry 431 may display the image C again on the display panel 110 as shown in a state 534, by scanning the image C (or image C maintained in the GRAM after displaying the image C as shown in the state 533) stored in the GRAM from the timing 514, according to the recognition and the command 503. As a non-limiting example, the display driving circuitry 431 may display the image C again on the display panel 110 as shown in the state 534, by scanning the image C stored in the GRAM from the timing 514 corresponding to a multiple of the second frame interval.

The display driving circuitry 431 may scan the image C in the GRAM within a time period 522-2, in order to perform repeated display of the image C on the display panel 110, according to the recognition and the command 503. The scan (or the repeated display of the image C) of the image C may be performed within the time period 522-2 to reduce the flickering. The scan (or the repeated display of the image C)

of the image C may be performed within the time period 522-2, according to the change from the first frame interval to the second frame interval. The scan of the image C may be completed before the timing 515 at which image transmission from the at least one processor 410 may be executed, according to the command 503.

FIG. 5 illustrates an example of performing the scan of the image C from the timing 514 within the time period 522-2. However, it is merely exemplary. For example, the scan of the image C may be performed from one of the timing 541, the timing 542, and the timing 543, which are capable of completing the scan of the image C before the timing 515. For example, the scan of the image C performed from the timing 541, the timing 542, or the timing 543 may be completed before the timing 515, according to the command 503.

Since the second frame interval indicates a shortest time interval between image transmissions, the at least one processor 410 may not execute image transmission (e.g., image transmission from the at least one processor 410 executed through the interface 440 to the display driving circuitry 431) from the timing 515. Since the second frame interval merely indicates that image transmission is not executed within the time period 522-2 except for the timing 514 and does not indicate that the image transmission from the timing 515 is necessarily executed, the at least one processor 410 may not execute the image transmission from the timing 515.

The display driving circuitry 431 may recognize, identify, detect, determine, or confirm that the image transmission from the timing 515 is not executed at the timing 515 or before (or immediately before) the timing 515. The display driving circuitry 431 may display the image C again on the display panel 110 as shown in a state 535, by scanning the image C (or image C maintained in the GRAM after the repeated display of the image C as shown in the state 534) stored in the GRAM from the timing 515, according to the recognition and the command 503. As a non-limiting example, the display driving circuitry 431 may display the image C again on the display panel 110 as shown in the state 535, by scanning the image C stored in the GRAM from the timing 515 corresponding to a multiple of the second frame interval.

The display driving circuitry 431 may scan the image C in the GRAM within a time period 522-3, in order to perform repeated display of the image C on the display panel 110, according to the recognition and the command 503. The scan (or the repeated display of the image C) of the image C may be performed within the time period 522-3 to reduce the flickering. The scan (or the repeated display of the image C) of the image C may be performed within the time period 522-3, according to the change from the first frame interval to the second frame interval. The scan of the image C may be completed before a timing 516 at which image transmission from the at least one processor 410 may be executed, according to the command 503.

Since the second frame interval indicates a shortest time interval between image transmissions, the at least one processor 410 may not execute image transmission (e.g., image transmission from the at least one processor 410 executed through the interface 440 to the display driving circuitry 431) from the timing 516. Since the second frame interval merely indicates that image transmission is not executed within the time period 522-3 except for the timing 515 and does not indicate that the image transmission from the timing 516 is necessarily executed, the at least one processor 410 may not execute the image transmission from the timing 516.

The display driving circuitry 431 may refrain from performing the scan of the image C (or image C maintained in the GRAM after the repeated display of the image C as shown in the state 535) stored in the GRAM from the timing 516. Since a probability of the flickering due to a change in the refresh rate is reduced according to the repeated display of the image C as shown in the state 534 and the repeated display of the image C as shown in the state 535, the display driving circuitry 431 may not perform the scan of the image C from the timing 516. For example, a refresh rate on the display panel 110 may be changed from a first refresh rate (e.g., 120 hertz (Hz)) corresponding to a time period 521-2 (e.g., the display of the image B as shown in the state 532) to a second refresh rate (e.g., 48 (Hz)) corresponding to a time period 522-1 (e.g., the display of the image C as shown in the state 533). The refresh rate on the display panel 110 changed to the second refresh rate may be maintained, according to the repeated display of the image C as shown in the state 534. In order to reduce the refresh rate on the display panel 110, the display driving circuitry 431 may refrain from performing the scan of the image C from the timing 516 after the repeated display of the image C as shown in the state 535. The refresh rate on the display panel 110 may be changed from the second refresh rate to a third refresh rate (e.g., 24 (Hz)), according to a scan of the image C not performed during a time period 523 (e.g., including a time period 522-3 and a time period 522-4). Since the refresh rate on the display panel 110 is not directly changed to the third refresh rate from the first refresh rate and changed from the first refresh rate to the third refresh rate through the second refresh rate, the occurrence probability of the flickering may be reduced.

The display driving circuitry 431 may not perform the scan of the image C from the timing 516, according to the command 503. For example, the scan of the image C from the timing 516 may not be performed to reduce power consumed by the display 430. The scan of the image C from the timing 516 may not be performed, based on luminance of the display panel 110 less than a reference luminance and/or illuminance around the electronic device 100 less than a reference illuminance.

Since the second frame interval indicates a shortest time interval between image transmissions, the at least one processor 410 may not execute image transmission (e.g., image transmission from the at least one processor 410 executed through the interface 440 to the display driving circuitry 431) from a timing 517. For example, since the second frame interval merely indicates that image transmission is not executed within a time period 522-5 except for the timing 517 and does not indicate that the image transmission from the timing 517 is necessarily executed, the at least one processor 410 may not perform the image transmission from the timing 517.

The display driving circuitry 431 may recognize, identify, detect, determine, or confirm that the image transmission from the timing 517 is not executed at the timing 517 or before (or immediately before) the timing 517. For example, the display driving circuitry 431 may display the image C again on the display panel 110 as shown in a state 536, by scanning the image C (or the image C maintained in the GRAM after the repeated display of the image C as shown in the state 535) stored in the GRAM from the timing 517, according to the recognition and the command 503. As a non-limiting example, the display driving circuitry 431 may display the image C again on the display panel 110 as shown in the state 536, by scanning the image C stored in the GRAM from the timing 517 corresponding to a multiple of the second frame interval.

The display driving circuitry 431 may scan the image C in the GRAM within the time period 522-5 to perform repeated display of the image C on the display panel 110, according to the recognition and the command 503. For example, the scan (or the repeated display of the image C) of the image C may be performed within the time period 522-5 to reduce the flickering. The scan (or the repeated display of the image C) of the image C may be performed within the time period 522-5, in order to reduce the flickering caused by a change from the third refresh rate to a fourth refresh rate (e.g., a refresh rate lower than the third refresh rate). The scan of the image C may be completed before a timing (not shown) at which image transmission from the at least one processor 410 may be executed according to the command 503.

As described above, the electronic device 100 may reduce the flickering caused by a change (e.g., change from the first frame interval to the second frame interval) in the frame interval, by using the command 503 transmitted from the at least one processor 410 to the display driving circuitry 431.

Since the display 430 (or the display driving circuitry 431) may recognize that image transmission from the at least one processor 410 to the display driving circuitry 431 may be executed at each of the timing 514, the timing 515, the timing 516, and the timing 517, by using the command 503 before each of the timing 514, the timing 515, the timing 516, and the timing 517, the display 430 may be in a state for low power consumption within each of a time period 551, a time period 552, a time period 553, and a time period 522-4. For example, the electronic device 100 may reduce power consumed by the display 430, by using the command 503.

FIG. 5 illustrates an example in which a single transmission of the command 503 is executed according to the change from the first frame interval to the second frame interval, but it is merely exemplary. As a non-limiting example, the command 503 may be transmitted at every start timing (or start time) (or start time point) of the second frame interval. For example, additional transmissions of the command 503 may be executed in response to the timing 514 (or a timing before the timing 514), the timing 515 (or a timing before the timing 515), the timing 516 (or a timing before the timing 516), and a timing 517 (or a timing before the timing 517).

For example, referring to FIG. 6, information 501 on the first frame interval may be generated (or obtained) (or determined) by the second program 492 executed by the at least one processor 410. The information 501 may be transmitted (or provided) from the second program 492 to the first program 491, before (or immediately before) the timing 511 (or time point 511) according to execution of the at least one processor 410. The first frame interval may correspond to a length of the time period 521. The first frame interval may be indicated as a first value. The first frame interval may correspond to the first value. The first value may indicate the length of the time period 521. As a non-limiting example, the first value may correspond to $\frac{1}{120}$ (s), which is the length of the time period 521. When a length of the time period 590 corresponding to the emission period exemplified above is indicated as a 1 step, the first value may be 2 steps. The information 501 may indicate 2 steps.

Since the first frame interval indicates a minimum time interval between image transmissions (e.g., image transmission from the at least one processor 410 to the display driving circuitry 431) to be executed from the timing 511, the information 501 may indicate that image transmission may be executed at the timing 511 and the timing 512. Since the first frame interval indicates the minimum time interval between image transmissions to be executed from the timing 511, the information 501 may indicate that image transmission is not executed at the timing 518.

The at least one processor 410 may perform image transmission (e.g., image transmission from the at least one processor 410 executed through the interface 440 to the display driving circuitry 431) from the timing 511 within the time period 521-1, according to the information 501. The image transmission from the timing 511 may be executed according to the first mode. The display driving circuitry 431 may receive an image A from the at least one processor 410 according to the image transmission from the timing 511, and store the image A received from the at least one processor 410 according to the first mode in the GRAM. The display driving circuitry 431 may display the image A on the display panel 110 as shown in the state 531, by scanning the image A stored in the GRAM.

The at least one processor 410 may perform image transmission (e.g., image transmission from the at least one processor 410 executed through the interface 440 to the display driving circuitry 431) from the timing 512 (or the time point 512) within the time period 521-2 according to the information 501. The image transmission from the timing 512 may be executed according to the first mode. The display driving circuitry 431 may receive an image B from the at least one processor 410 according to the image transmission from the timing 512, and store the image B received from the at least one processor 410 according to the first mode in the GRAM. The display driving circuitry 431 may display the image B on the display panel 110 as shown in the state 532, by scanning the image B stored in the GRAM.

The at least one processor 410 may change the frame interval from the first frame interval to a second frame interval longer than the first frame interval. The at least one processor 410 may use the second program 492 to generate (or obtain) (or determine) information 502 on the second frame interval. The information 502 may be transmitted (or provided) from the second program 492 to the first program 491 before (or immediately before) the timing 513 (or time point 513), according to execution of the at least one processor 410. For example, the second frame interval may correspond to a length of a time period 622. The second frame interval may be indicated as a second value. The second frame interval may correspond to the second value. The second value may indicate the length of the time period 622. As a non-limiting example, the second value may correspond to $\frac{1}{24}$ (s), which is the length of the time period 622. For example, when the length of the time period 590 is indicated as a 1 step, the second value may be 10 steps. For example, the information 502 may indicate 10 steps.

The at least one processor 410 may use the first program 491 to generate (or obtain) (or determine) the command 503, according to the information 502. The command 503 may be generated according to a difference between the first frame interval and the second frame interval. The command 503 may be generated according to the second frame interval. The command 503 may be generated to reduce the afterimage and/or the flickering. The at least one processor 410 may transmit the command 503 to the display driving circuitry 431 by using the first program 491. The command 503 may be transmitted to the display driving circuitry 431, in order to indicate the change from the first frame interval to the second frame interval to the display driving circuitry 431.

The at least one processor 410 may control the display driving circuitry 431 to operate as described below, by transmitting the command 503. The at least one processor 410 may execute image transmission (e.g., image transmission from the at least one processor 410 executed through the interface 440 to the display driving circuitry 431) from the timing 513, according to the information 502. The image transmission from the timing 513 may be executed according to the first mode. The display driving circuitry 431 may receive an image C from the at least one processor 410 according to the image transmission from the timing 513, and store the image C received from the at least one processor 410 according to the first mode in the GRAM. The display driving circuitry 431 may display the image C on the display panel 110 as shown in the state 533, by scanning the image C stored in the GRAM.

Since a difference between the first frame interval and the second frame interval indicates that occurrence probability of the flickering is relatively high, the display driving circuitry 431 may perform a scan for repeated display of the image C within a time period 622-1 after displaying the image C indicated by the state 533, according to the command 503. The display driving circuitry 431 may display the image C again on the display panel 110 as shown in a state 634, by scanning the image C (or image C maintained in the GRAM after displaying the image C as shown in the state 533) stored in the GRAM from a timing 611, according to the command 503. The display driving circuitry 431 may scan the image C in the GRAM from the timing 611 within the time period 622-1, in order to perform the repeated display of the image C on the display panel 110, according to the command 503. The scan (or the repeated display of the image C) of the image C may be performed within the time period 622-1, according to the change from the first frame interval to the second frame interval. Since changing the refresh rate on the display panel 110 from a first refresh rate (e.g., 120 (Hz)) corresponding to the time period 521-2 (e.g., the display of the image B as shown in the state 532) to a second refresh rate (e.g., 24 (Hz)) corresponding to the time period 622-1 (or the second frame interval) indicates that occurrence probability of the flickering is relatively high, the display driving circuitry 431 may scan the image C in the GRAM from the timing 611 to change the refresh rate on the display panel 110 from the first refresh rate to a third refresh rate (e.g., 48 (Hz)) (e.g., a refresh rate between the first refresh rate and the second refresh rate). The scan of the image C may be completed before the timing 612 at which image transmission from the at least one processor 410 may be executed, according to the command 503.

FIG. 6 illustrates an example of performing the scan of the image C from the timing 611 within the time period 622-1 for the repeated display of the image C. However, it is merely exemplary. For example, the scan of the image C may be performed from one of a timing 614, a timing 615, and a timing 616, which are capable of completing the scan of the image C before the timing 612. For example, the scan of the image C performed from the timing 614, the timing 615, or the timing 616 may be completed before the timing 612, according to the command 503.

As a non-limiting example, the display driving circuitry 431 may perform the scan of the image C stored in the GRAM, in order to perform the repeated display of the image C on the display panel 110 from a timing within the time period 622-1 corresponding to a divisor of the second value (e.g., 10 steps) indicating the second frame interval. For example, divisors of the second value are 1, 2, 5, and 10. For example, a timing within the time period 622-1 corresponding to 1, which is a divisor of the second value, may be a timing 617, a timing within the time period 622-1 corresponding to 2, which is a divisor of the second value, may be a timing 618, a timing within the time period 622-1 corresponding to 5, which is a divisor of the second value, may be a timing 611, and a timing within the time period 622-1 corresponding to 10, which is a divisor of the second value, may be a timing 612. For example, since the timing 617 is within a time period in which the scan of the image C for the display of the image C is performed as shown in the state 533, the timing 617 may not be usable as a start timing of the scan of the image C for the repeated display of the image C. For example, since the timing 618 is outside a time period in which the scan of the image C for the display of the image C is performed as shown in the state 533, the timing 618 may be usable as a start timing of the scan of the image C for the repeated display of the image C. For example, since the timing 611 is outside a time period in which the scan of the image C for the display of the image C is performed as shown in the state 533, the timing 611 may be usable as a start timing of the scan of the image C for the repeated display of the image C. For example, although the timing 612 is outside a time period in which the scan of the image C for the display of the image C is performed as shown in the state 533, the timing 612 may not be usable as a start timing of the scan of the image C for the repeated display of the image C because the timing 612 is a timing at which image transmission (e.g., image transmission from the at least one processor 410 to the display driving circuitry 431) may be executed according to the second frame interval. For example, the timing 618 and the timing 611 from among the timing 617, the timing 618, the timing 611, and the timing 612, which are timings within the time period 622-1 corresponding to a divisor of the second value, may be usable as a start timing of the scan of the image C for the repeated display of the image C. For example, the display driving circuitry 431 may scan the image C for the repeated display of the image C from the timing 618, unlike the illustration of FIG. 6, which perform the scan of the image C for the repeated display of the image C from the timing 611. For example, the display driving circuitry 431 may perform the scan of the image C for the repeated display of the image C from the timing 611. As a non-limiting example, the number of times of performing the scan of the image C may be reduced while the image transmission for changing the image displayed on the display panel 110 from the image C to an image D is not executed, according to a time elapsed after the change to the second frame interval. For example, the number of times of performing the scan of the image C within the time period 622-1 (or the number of times of performing the display of the image C within the time period 622-1) may be greater than the number of performing the scan of the image C within the time period 622-2 (or the number of times of performing the display of image C within the time period 622-2).

For example, since the second frame interval indicates a shortest time interval between image transmissions, the at least one processor 410 may not execute image transmission (e.g., image transmission from the at least one processor 410 executed through the interface 440 to the display driving circuitry 431) from the timing 612. For example, since the second frame interval merely indicates that image transmission is not executed within a time period 622-1 except for the timing 513 and does not indicate that the image transmission from the timing 612 is necessarily executed, the at least one processor 410 may not perform the image transmission from the timing 612.

For example, the display driving circuitry 431 may recognize, identify, detect, determine, or confirm that the image transmission from the timing 612 is not executed at the timing 612 or before (or immediately before) the timing 612. For example, the display driving circuitry 431 may display the image C again on the display panel 110 as shown in a state 635, by scanning the image C (or image C maintained in the GRAM after the repeated display of the image C as shown in the state 634) stored in the GRAM from the timing 612, according to the recognition and the command 503. As a non-limiting example, the display driving circuitry 431 may display the image C again on the display panel 110 as shown in the state 635, by scanning the image C stored in the GRAM from the timing 612 corresponding to a multiple of the second frame interval.

For example, the display driving circuitry 431 may scan the image C in the GRAM within the time period 622-2, in order to perform the repeated display of the image C on the display panel 110, according to the recognition and the command 503. For example, the scan of the image C (or the repeated display of the image C) may be performed within the time period 622-2 to reduce the flickering. For example, the scan of the image C (or the repeated display of the image C) may be performed within the time period 622-2, according to the change from the first frame interval to the second frame interval. For example, the scan of the image C may be completed before the timing 613 at which image transmission from the at least one processor 410 may be executed, according to the command 503.

For example, the display driving circuitry 431 may refrain from additionally performing the scan of the image C within the time period 622-2, after performing the scan of the image C from the timing 612. For example, since occurrence probability of the flickering due to a change in the refresh rate is reduced according to the repeated display of the image C as shown in the state 634 and the repeated display of the image C as shown in the state 635, the display driving circuitry 431 may not additionally perform the scan of the image C within the time period 622-2 after performing the scan of the image C from the timing 612. For example, as exemplified above, the refresh rate on the display panel 110 may be changed from the first refresh rate to the third refresh rate (e.g., 48 (Hz)). For example, the refresh rate on the display panel 110 may be maintained as the third refresh rate, according to performing the scan of the image C from the timing 611 (or the repeated display of the image C as shown in the state 634) and performing the scan of the image C from the timing 612 (or the repeated display of the image C as shown in the state 635). For example, in order to reduce the refresh rate on the display panel 110, the display driving circuitry 431 may refrain from additionally performing the scan of the image C within the time period 622-2 after performing the scan of the image C from the timing 612. For example, the refresh rate on the display panel 110 may be changed from the third refresh rate (e.g., 48 (Hz)) to the second refresh rate (e.g., 24 (Hz)), according to refraining from additionally performing the scan of the image C within the time period 622-2.

For example, since the second frame interval indicates a shortest time interval between image transmissions, the at least one processor 410 may not execute image transmission (e.g., image transmission from the at least one processor 410 executed through the interface 440 to the display driving circuitry 431) from the timing 613. For example, since the second frame interval merely indicates that image transmission is not executed within a time period 622-2 except for the timing 612 and does not indicate that the image transmission from the timing 613 is necessarily executed, the at least one processor 410 may not perform the image transmission from the timing 613, the at least one processor 410 may not perform the image transmission from the timing 613.

For example, the display driving circuitry 431 may recognize, identify, detect, determine, or confirm that the image transmission from the timing 613 is not executed, at the timing 613 or before (or immediately before) the timing 613. For example, the display driving circuitry 431 may display the image C again on the display panel 110 as shown in the state 636, by scanning the image C (or image C maintained in the GRAM after the repeated display of the image C as shown in the state 635) stored in the GRAM from the timing 613, according to the recognition and the command 503. As a non-limiting example, the display driving circuitry 431 may display the image C again on the display panel 110 as shown in the state 636, by scanning the image C stored in the GRAM from the timing 613 corresponding to a multiple of the second frame interval.

For example, the display driving circuitry 431 may scan the image C in the GRAM within the time period 622-3 to perform repeated display of the image C on the display panel 110, according to the recognition and the command 503. For example, the scan of the image C (or the repeated display of the image C) may be performed within the time period 622-3 to reduce the flickering. For example, since changing the refresh rate on the display panel 110 from the second refresh rate corresponding to the time period 622-2 (e.g., the repeated display of the image C as shown in the state 635) to a fourth refresh rate (e.g., a refresh rate (e.g., 1 Hz) lower than the second refresh rate) indicates that occurrence probability of the flickering is relatively high, the display driving circuitry 431 may perform the scan of the image C from the timing 613 to maintain the second refresh rate. For example, the scan of the image C may be completed before a timing (not shown) at which image transmission from the at least one processor 410 may be executed, according to the command 503.

As described above, the electronic device 100 may reduce the flickering caused by a change (e.g., change from the first frame interval to the second frame interval) in the frame interval, by using the command 503 transmitted from the at least one processor 410 to the display driving circuitry 431.

For example, since the display 430 (or the display driving circuitry 431) may recognize that image transmission from the at least one processor 410 to the display driving circuitry 431 may be executed at each of the timing 612 and the timing 613 by using the command 503 before each of the timing 612 and the timing 613, the display 430 may be in the state for low power consumption within each of a time period 651, a time period 652, and a time period 653. For example, the electronic device 100 may reduce power consumed by the display 430, by using the command 503.

A probability of the afterimage and/or the flickering may vary according to a type of content (or contents) provided by displaying an image on the display panel 110, as well as the refresh rate (or frame interval) on the display panel 110. As a non-limiting example, the probability may be relatively high when the content is a static content, and relatively low when the content is a dynamic content (e.g., video). For example, since the probability is relatively low when the content is the dynamic content, the display driving circuitry

431 may determine whether to perform operations for reducing the afterimage and/or the flickering according to the type of the content.

For example, referring to FIG. 7, information 501 on the first frame interval may be generated (or obtained) (or determined) by the second program 492 executed by the at least one processor 410. For example, the information 501 may be transmitted (or provided) from the second program 492 to the first program 491, before (or immediately before) the timing 511 (or time point 511), according to execution of the at least one processor 410. For example, the first frame interval may correspond to a length of the time period 521. For example, the first frame interval may be indicated as a first value. For example, the first frame interval may correspond to the first value. For example, the first value may indicate the length of the time period 521. As a non-limiting example, the first value may correspond to $\frac{1}{120}$ (s), which is the length of the time period 521. For example, when a length of the time period 590 corresponding to the emission period exemplified above is represented as a 1 step, the first value may be 2 steps. For example, the information 501 may indicate 2 steps.

For example, the first frame interval indicates a minimum time interval between image transmissions (e.g., image transmission from the at least one processor 410 to the display driving circuitry 431) to be executed from the timing 511, the information 501 may indicate that image transmission may be executed at the timing 511 and the timing 512. Since the first frame interval indicates the minimum time interval between image transmissions to be executed from the timing 511, the information 501 may indicate that image transmission is not executed at the timing 518.

For example, the at least one processor 410 may perform image transmission (e.g., image transmission from the at least one processor 410 executed through the interface 440 to the display driving circuitry 431) from the timing 511 within the time period 521-1, according to the information 501. For example, the image transmission from the timing 511 may be executed according to the first mode. For example, the display driving circuitry 431 may receive an image A from the at least one processor 410 according to the image transmission from the timing 511, and store the image A received from the at least one processor 410 according to the first mode in the GRAM. For example, the display driving circuitry 431 may display the image A on the display panel 110 as shown in the state 531, by scanning the image A stored in the GRAM. For example, a type of content provided according to displaying the image A in FIG. 7 may be different from a type of content provided according to displaying the image A in FIG. 6. For example, the type of content provided according to displaying the image A in FIG. 7 may be a video.

For example, the at least one processor 410 may perform image transmission (e.g., image transmission from the at least one processor 410 executed through the interface 440 to the display driving circuitry 431) from the timing 512 (or time point 512) within the time period 521-2 according to the information 501. For example, the image transmission from the timing 512 may be executed according to the first mode. For example, the display driving circuitry 431 may receive an image B from the at least one processor 410 according to the image transmission from the timing 512, and store the image B received from the at least one processor 410 according to the first mode in the GRAM. For example, the display driving circuitry 431 may display the image B on the display panel 110 as shown in the state 532, by scanning the image B stored in the GRAM. For example, a type of content provided by displaying the image A and the image B following the image A in FIG. 7 may be different from a type of content provided by displaying the image A and the image B following the image A in FIG. 6. For example, the type of content provided according to displaying the image A and the image B following the image A in FIG. 7 may be video.

For example, the at least one processor 410 may change the frame interval from the first frame interval to the second frame interval longer than the first frame interval. For example, the at least one processor 410 may use the second program 492 to generate (or obtain) (or determine) information 502 on the second frame interval. For example, the information 502 may be transmitted (or provided) from the second program 492 to the first program 491 before (or immediately before) the timing 513 (or time point 513) according to execution of the at least one processor 410. For example, the second frame interval may correspond to a length of the time period 622. For example, the second frame interval may be indicated as a second value. For example, the second frame interval may correspond to the second value. For example, the second value may indicate the length of the time period 622. As a non-limiting example, the second value may correspond to $\frac{1}{24}$ (s), which is the length of the time period 622. For example, when the length of the time period 590 is indicated as a 1 step, the second value may be 10 steps. For example, the information 502 may indicate 10 steps.

For example, the at least one processor 410 may generate (or obtain) (or determine) a command 503, by using the first program 491, according to the information 502. For example, the command 503 may be generated according to a difference between the first frame interval and the second frame interval. For example, the command 503 may be generated according to the second frame interval. For example, the command 503 may be generated to reduce the afterimage and/or the flickering. For example, the at least one processor 410 may transmit the command 503 to the display driving circuitry 431, by using the first program 491. For example, the command 503 may be transmitted to the display driving circuitry 431 to indicate the change from the first frame interval to the second frame interval to the display driving circuitry 431.

For example, the at least one processor 410 may control the display driving circuitry 431 to operate as described below, by transmitting the command 503. For example, the at least one processor 410 may execute image transmission (e.g., image transmission from the at least one processor 410 executed through the interface 440 to the display driving circuitry 431) from the timing 513, according to information 502. For example, the image transmission from the timing 513 may be executed according to the first mode. For example, the display driving circuitry 431 may receive an image C from the at least one processor 410 according to the image transmission from the timing 513, and store the image C received from the at least one processor 410 according to the first mode in the GRAM. For example, the display driving circuitry 431 may display the image C on the display panel 110 as shown in the state 533, by scanning the image C stored in the GRAM. For example, a type of content provided according to displaying an image A, an image B following the image A, and an image C following the image B in FIG. 7 may be different from a type of content provided according to displaying the image A, the image B following the image A, and the image C following the image B in FIG. 6. For example, the type of content provided according to displaying the image A, the image B following the image A, and the image C following the image B in FIG. 7 may be a video.

For example, although a difference between the first frame interval and the second frame interval indicates that occurrence probability of the flickering is relatively high, the display driving circuitry 431 may refrain from performing a scan for repeated display (e.g., repeated display of the image C from timing 611 as shown in the state 634) of the image C within the time period 622-1, after displaying the image C as shown in the state 533. For example, the display driving circuitry 431 may refrain from performing the scan within the time period 622-1, after displaying the image C as shown in the state 533, based on recognizing (or identifying) that a type of content provided according to displaying the image A, the image B following the image A, and the image C following the image B is a video. For example, the video is robust against the flickering (and/or the afterimage), the display driving circuitry 431 may refrain from performing the scan within the time period 622-1, after displaying the image C as shown in the state 533. For example, the display driving circuitry 431 may not perform the scan within the time period 622-1 after displaying the image C as shown in the state 533, according to the command 503. For example, the command 503 in FIG. 7 may be generated (or obtained) by the at least one processor 410 based on recognizing that the type of the content is a video, and transmitted to the display driving circuitry 431. As a non-limiting example, compared to the command 503 in FIG. 6, the command 503 in FIG. 7 may further indicate that an additional scan (e.g., a scan for repeated display of the image C) is not performed within the time period 622-1.

For example, since the second frame interval indicates a shortest time interval between image transmissions, the at least one processor 410 may not execute image transmission (e.g., image transmission from the at least one processor 410 executed through the interface 440 to display driving circuitry 431) from the timing 612. For example, since the second frame interval merely indicates that the image transmission is not executed within the time period 622-1 except the timing 513 and does not indicate that the image transmission from the timing 612 is necessarily performed, the at least one processor 410 may not execute the image transmission from the timing 612.

For example, the display driving circuitry 431 may recognize, identify, detect, determine, or confirm that the image transmission from the timing 612 is not executed at the timing 612 or before (or immediately before) the timing 612. For example, the display driving circuitry 431 may display the image C again on the display panel 110 as shown in the state 635, by scanning the image C (or image C maintained in the GRAM after the display of the image C as shown in the state 533) stored in the GRAM from the timing 612, according to the recognition and the command 503. As a non-limiting example, the display driving circuitry 431 may display the image C again on the display panel 110 as shown in the state 635, by scanning the image C stored in the GRAM from the timing 612 corresponding to a multiple of the second frame interval.

For example, a refresh rate on the display panel 110 when repeated display of the image C from timing 612 is not performed may be changed from a first refresh rate (e.g., 120 (Hz)) according to display of the image A as shown in the state 531, display of the image B as shown in the state 532, and display of the image C as shown in the state 533 to a third refresh rate lower than a second refresh rate (e.g., 24 (Hz)) corresponding to the second frame interval. For example, although a type of content is a video, the display driving circuitry 431 may perform the scan (or the repeated display of the image C) of the image C within the time period 622-2 because a change from the first refresh rate to the third refresh rate may cause the flickering. For example, the scan of the image C may be completed before the timing 613 at which image transmission from the at least one processor 410 may be executed, according to the command 503.

For example, since the second frame interval indicates a shortest time interval between image transmissions, the at least one processor 410 may not perform image transmission (e.g., image transmission from the at least one processor 410 executed through the interface 440 to display driving circuitry 431) from the timing 613. For example, since the second frame interval merely indicates that image transmission is not executed within the time period 622-2 except the timing 612, and does not indicate that the image transmission from the timing 613 is necessarily executed, the at least one processor 410 may not perform the image transmission from the timing 613.

For example, the display driving circuitry 431 may recognize, identify, detect, determine, or confirm that the image transmission from the timing 613 is not executed, at the timing 613 or before (or immediately before) the timing 613. For example, the display driving circuitry 431 may display the image C again on the display panel 110 as shown in the state 636, by scanning the image C (or image C maintained in the GRAM after the repeated display of the image C as shown in the state 635) stored in the GRAM from the timing 613, according to the recognition and the command 503. As a non-limiting example, the display driving circuitry 431 may display the image C again on the display panel 110 as shown in the state 636, by scanning the image C stored in the GRAM from the timing 613 corresponding to a multiple of the second frame interval.

For example, the display driving circuitry 431 may scan the image C in the GRAM within the time period 622-3 to perform repeated display of the image C on the display panel 110, according to the recognition and the command 503. For example, a refresh rate on the display panel 110 when repeated display of the image C from the timing 613 is not performed may be changed from the second refresh rate (e.g., 24 (Hz)) according to the display of the image C as shown in the state 533 and the repeated display of the image C as shown in the state 635 to a third refresh rate lower than the second refresh rate. For example, although a type of the content is a video, the display driving circuitry 431 may perform the scan (or the repeated display of the image C) of the image C within the time period 622-3 because the change from the second refresh rate to the third refresh rate may cause the flickering. For example, the scan of the image C may be completed before a timing (not shown) at which image transmission from the at least one processor 410 may be executed, according to the command 503.

As described above, the electronic device 100 may recognize (or identify) a type of the content, and change operations of the display driving circuitry 431 for reducing the flickering according to the recognition, so that power consumed by the display 430 may be reduced. For example, the recognition may be executed by the at least one processor 410, or executed by the display driving circuitry 431.

For example, since the display 430 (or the display driving circuitry 431) may recognize, before each of the timing 612 and the timing 613, that image transmission from the at least one processor 410 to the display driving circuitry 431 may be executed at each of the timing 612 and the timing 613 by using the command 503, the display 430 may be in the state for low power consumption within each of the time period 751 and the time period 653. For example, the electronic device 100 may reduce power consumed by the display 430, by using the command 503.

FIG. 7 illustrates an example of changing operations of the display driving circuitry 431 according to the type of the content, but it is merely exemplary. The operations of the display driving circuitry 431 for reducing the afterimage and/or the flickering may be changed according to another standard distinct from the type of the content. For example, the operations of the display driving circuitry 431 for reducing the afterimage and/or the flickering may not be executed according to luminance of the display panel 110 less than a reference luminance and/or illuminance around the electronic device 100 less than a reference illuminance.

As a non-limiting example, controlling the display driving circuitry 431 through the command may be executed for image transmission according to the second mode. This operation is illustrated in a description of FIG. 8.

Figure 8:
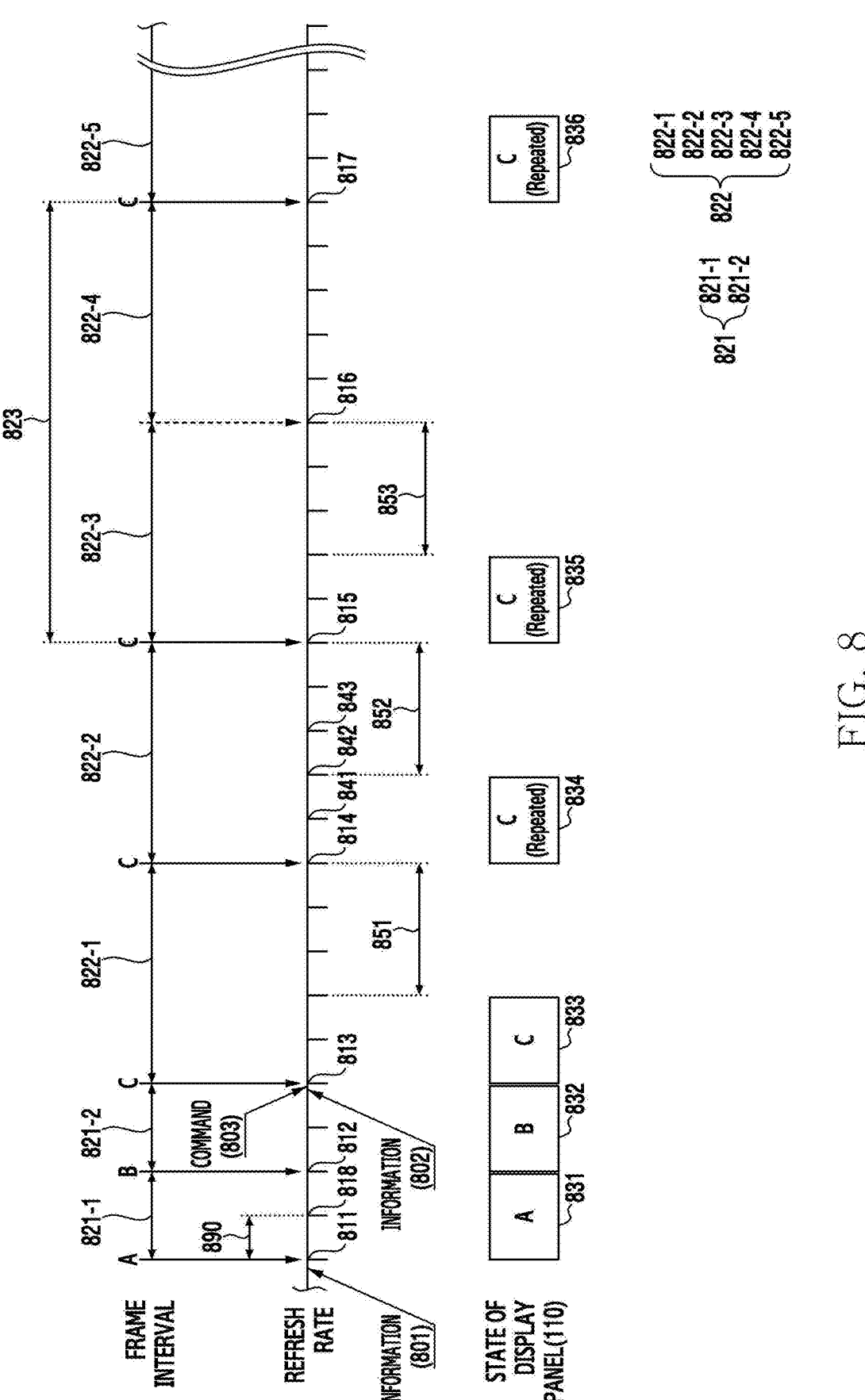
FIG. 8 illustrates an exemplary method of completing one or more scans for repeated display of an image based on a second mode, before a start timing of image transmission to be executed according to a frame interval.

FIG. 8 illustrates an exemplary method of completing one or more scans for repeated display of an image based on a second mode, before a start timing of image transmission to be executed according to a frame interval.

Referring to FIG. 8, information 801 on a first frame interval may be generated (or obtained) (or determined) by a second program 492 executed by at least one processor 410. For example, the information 801 may be transmitted (or provided) from the second program 492 to a first program 491, before (or immediately before) a timing 811 (or time point 811), according to execution of the at least one processor 410. For example, the first frame interval may correspond to a length of a time period 821. For example, the first frame interval may be indicated as a first value. For example, the first frame interval may correspond to the first value. For example, the first value may indicate the length of the time period 821. As a non-limiting example, the first value may correspond to $1/120$ (s), which is the length of the time period 821. For example, when a length of a time period 890 corresponding to the emission period exemplified above is indicated as a 1 step, the first value may be 2 steps. For example, the information 801 may indicate 2 steps.

For example, since the first frame interval indicates a minimum time interval between image transmissions (e.g., image transmission from the at least one processor 410 to display driving circuitry 431) to be executed from the timing 811, the information 801 may indicate that image transmission may be executed at the timing 811 and a timing 812. Since the first frame interval indicates the minimum time interval between image transmissions to be executed from the timing 811, the information 801 may indicate that image transmission is not executed at a timing 818.

For example, the at least one processor 410 may perform image transmission (e.g., image transmission from the at least one processor 410 executed through the interface 440 to the display driving circuitry 431) from the timing 811 within a time period 821-1, according to the information 801. For example, the image transmission from the timing 811 may be executed according to the second mode. For example, the display driving circuitry 431 may receive an image A from the at least one processor 410 according to the image transmission from the timing 811, and display the image A on the display panel 110 as shown in a state 831 by scanning the image A received from the at least one processor 410 according to the second mode.

For example, the at least one processor 410 may execute image transmission (e.g., image transmission from the at least one processor 410 executed through the interface 440 to the display driving circuitry 431) from the timing 812 (or time point 812) within a time period 821-2 according to the information 801. For example, the image transmission from the timing 812 may be executed according to the second mode. For example, the display driving circuitry 431 may receive an image B from the at least one processor 410 according to the image transmission from the timing 812, and display the image B on the display panel 110 as shown in a state 832 by scanning the image B received from the at least one processor 410 according to the second mode.

For example, the at least one processor 410 may change the frame interval from the first frame interval to a second frame interval longer than the first frame interval. For example, the at least one processor 410 may generate (or obtain) (or determine) information 802 on the second frame interval, by using a second program 492. For example, the information 802 may be transmitted (or provided) to the first program 491 from the second program 492, before (or immediately before) a timing 813 (or time point 813), according to execution of the at least one processor 410. For example, the second frame interval may correspond to a length of a time period 822. For example, the second frame interval may be indicated as a second value. For example, the second frame interval may correspond to the second value. For example, the second value may indicate the length of the time period 822. As a non-limiting example, the second value may correspond to $1/48$ (s), which is the length of the time period 822. For example, when the length of the time period 890 is indicated as a 1 step, the second value may be 5 steps. For example, the information 802 may indicate 5 steps.

For example, the at least one processor 410 may generate (or obtain) (or determine) a command 803, by using the first program 491, according to the information 802. For example, the command 803 may be generated according to a difference between the first frame interval and the second frame interval. For example, the command 803 may be generated according to the second frame interval. For example, the command 803 may be generated to reduce the afterimage and/or the flickering. For example, the at least one processor 410 may transmit the command 803 from a CPU 411 to a DPU 412, by using the first program 491. For example, the command 803 may be transmitted to the DPU 412, in order to indicate the change from the first frame interval to the second frame interval to the DPU 412.

For example, the at least one processor 410 (or the CPU 411) may control the DPU 412 to operate as described below, by transmitting the command 803. For example, the display driving circuitry 431 may be controlled according to controlling the DPU 412. For example, the at least one processor 410 may perform image transmission (e.g., image transmission from the at least one processor 410 executed through the interface 440 to the display driving circuitry 431) from the timing 813, according to the information 802. For example, the image transmission from the timing 813 may be executed according to the second mode. For example, the image transmission from the timing 813 may be executed by the DPU 412. For example, the display driving circuitry 431 may receive an image C from the at least one processor 410 according to the image transmission from the timing 813, and display the image C on the display panel 110 as shown in a state 833 by scanning the image C received from the at least one processor 410 according to the second mode. For example, since a difference between the first frame interval and the second frame interval indicates that occurrence probability of the flickering is relatively low, the DPU 412 may not execute image transmission for repeated display of the image C within a time period 822-1, after displaying the image C indicated by the state 833, according to the command 803. For example, since the image transmission for repeated display of the image C within the time period 822-1 is not executed after display of the image C indicated by the state 833, the display driving circuitry 431 may not perform a scan for repeated display of the image C within the time period 822-1 after displaying the image C as shown in the state 833. For example, the second frame interval is shorter than a reference frame interval, the DPU 412 may not execute image transmission for repeated display of the image C within the time period 822-1, after the display of the image C indicated by the state 833, according to the command 803.

For example, since the second frame interval indicates a shortest time interval between image transmissions, the CPU 411 may not transmit (or not provide) an image for image transmission from a timing 814 according to the second frame interval (or the information 802) to the DPU 412. For example, since the second frame interval merely indicates that image transmission is not executed within the time period 822-1 except for the timing 813 and does not indicate that the image transmission from the timing 814 is necessarily executed, the CPU 411 may not transmit an image for the image transmission from the timing 814 to the DPU 412.

For example, the DPU 412 may recognize, identify, detect, determine, or confirm that an image received from the CPU 411 is not present, for the image transmission from the timing 814, at the timing 814 or before (or immediately before) the timing 814. For example, the DPU 412 may perform the image transmission from the timing 814, by transmitting an image C (or image C maintained in the memory 420 after display of the image C as shown in the state 833) stored in the memory 420 (e.g., including dynamic random access memory (DRAM)) from the timing 814 to the display driving circuitry 431, according to the recognition and the command 803. As a non-limiting example, the DPU 412 may perform the image transmission from the timing 814, by transmitting the image C to the display driving circuitry 431 from the timing 814 corresponding to a multiple of the second frame interval.

For example, the image transmission from the timing 814 may be executed to perform repeated display of the image C. For example, the image transmission from the timing 814 may be performed within a time period 822-2 to reduce the flickering. For example, the image transmission from the timing 814 may be performed within the time period 822-2 according to the change from the first frame interval to the second frame interval. For example, the image transmission from the timing 814 may be completed before a timing 815, according to the command 803.

For example, the display driving circuitry 431 may receive the image C from the DPU 412 through the image transmission executed from the timing 814 according to the second mode. For example, the display driving circuitry 431 may perform the repeated display of the image C on the display panel 110 as shown in a state 834, by scanning the image C received from the DPU 412. For example, the scan of the image C may be executed within the time period 822-2 to reduce the flickering. For example, the scan of the image C may be performed within the time period 822-2 according to the change from the first frame interval to the second frame interval. For example, the scan of the image C may be completed before the timing 815.

FIG. 8 illustrates an example of executing the image transmission from the timing 814 within the time period

822-2. However, it is merely exemplary. For example, before the timing 815, the image transmission for the repeated display of the image C may be executed from one of a timing 841, a timing 842, and a timing 843, which are capable of completing the scan of the image C for the repeated display of the image C. For example, the scan of the image C (or the repeated display of the image C) performed according to the image transmission executed from the timing 841, the timing 842, or the timing 843 may be completed before the timing 815.

For example, since the second frame interval represents the shortest time interval between image transmissions, the CPU 411 may not transmit (or not provide) an image for the image transmission from the timing 815 according to the second frame interval (or information 802) to the DPU 412. For example, since the second frame interval merely indicates that image transmission is not executed within the time period 822-2 except for the timing 814 and does not indicate that the image transmission from the timing 815 is necessarily executed, the CPU 411 may not transmit to the DPU 412 an image for the image transmission from the timing 815.

For example, the DPU 412 may recognize, identify, detect, determine, or confirm that an image received from CPU 411 is not present, for the image transmission from the timing 815, at the timing 815 or before (or immediately before) the timing 815. For example, the DPU 412 may execute the image transmission from the timing 815, by transmitting the image C (or image C maintained in the memory 420 after display of the image C as shown in the state 834) stored in the memory 420 (e.g., including dynamic random access memory (DRAM)) from the timing 815 to the display driving circuitry 431, according to the recognition and the command 803. As a non-limiting example, the DPU 412 may execute the image transmission from the timing 815, by transmitting the image C to the display driving circuitry 431 from the timing 815 corresponding to a multiple of the second frame interval.

For example, the image transmission from the timing 815 may be executed to perform repeated display of the image C. For example, the image transmission from the timing 815 may be executed within a time period 822-3 to reduce the flickering. For example, the image transmission from the timing 815 may be performed within the time period 822-3, according to the change from the first frame interval to the second frame interval. For example, the image transmission from the timing 815 may be completed before a timing 816, according to the command 803.

For example, the display driving circuitry 431 may receive the image C from the DPU 412, through the image transmission executed from the timing 815, according to the second mode. For example, the display driving circuitry 431 may perform repeated display of the image C on the display panel 110 as shown in a state 835, by scanning the image C received from the DPU 412. For example, the scan of the image C may be executed within the time period 822-3 to reduce the flickering. For example, the scan of the image C may be completed before the timing 816.

For example, since the second frame interval indicates a shortest time interval between image transmissions, the CPU 411 may not transmit (or not provide) an image for image transmission from the timing 816 according to the second frame interval (or the information 802) to the DPU 412. For example, since the second frame interval merely indicates that image transmission is not executed within the time period 822-3 except for the timing 815 and does not indicate that the image transmission from the timing 816 is necessarily executed, the CPU 411 may not transmit the image for the image transmission from the timing 816 to the DPU 412.

For example, the DPU 412 may refrain from executing the image transmission from the timing 816. For example, since occurrence probability of the flickering due to a change in the refresh rate is reduced according to the repeated display of the image C as shown in the state 834 and the repeated display of the image C as shown in the state 835, the DPU 412 may not execute the image transmission from the timing 816. For example, a refresh rate on the display panel 110 may be changed from a first refresh rate (e.g., 120 hertz ((Hz)) corresponding to the time period 821-2 (e.g., the display of the image B as shown in the state 832) to a second refresh rate (e.g., 48 (Hz)) corresponding to the time period 822-1 (e.g., the display of the image C as shown in the state 833). For example, the refresh rate on the display panel 110 changed to the second refresh rate may be maintained according to the repeated display of the image C as shown in the state 834. For example, the DPU 412 may refrain from executing the image transmission from the timing 816 after the repeated display of the image C, as shown in the state 835, in order to reduce the refresh rate on the display panel 110.

For example, the refresh rate on the display panel 110 may be changed from the second refresh rate to a third refresh rate (e.g., 24 (Hz)), in accordance with not executing image transmission during a time period 823 (e.g., including the time period 822-3 and a time period 822-4). For example, since the refresh rate on the display panel 110 is not directly changed from the first refresh rate to the third refresh rate, and changed from the first refresh rate to the third refresh rate through the second refresh rate, occurrence probability of the flickering may be reduced.

For example, since the second frame interval indicates a shortest time interval between image transmissions, the CPU 411 may not transmit (or not provide) an image for image transmission from a timing 817 according to the second frame interval (or the information 802) to the DPU 412. For example, since the second frame interval merely indicates that image transmission is not executed within the time period 822-4 except for the timing 816 and does not indicate that the image transmission from the timing 817 is necessarily executed, the CPU 411 may not transmit an image for the image transmission from the timing 817 to the DPU 412.

For example, the DPU 412 may recognize, identify, detect, determine, or confirm that an image received from the CPU 411 is not present, for the image transmission from the timing 817, at the timing 817 or before (or immediately before) the timing 817. For example, the DPU 412 may execute the image transmission from the timing 817, by transmitting an image C (or image C maintained in the memory 420 after the repeated display of the image C as shown in the state 835) stored in the memory 420 (e.g., including dynamic random access memory (DRAM)) from the timing 817 to the display driving circuitry 431, according to the recognition and the command 803. As a non-limiting example, the DPU 412 may execute the image transmission from the timing 817, by transmitting the image C to the display driving circuitry 431 from the timing 817 corresponding to a multiple of the second frame interval.

For example, the image transmission from the timing 817 may be executed to perform repeated display of the image C. For example, the image transmission from the timing 817 may be executed within a time period 822-5, in order to reduce the flickering. For example, the image transmission from the timing 817 may be executed within the time period 822-5, in order to reduce the flickering caused by a change from the third refresh rate to a fourth refresh rate (e.g., a refresh rate lower than the third refresh rate). For example, the image transmission from the timing 817 may be completed before a timing (not shown) at which image transmission from the at least one processor 410 may be executed according to the command 803.

For example, the display driving circuitry 431 may receive the image C from the DPU 412 through the image transmission executed from the timing 817 according to the second mode. For example, the display driving circuitry 431 may perform repeated display of the image C on the display panel 110, as shown in a state 836, by scanning the image C received from the DPU 412. For example, the scan of the image C may be executed within the time period 822-5, in order to reduce the flickering.

As described above, the electronic device 100 may reduce the flickering caused by a change (e.g., a change from the first frame interval to the second frame interval) in the frame interval, by using the command 803 transmitted from the CPU 411 to the DPU 412.

For example, since the DPU 412 may recognize that an image for image transmission (or a new image) may be received from the CPU 411 at each of the timing 814, the timing 815, the timing 816, and the timing 817 by using the command 803 before each of the timing 814, the timing 815, the timing 816, and the timing 817, the DPU 412 may be in a state for low power consumption within each of a time period 851, a time period 852, a time period 853, and the time period 822-4. As a non-limiting example, the DPU 412 may transmit to the display driving circuitry 431 (or the display 430) each of data indicating that image transmission may be executed at the timing 814, data indicating that image transmission may be executed at the timing 815, data indicating that image transmission may be executed at the timing 816, and data indicating that image transmission may be executed at the timing 817. For example, since the display 430 (or the display driving circuitry 431) may recognize that image transmission from the DPU 412 to the display driving circuitry 431 may be executed at each of the timing 814, the timing 815, the timing 816, and the timing 817 by using these data before each of the timing 814, the timing 815, the timing 816, and the timing 817, the display 430 may be in a state for low power consumption within each of the time period 851, the time period 852, the time period 853, and the time period 822-4. For example, the electronic device 100 may reduce power consumed by the display 430, by using the command 803.

As a non-limiting example, controlling the display driving circuitry 431 through the command may be executed for image transmission according to the third mode. This operation is illustrated within descriptions of FIGS. 9 and 10.

Figure 9:
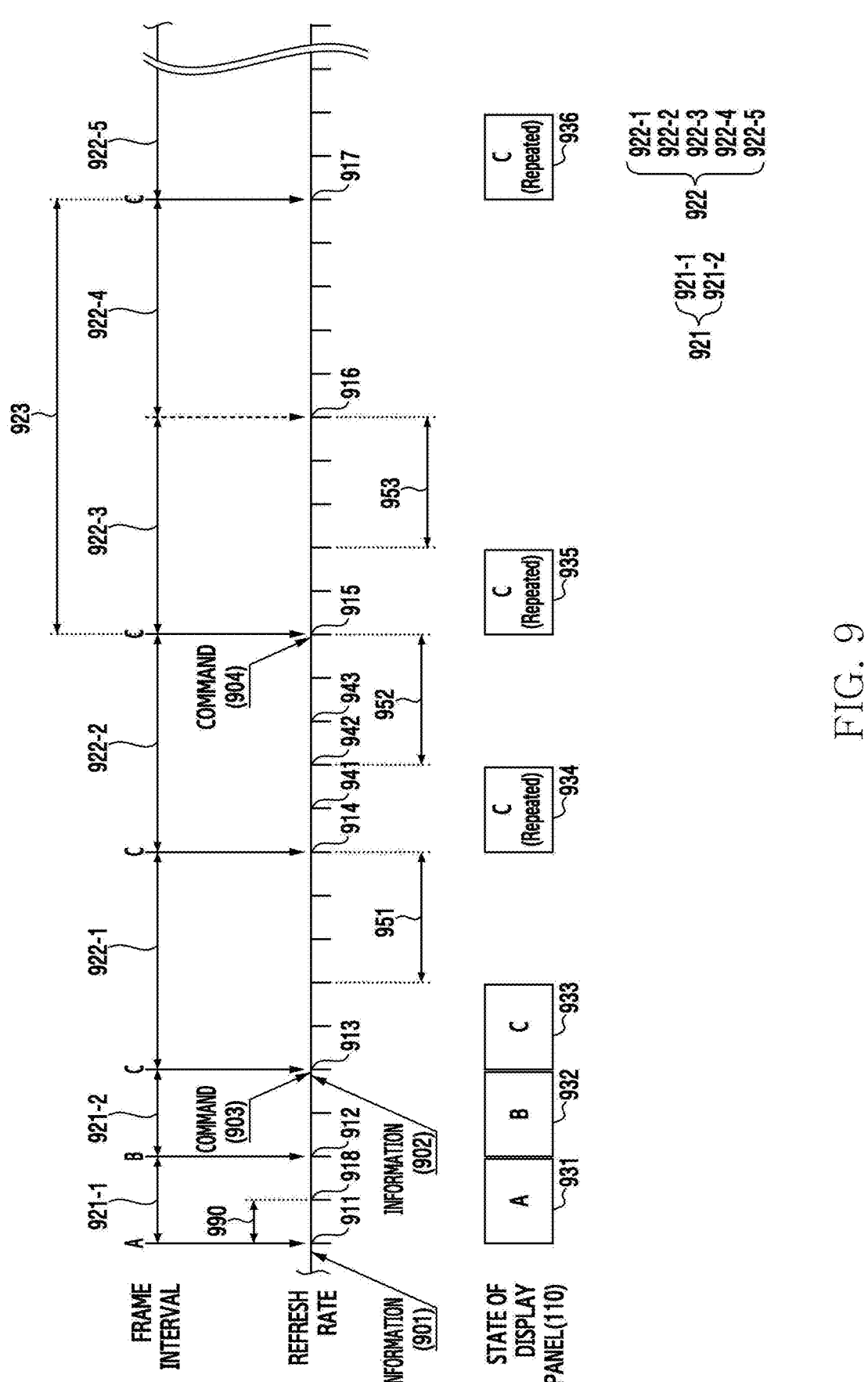
FIGS. 9 and 10 illustrate an exemplary method of completing one or more scans for repeated display of an image based on a third mode, before a start timing of image transmission to be executed according to a frame interval.
Figure 10:
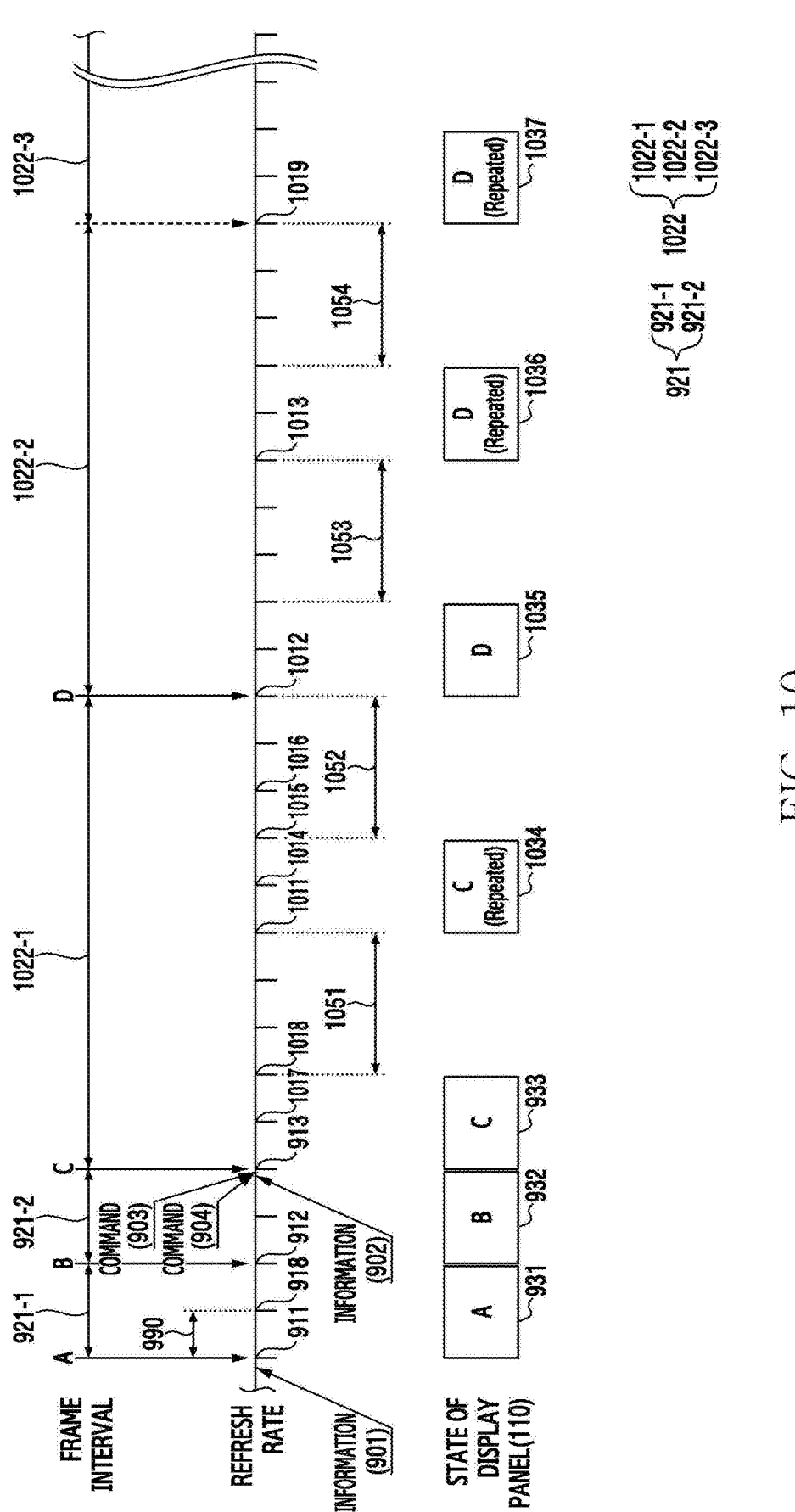

FIGS. 9 and 10 illustrate an exemplary method of completing one or more scans for repeated display of an image based on a third mode, before a start timing of image transmission to be executed according to a frame interval.

Referring to FIG. 9, information 901 on a first frame interval may be generated (or obtained) (or determined) by a second program 492 executed by at least one processor 410. For example, the information 901 may be transmitted (or provided) from the second program 492 to a first program 491 before (or immediately before) a timing 911 (or time point 911), according to execution of the at least one processor 410. For example, the first frame interval may correspond to a length of a time period 921. For example, the first frame interval may be indicated as a first value. For example, the first frame interval may correspond to the first value. For example, the first value may indicate the length of the time period 921. As a non-limiting example, the first value may correspond to $\frac{1}{120}$ (s), which is the length of the time period 921. For example, when a length of a time period 990 corresponding to the emission period exemplified above is indicated as a 1 step, the first value may be 2 steps. For example, the information 901 may indicate 2 steps.

For example, since the first frame interval indicates a minimum time interval between image transmissions (e.g., image transmission from the at least one processor 410 to display driving circuitry 431) to be executed from the timing 911, the information 901 may indicate that image transmission may be executed at the timing 911 and a timing 912. Since the first frame interval indicates a minimum time interval between image transmissions to be executed from the timing 911, the information 901 may indicate that image transmission is not executed at a timing 918.

For example, the at least one processor 410 may perform image transmission (e.g., image transmission from the at least one processor 410 executed through an interface 440 to the display driving circuitry 431) from the timing 911 within a time period 921-1, according to the information 901. For example, the image transmission from the timing 911 may be executed according to the third mode. As a non-limiting example, the image transmission from the timing 911 may be executed according to the third mode, while GRAM in the display driving circuitry 431 is not activated (or while the GRAM is deactivated). For example, the third mode for the image transmission from the timing 911 may correspond to the second mode in that the GRAM is not used. For example, the display driving circuitry 431 may receive an image A from the at least one processor 410 according to the image transmission from the timing 911, and display the image A on a display panel 110 as shown in a state 931, by scanning the image A received from the at least one processor 410 according to the third mode.

For example, the at least one processor 410 may perform image transmission (e.g., image transmission from the at least one processor 410 executed through the interface 440 to the display driving circuitry 431) from the timing 912 (or time point 912) within a time period 921-2 according to the information 901. For example, the image transmission from the timing 912 may be executed according to the third mode. As a non-limiting example, the image transmission from the timing 912 may be executed according to the third mode while the GRAM in the display driving circuitry 431 is not activated. For example, the third mode for the image transmission from the timing 912 may correspond to the second mode in that the GRAM is not used. For example, the display driving circuitry 431 may receive an image B from the at least one processor 410 according to the image transmission from the timing 912, and display the image B on the display panel 110 as shown in a state 932, by scanning the image B received from the at least one processor 410 according to the third mode.

For example, the at least one processor 410 may change the frame interval from the first frame interval to a second frame interval longer than the first frame interval. For example, the at least one processor 410 may generate (or obtain) (or determine) information 902 on the second frame interval, by using the second program 492. For example, the information 902 may be transmitted (or provided) from the second program 492 to the first program 491 before (or immediately before) a timing 913 (or time point 913) according to execution of the at least one processor 410. For example, the second frame interval may correspond to a length of a time period 922. For example, the second frame interval may be indicated as a second value. For example, the second frame interval may correspond to the second value. For example, the second value may indicate the length of the time period 922. As a non-limiting example, the second value may correspond to $\frac{1}{48}$ (s), which is the length of the time period 922. For example, when the length of the time period 990 is indicated as a 1 step, the second value may be 5 steps. For example, the information 902 may indicate 5 steps.

For example, the at least one processor 410 may generate (or obtain) (or determine) a command 903 by using the first program 491 according to the information 902. For example, the command 903 may be generated according to a difference between the first frame interval and the second frame interval. For example, the command 903 may be generated according to the second frame interval. For example, the command 903 may be generated to reduce the afterimage and/or the flickering. For example, the at least one processor 410 may transmit the command 903 from the CPU 411 to the display driving circuitry 431 by using the first program 491. For example, the command 903 may be transmitted to the display driving circuitry 931, in order to indicate the change from the first frame interval to the second frame interval to the display driving circuitry 431. For example, the command 903 may be transmitted from the CPU 411 to the display driving circuitry 431 through the DPU 412. For example, the DPU 412 may recognize the change from the first frame interval to the second frame interval according to the transmission of the command 903.

For example, the at least one processor 410 (or the CPU 411) may control the DPU 412 and the display driving circuitry 431 to operate as described below, by transmitting the command 903. For example, the at least one processor 410 may execute image transmission (e.g., image transmission from the at least one processor 410 executed through the interface 440 to the display driving circuitry 431) from the timing 913 according to the information 902. For example, the image transmission from the timing 913 may be executed according to the third mode. For example, the image transmission from the timing 913 may be executed by the DPU 412. As a non-limiting example, the image transmission from the timing 913 may be executed according to the third mode while the GRAM in the display driving circuitry 431 is not activated. For example, the third mode for the image transmission from the timing 913 may correspond to the second mode in that the GRAM is not used. For example, the display driving circuitry 431 may receive an image C from the at least one processor 410 according to the image transmission from the timing 913, and display the image C on the display panel 110 as shown in a state 933, by scanning the image C received from the at least one processor 410 according to the third mode. For example, since a difference between the first frame interval and the second frame interval indicates that occurrence probability of the flickering is relatively low, the DPU 412 may not execute image transmission for repeated display of the image C within a time period 922-1, after displaying the image C indicated by the state 933, according to the command 903. For example, since the image transmission for the repeated display of the image C is not executed within the time period 922-1 after the display of the image C indicated by the state 933, the display driving circuitry 431 may not perform a scan for the repeated display of the image C within the time period 922-1 after displaying the image C as shown in the state 933. For example, since the second frame interval is shorter than a reference frame interval, the DPU 412 may not execute the image transmission for the repeated display of the image C within the time period 922-1 after displaying the image C indicated by the state 933 according to the command 903.

For example, since the second frame interval indicates a shortest time interval between image transmissions, the CPU 411 may not transmit (or provide) an image for image transmission from a timing 914 according to the second frame interval (or information 902) to the DPU 412. For example, since the second frame interval merely indicates that image transmission is not executed within the time period 922-1 except for the timing 913 and does not indicate that the image transmission from the timing 914 is necessarily executed, the CPU 411 may not transmit an image for the image transmission from the timing 914 to the DPU 412.

For example, DPU 412 may recognize, identify, detect, determine, or confirm that an image received from the CPU 411 is not present, for the image transmission from the timing 914, at the timing 914 or before (or immediately before) the timing 914. For example, the DPU 412 may execute the image transmission from the timing 914, by transmitting an image C (or image C maintained in the memory 420 after the display of the image C as shown in the state 933) stored in the memory 420 (e.g., including dynamic random access memory (DRAM)) from the timing 914 to the display driving circuitry 431, according to the recognition and the command 903. As a non-limiting example, the DPU 412 may perform the image transmission from the timing 914, by transmitting the image C to the display driving circuitry 431 from the timing 914 corresponding to a multiple of the second frame interval.

For example, the image transmission from the timing 914 may be executed to perform repeated display of the image C. For example, the image transmission from the timing 914 may be executed within a time period 922-2 to reduce the flickering. For example, the image transmission from the timing 914 may be performed within the time period 922-2, according to the change from the first frame interval to the second frame interval. For example, the image transmission from the timing 914 may be completed before a timing 915, according to the command 903.

For example, the display driving circuitry 431 may receive the image C from the DPU 412 through the image transmission executed from the timing 914, according to the third mode. For example, the display driving circuitry 431 may perform repeated display of the image C on the display panel 110, as shown in a state 934, by scanning the image C received from the DPU 412. For example, the scan of the image C may be executed within the time period 922-2, in order to reduce the flickering. For example, the scan of the image C may be performed within the time period 922-2 according to the change from the first frame interval to the second frame interval. For example, the scan of the image C may be completed before the timing 915.

FIG. 9 illustrates an example of executing the image transmission from the timing 914 within the time period 922-2. However, it is merely exemplary. For example, the image transmission for the repeated display of the image C may be executed from one of a timing 941, a timing 942, and a timing 943, which are capable of completing a scan of the image C for the repeated display of the image C before the timing 915. For example, the scan (or the repeated display of the image C) of the image C performed according to image transmission executed from the timing 941, the timing 942, or the timing 943 may be completed before the timing 915.

For example, the DPU 412 may generate a command 904 for activating the GRAM in the display driving circuitry 431 before (or immediately before) the timing 915. For example, the DPU 412 may transmit the command 904 to the display driving circuitry 431. For example, the command 904 may indicate activating the GRAM. For example, the command 904 may indicate a request to store an image to be transmitted from the DPU 412 in the GRAM. As a non-limiting example, the command 904 may be referred to as still indication.

As a non-limiting example, the command 904 may be transmitted to the display driving circuitry 431 according to the image transmission from the timing 914. As a non-limiting example, the command 904 may be transmitted to the display driving circuitry 431, based on a failure to receive (or obtain) an image to be transmitted at the timing 915 from the CPU 411. As a non-limiting example, the command 904 may be transmitted to the display driving circuitry 431, based on determination that the image C is maintained on the display panel 110 for a longer time than a reference time (e.g., a time shorter than a total length of the time period 922-1 and the time period 922-2).

For example, since the second frame interval indicates a shortest time interval between image transmissions, the CPU 411 may not transmit (or provide) an image for image transmission from the timing 914 according to the second frame interval (or the information 902) to the DPU 412. For example, since the second frame interval merely indicates that image transmission is not executed within the time period 922-2 except for the timing 914 and does not indicate that the image transmission from the timing 915 is necessarily executed, the CPU 411 may not transmit the image for the image transmission from the timing 915 to the DPU 412.

For example, the DPU 412 may recognize, identify, detect, determine, or confirm that an image received from the CPU 411 is not present, for the image transmission from the timing 915, at the timing 915 or before (or immediately before) the timing 915. For example, the DPU 412 may execute the image transmission from the timing 915, by transmitting an image C (or image C maintained in the memory 420 after display of the image C as shown in the state 934) stored in the memory 420 (e.g., including dynamic random access memory (DRAM)) from the timing 915 to the display driving circuitry 431, according to the recognition and the command 903. As a non-limiting example, the DPU 412 may execute the image transmission from the timing 915, by transmitting the image C to the display driving circuitry 431 from the timing 915 corresponding to a multiple of the second frame interval.

For example, the image transmission from the timing 915 may be executed to perform repeated display of the image C. For example, the image transmission from the timing 915 may be executed within a time period 922-3, in order to reduce the flickering. For example, the image transmission from the timing 915 may be executed to store the image C in the GRAM activated according to the command 904. For example, the image transmission from the timing 915 may be completed before a timing 916, according to the command 903.

For example, the display driving circuitry 431 may receive the image C from the DPU 412, through the image transmission executed from the timing 915 according to the third mode. For example, the display driving circuitry 431 may perform the repeated display of the image C on the display panel 110 as shown in a state 935, by scanning the image C received from the DPU 412. For example, the scan of the image C may be executed within the time period 922-3 to reduce the flickering. For example, the scan of the image C may be completed before the timing 916. For example, the display driving circuitry 431 may store the image C received from the DPU 412 through the image transmission executed from the timing 915 in the GRAM activated according to the command 904.

For example, since the second frame interval indicates a shortest time interval between image transmissions, the at least one processor 410 may not execute the image transmission (e.g., image transmission from the at least one processor 410 executed through the interface 440 to the display driving circuitry 431) from the timing 916. For example, since the second frame interval merely indicates that image transmission is not executed within the time period 922-3 except for the timing 915 and does not indicate that the image transmission from the timing 916 is necessarily executed, the at least one processor 410 may not perform the image transmission from the timing 916. For example, the CPU 411 may not transmit to the DPU 412 the image for the image transmission from the timing 916.

For example, the display driving circuitry 431 may refrain from performing a scan of the image C stored in the GRAM according to the command 904, from the timing 916. For example, since occurrence probability of the flickering due to a change in the refresh rate is reduced according to the repeated display of the image C as shown in state 934 and the repeated display of the image C as shown in the state 935, the display driving circuitry 431 may not perform the scan of the image C from the timing 916. For example, the refresh rate on the display panel 110 may be changed from a first refresh rate (e.g., 120 hertz (Hz)) corresponding to the time period 921-2 (e.g., the display of the image B as shown in the state 932) to a second refresh rate (e.g., 48 (Hz)) corresponding to the time period 922-1 (e.g., the display of the image C as shown in state 933). For example, the refresh rate on the display panel 110 changed to the second refresh rate may be maintained according to the repeated display of the image C as shown in the state 934. For example, the display driving circuitry 431 may refrain from the scan of the image C from the timing 916 after the repeated display of the image C as shown in the state 935, in order to reduce the refresh rate on the display panel 110. For example, the refresh rate on the display panel 110 may be changed from the second refresh rate to a third refresh rate (e.g., 24 (Hz)), according to a scan of the image C not performed during a time period (e.g., including the time period 922-3 and a time period 922-4). For example, since the refresh rate on the display panel 110 is not directly changed from the first refresh rate to the third refresh rate, and changed from the first refresh rate to the third refresh rate through the second refresh rate, the occurrence probability of the flickering may be reduced.

For example, the display driving circuitry 431 may not perform the scan of the image C from the timing 916 according to the command 903. For example, the scan of the image C from the timing 916 may not be performed to reduce power consumed by the display 430.

For example, since the second frame interval indicates a shortest time interval between image transmissions, the at least one processor 410 may not perform image transmission (e.g., image transmission from the at least one processor 410 executed through the interface 440 to display driving circuitry 431) from a timing 917. For example, Since the second frame interval merely indicates that image transmission is not executed within the time period 922-4 except for the timing 916 and does not indicate that the image transmission from the timing 917 is necessarily executed, the at least one processor 410 may not perform the image transmission from the timing 917. For example, the CPU 411 may not transmit to the DPU 412 an image for the image transmission from the timing 917. For example, the DPU 412 may refrain from the image transmission from the timing 917, based on transmitting the command 904 to the display driving circuitry 431.

For example, the display driving circuitry 431 may recognize, identify, detect, determine, or confirm that the image transmission from the timing 917 is not executed, at the timing 917 or before (or immediately before) the timing 917. For example, the display driving circuitry 431 may display the image C again on the display panel 110 as shown in a state 936, by scanning the image C stored in the GRAM according to the command 904 from the timing 917, according to the recognition and the command 903. As a non-limiting example, the display driving circuitry 431 may display the image C again on the display panel 110 as shown in the state 936, by scanning the image C stored in the GRAM from the timing 917 corresponding to a multiple of the second frame interval.

For example, the display driving circuitry 431 may scan the image C in the GRAM within a time period 922-5, in order to perform repeated display of the image C on the display panel 110, according to the recognition and the command 903. For example, the scan (or the repeated display of the image C) of the image C may be performed within the time period 922-5, in order to reduce the flickering. For example, the scan (or the repeated display of the image C) of the image C may be performed within the time period 922-5, in order to reduce the flickering caused by a change from the third refresh rate to a fourth refresh rate (e.g., a refresh rate lower than the third refresh rate). For example, the scan of the image C may be completed before a timing (not shown) at which image transmission from the at least one processor 410 may be executed, according to the command 903.

As described above, the electronic device 100 may reduce the flickering caused by a change (e.g., change from the first frame interval to the second frame interval) in the frame interval, by using the command 903 and/or the command 904 transmitted from the at least one processor 410 to the display driving circuitry 431.

For example, since the DPU 412 may recognize that an image for image transmission (or a new image) may be received from the CPU 411 at each of the timing 914, the timing 915, the timing 916, and the timing 917 by using the command 903 before each of the timing 914, the timing 915, the timing 916, and the timing 917, the DPU 412 may be in a state for low power consumption within each of a time period 951, a time period 952, a time period 953, and a time period 922-4. As a non-limiting example, the DPU 412 may transmit each of data indicating that image transmission may be executed at the timing 914 and data indicating that image transmission may be executed at the timing 915 to the display driving circuitry 431 (or the display 430). For example, since the display 430 (or the display driving circuitry 431) may recognize that image transmission from the DPU 412 to the display driving circuitry 431 may be executed at each of the timing 914 and the timing 915 by using these data before each of the timing 914 and the timing 915, the display 430 may be in a state for low power consumption within each of the time period 951 and the time period 952. For example, since the display 430 may recognize that image transmission from the at least one processor 410 to the display driving circuitry 431 may be executed within each of the timing 916 and the timing 917, by using the command 903 and the command 904, before the timing 916 and the timing 917, the display 430 may be in a state for low power consumption within each of the time period 953 and the time period 922-4. For example, the electronic device 100 may reduce power consumed by the display 430, by using the command 903 and/or the command 904.

For example, referring to FIG. 10, the information 901 on the first frame interval may be generated (or obtained) (or determined) by the second program 492 executed by the at least one processor 410. For example, the information 901 may be transmitted (or provided) from the second program 492 to the first program 491 before (or immediately before) the timing 911 (or time point 911) according to execution of the at least one processor 410. For example, the first frame interval may correspond to a length of the time period 921. For example, the first frame interval may be indicated as a first value. For example, the first frame interval may correspond to the first value. For example, the first value may indicate the length of the time period 921. As a non-limiting example, the first value may correspond to $\frac{1}{120}$ (s), which is the length of the time period 921. For example, when the length of the time period 990 corresponding to the emission period exemplified above is indicated as a 1 step, the first value may be 2 steps. For example, the information 901 may indicate 2 steps.

For example, since the first frame interval indicates a minimum time interval between image transmissions (e.g., image transmission from the at least one processor 410 to the display driving circuitry 431) to be executed from the timing 911, the information 901 may indicate that image transmission may be executed at the timing 911 and the timing 912. Since the first frame interval indicates a minimum time interval between image transmissions to be executed from the timing 911, the information 901 may indicate that image transmission is not executed at the timing 918.

For example, the at least one processor 410 may perform image transmission (e.g., image transmission from the at least one processor 410 executed through the interface 440 to the display driving circuitry 431) from the timing 911 within the time period 921-1 according to the information 901. For example, the image transmission from the timing 911 may be executed according to the third mode. As a non-limiting example, the image transmission from the timing 911 may be executed according to the third mode while the GRAM in the display driving circuitry 431 is not activated (or while the GRAM is deactivated). For example, the third mode for the image transmission from the timing 911 may correspond to the second mode in that the GRAM is not used. For example, the display driving circuitry 431 may receive an image A from the at least one processor 410 according to the image transmission from the timing 911, and display the image A on the display panel 110 as shown in the state 931 by scanning the image A received from the at least one processor 410 according to the third mode.

For example, the at least one processor 410 may perform image transmission (e.g., image transmission from the at least one processor 410 executed through the interface 440 to the display driving circuitry 431) from the timing 912 (or time point 912) within the time period 921-2 according to the information 901. For example, the image transmission from the timing 912 may be executed according to the third mode. As a non-limiting example, the image transmission from the timing 912 may be executed according to the third mode while the GRAM in the display driving circuitry 431 is deactivated. For example, the third mode for the image transmission from the timing 912 may correspond to the second mode in that the GRAM is not used. For example, the display driving circuitry 431 may receive an image B from the at least one processor 410 according to the image transmission from the timing 912, and display the image B on the display panel 110 as shown in the state 932 by scanning the image B received from the at least one processor 410 according to the third mode.

For example, the at least one processor 410 may change the frame interval from the first frame interval to a second frame interval longer than the first frame interval. For example, the at least one processor 410 may generate (or obtain) (or determine) information 902 on the second frame interval, by using the second program 492. For example, the information 902 may be transmitted (or provided) from the second program 492 to the first program 491 according to execution of the at least one processor 410 before (or immediately before) the timing 913. For example, the second frame interval may correspond to a length of a time period 1022. The second frame interval may be indicated as a second value. The second frame interval may correspond to the second value. For example, the second value may indicate the length of the time period 1022. As a non-limiting example, the second value may correspond to $\frac{1}{24}$ (s), which is the length of the time period 1022. For example, when the length of the time period 990 is indicated as a 1 step, the second value may be 10 steps. For example, the information 902 may indicate 10 steps.

For example, the at least one processor 410 may generate (or determine) a command 903 by using the first program 491 according to the information 902. For example, the command 903 may be generated according to a difference between the first frame interval and the second frame interval. For example, the command 903 may be generated according to the second frame interval. For example, the command 903 may be generated to reduce the afterimage and/or the flickering. For example, the at least one processor 410 may transmit the command 903 from the CPU 411 to the display driving circuitry 431 by using the first program 491. For example, the command 903 may be transmitted to the display driving circuitry 931, in order to indicate to the display driving circuitry 431 the change from the first frame interval to the second frame interval. For example, the command 903 may be transmitted from the CPU 411 to the display driving circuitry 431 through the DPU 412. For example, the DPU 412 may recognize the change from the first frame interval to the second frame interval according to the transmission of the command 903.

For example, the DPU 412 may generate the command 904 to activate the GRAM in the display driving circuitry 431 before (or immediately before) the timing 913. For example, the DPU 412 may transmit the command 904 to the display driving circuitry 431. For example, the command 904 may indicate activating the GRAM. For example, the command 904 may indicate a request to store an image to be transmitted from the DPU 412 in the GRAM. As a non-limiting example, the command 904 may be referred to as the still indication.

As a non-limiting example, the command 904 may be generated according to the command 903 and transmitted to the display driving circuitry 431 according to the command 903. For example, the command 904 may be transmitted to the display driving circuitry 431 before (or immediately before) the timing 913.

For example, the at least one processor 410 may control the display driving circuitry 431 to operate as described below, by transmitting the command 903. For example, the at least one processor 410 may execute image transmission (e.g., image transmission from the at least one processor 410 executed through the interface 440 to the display driving circuitry 431) from the timing 913 according to the information 902. For example, the image transmission from the timing 913 may be executed according to the third mode. For example, the image transmission from the timing 913 may be executed according to the third mode, while the GRAM in the display driving circuitry 431 is activated according to the command 904. For example, the display driving circuitry 431 may receive an image C from the DPU 412 through the image transmission executed from the timing 913 according to the third mode. For example, the display driving circuitry 431 may display the image C on the display panel 110 as shown in the state 933, by scanning the image C received from the DPU 412. For example, the display driving circuitry 431 may store the image C received from the DPU 412 through the image transmission executed from the timing 913 in the GRAM activated according to the command 904.

For example, since a difference between the first frame interval and the second frame interval indicates that occurrence probability of the flickering is relatively high, the display driving circuitry 431 may perform a scan for repeated display of the image C within a time period 1022-1 after the display of the image C indicated by the state 933 according to the command 903. For example, the display driving circuitry 431 may display the image C again on the display panel 110 as shown in a state 1034, by scanning the image C stored in the GRAM according to the command 904. For example, the display driving circuitry 431 may scan the image C in the GRAM from a timing 1011 within the time period 1022-1, in order to perform the repeated display of the image C on the display panel 110 according to the command 903. For example, the scan (or the repeated display of the image C) of the image C may be performed within the time period 1022-1 according to the change from the first frame interval to the second frame interval. For example, since changing the refresh rate on the display panel 110 from a first refresh rate (e.g., 120 (Hz)) corresponding to the time period 921-2 (e.g., the display of the image B as shown in the state 932) to a second refresh rate (e.g., 24 (Hz)) corresponding to the time period 1022-1 (or the second frame interval) indicates that occurrence probability of the flickering is relatively high, the display driving circuitry 431 may scan the image C in the GRAM from the timing 1011 in order to change the refresh rate on the display panel 110 from the first refresh rate a third refresh rate (e.g. 48 (Hz)) (e.g., a refresh rate between the first refresh rate and the second refresh rate). For example, the scan of the image C may be completed before a timing 1012 when image transmission from the at least one processor 410 may be executed according to the command 903.

FIG. 10 illustrates an example of performing the scan of the image C from the timing 1011 within the time period 1022-1, for the repeated display of the image C. However, it is merely exemplary. For example, the scan of the image C may be performed from one of a timing 1014, a timing 1015, and a timing 1016, which are capable of completing the scan of the image C before the timing 1012. For example, the scan of the image C performed from the timing 1014, the timing 1015, or the timing 1016 may be completed before the timing 1012 according to the command 903.

As a non-limiting example, the display driving circuitry 431 may perform the scan of the image C stored in the GRAM, in order to perform the repeated display of the image C on the display panel 110 from a timing within the time period 1022-1 corresponding to a divisor of the second value (e.g., 10 steps) indicating the second frame interval. For example, divisors of the second value are 1, 2, 5, and 10. For example, a timing within the time period 1022-1 corresponding to 1, which is a divisor of the second value, may be a timing 1017, a timing within the time period 1022-1 corresponding to 2, which is a divisor of the second value, may be a timing 1018, a timing within the time period 1022-1 corresponding to 5, which is a divisor of the second value, may be a timing 1011, and a timing within the time period 1022-1 corresponding to 10, which is a divisor of the second value, may be a timing 1012. For example, since the timing 1017 is within a time period in which a scan of the image C for the display of the image C as shown in the state 933 is performed, the timing 1017 may be unusable as a start timing of the scan of the image C for the repeated display of the image C. For example, since the timing 1018 is outside the time period in which the scan of the image C for the display of the image C as shown in the state 933 is performed, the timing 1018 may be usable as the start timing of the scan of the image C for the repeated display of the image C. For example, since the timing 1011 is outside the time period in which the scan of image C for the display of the image C as shown in the state 933 is performed, the timing 1011 may be usable as the start timing of the scan of the image C for the repeated display of the image C. Since the timing 1012 is a timing to which image transmission (e.g., image transmission from the at least one processor 410 to the display driving circuitry 431) may be executed according to the second frame interval in spite of being outside the time period in which the scan of the image C for the display of the image C as shown in the state 933 is performed, the timing 1012 may be unusable as the start timing of the scan of the image C for the repeated display of the image C. For example, the timing 1018 and the timing 1011 among the timing 1017, the timing 1018, the timing 1011, and the timing 1012, which are timings within the time period 1022-1 corresponding to the divisor of the second value may be usable as the start timing of the scan of the image C for the repeated display of the image C. For example, the display driving circuitry 431 may perform the scan of the image C for the repeated display of the image C from the timing 1018, unlike the illustration of FIG. 10, which performs the scan of the image C for the repeated display of the image C from the timing 1011. For example, the display driving circuitry 431 may perform the scan of the image C for the repeated display of the image C from the timing 1011.

For example, the at least one processor 410 may execute image transmission (e.g., image transmission from the at least one processor 410 executed through the interface 440 to the display driving circuitry 431) from the timing 1012 according to the information 902 (or the second frame interval).

For example, the image transmission from the timing 1012 may be executed by the DPU 412. For example, the image transmission from the timing 1012 may be executed according to the third mode. For example, the image transmission from the timing 1012 may be executed according to the third mode, while the GRAM in the display driving circuitry 431 is activated according to the command 904. For example, an image D transmitted to the display driving circuitry 431 according to the image transmission from the timing 1012 may be generated (or obtained) by the CPU 411.

For example, the display driving circuitry 431 may receive the image D from the DPU 412 through the image transmission executed from the timing 1012 according to the third mode. For example, the display driving circuitry 431 may perform display of the image D on the display panel 110 as shown in a state 1035, by scanning the image D received from the DPU 412. For example, the display driving circuitry 431 may store the image D received from the DPU 412 through the image transmission executed from the timing 1012 in the GRAM activated according to the command 904.

For example, the display driving circuitry 431 may perform a scan for repeated display of the image D within a time period 1022-2, after the display of the image D indicated by the state 1035 according to the command 903 and the command 904. For example, the display driving circuitry 431 may display the image D again on the display panel 110 as shown in a state 1036, by scanning the image D stored in the GRAM according to the command 904, according to the command 903. For example, the display driving circuitry 431 may scan the image D in the GRAM from a timing 1013 within the time period 1022-2, in order to perform the repeated display of the image D on the display panel 110 according to the command 903. For example, the scan of the image D in the GRAM may be completed before a timing 1019 when image transmission from the at least one processor 410 may be executed, according to command 903.

For example, since the second frame interval indicates a shortest time interval between image transmissions, the at least one processor 410 may not perform image transmission (e.g., image transmission from the at least one processor 410 executed through the interface 440 to the display driving circuitry 431) from the timing 1019. For example, since the second frame interval merely indicates that image transmission is not executed within the time period 1022-2 except for the timing 1012 and does not indicate that the image transmission from the timing 1019 is necessarily executed, the at least one processor 410 may not perform the image transmission from the timing 1019. For example, the CPU 411 may not transmit an image for the image transmission from the timing 1019 to the DPU 412. For example, the DPU 412 may refrain from the image transmission from the timing 1019, based on transmitting the command 904 to the display driving circuitry 431.

For example, the display driving circuitry 431 may recognize, identify, detect, determine, or confirm that the image transmission from the timing 1019 is not executed, at the timing 1019 or before (or immediately before) the timing 1019. For example, the display driving circuitry 431 may display the image D again on the display panel 110 as shown in a state 1037, by scanning the image D stored in the GRAM according to the command 904 from the timing 1019, according to the recognition and the command 903. As a non-limiting example, the display driving circuitry 431 may display the image D again on the display panel 110 as shown in the state 1037, by scanning the image D stored in the GRAM from the timing 1019 corresponding to a multiple of the second frame interval.

For example, the display driving circuitry 431 may scan the image D in the GRAM within a time period 1022-3, in order to perform repeated display of the image D on the display panel 110, according to the recognition and the command 903. For example, the scan of the image D (or the repeated display of the image D) may be performed within the time period 1022-3 to reduce the flickering. For example, the scan of the image D may be completed before a timing (not shown) when image transmission from the at least one processor 410 may be executed, according to the command 903.

As described above, the electronic device 100 may reduce the flickering caused by a change in the frame interval (e.g., change from the first frame interval to the second frame interval), by using the command 903 and the command 904 transmitted from the at least one processor 410 to the display driving circuitry 431.

For example, since the display 430 (or the display driving circuitry 431) may recognize that image transmission from the at least one processor 410 to the display driving circuitry 431 may be executed at each of the timing 1012 and the timing 1019 by using the command 903 and the command 904 before each of the timing 1012 and the timing 1019, the display 430 may be in the state for low power consumption within each of a time period 1051, a time period 1052, a time period 1053, and a time period 1054. For example, the electronic device 100 may reduce power consumed by the display 430 by using the command 903 and the command 904.

FIG. 10 illustrates an example in which the command 903 and the command 904 are transmitted, but it is merely exemplary. The command 903 and the command 904 may be integrated into a single command.

As a non-limiting example, controlling the display driving circuitry 431 through the command may be executed for image transmission according to the fourth mode. This operation is illustrated within a description of FIG. 11.

Figure 11:
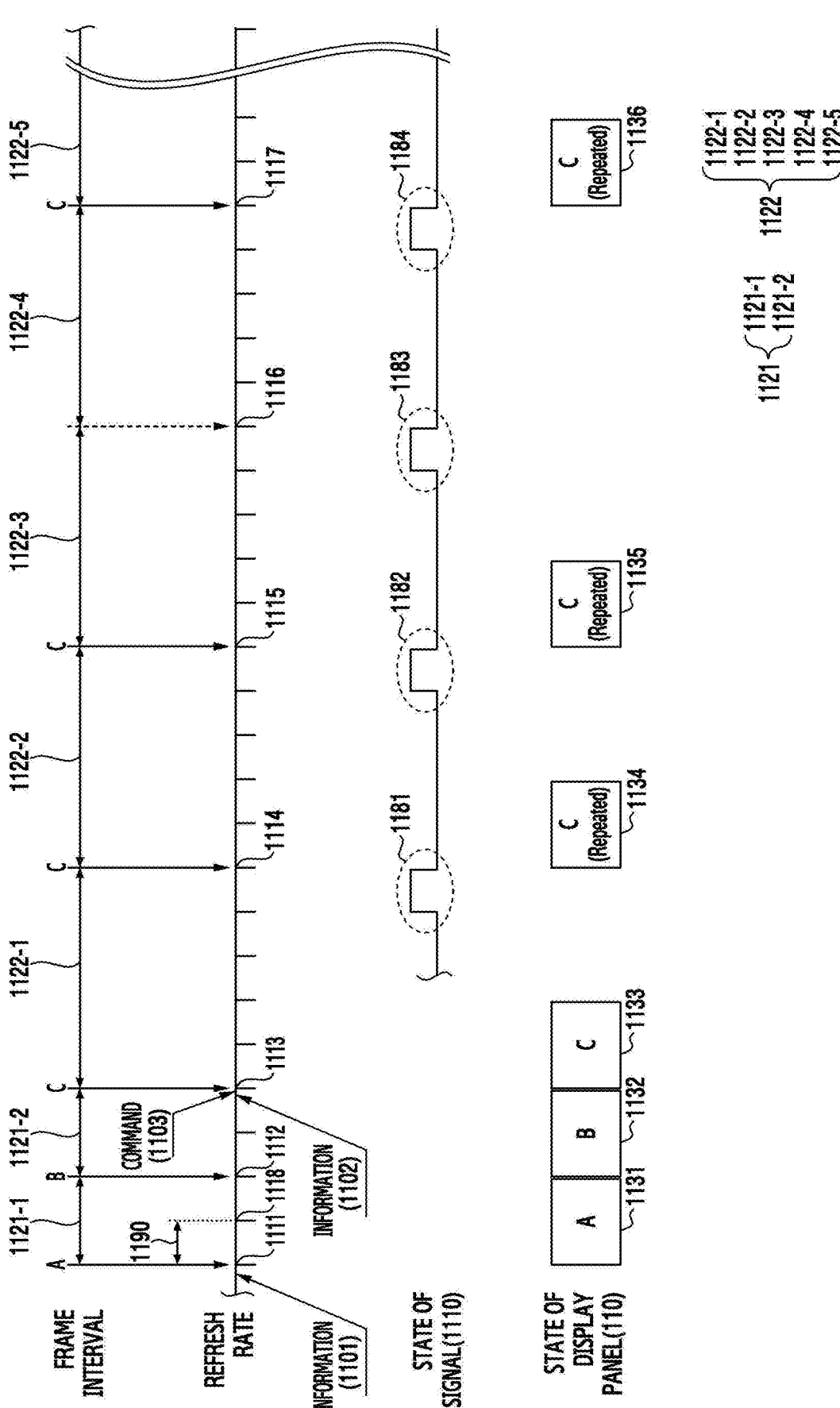
FIG. 11 illustrates an exemplary method of completing one or more scans for repeated display of an image based on a fourth mode, before a start timing of image transmission to be executed according to a frame interval.

FIG. 11 illustrates an exemplary method of completing one or more scans for repeated display of an image based on a fourth mode, before a start timing of image transmission to be executed according to a frame interval.

Referring to FIG. 11, information 1101 on a first frame interval may be generated (or obtained) (or determined) by a second program 492 executed by at least one processor 410. For example, the information 1101 may be transmitted (or provided) to a first program 491 from the second program 492 before (or immediately before) a timing 1111 (or time point 1111), according to execution of the at least one processor 410. For example, the first frame interval may correspond to a length of a time period 1121. For example, the first frame interval may be indicated as a first value. For example, the first frame interval may correspond to the first value. For example, the first value may indicate the length of the time period 1121. As a non-limiting example, the first value may correspond to $1/120$ (s), which is the length of the time period 1121. For example, when a length of a time period 1190 corresponding to the emission period described above is indicated as a 1 step, the first value may be 2 steps. For example, the information 1101 may indicate 2 steps.

For example, since the first frame interval indicates a minimum time interval between image transmissions (e.g., image transmission from the at least one processor 410 to the display driving circuitry 431) to be executed from the timing 1111, the information 1101 may indicate that image transmission may be executed at the timing 1111 and a timing 1112. Since the first frame interval indicates the minimum time interval between image transmissions to be executed from the timing 1111, the information 1101 may indicate that image transmission is not executed at a timing 1118.

For example, the at least one processor 410 may perform image transmission (e.g., image transmission from the at least one processor 410 executed through the interface 440 to the display driving circuitry 431) from the timing 1111 within a time period 1121-1 according to the information 1101. For example, the image transmission from the timing 1111 may be executed according to the fourth mode. For example, the display driving circuitry 431 may receive an image A from the at least one processor 410 according to the image transmission from the timing 1111, and display the image A on the display panel 110 as shown in a state 1131, by scanning the image A received from the at least one processor 410 according to the fourth mode.

For example, the at least one processor 410 may execute image transmission (e.g., image transmission from the at least one processor 410 executed through the interface 440 to the display driving circuitry 431) from the timing 1112 (or time point 1112) within a time period 1121-2 according to the information 1101. For example, the image transmission from the timing 1112 may be executed according to the fourth mode. For example, the display driving circuitry 431 may receive an image B from the at least one processor 410 according to the image transmission from the timing 1112, and display the image B on the display panel 110 as shown in a state 1132, by scanning the image B received from the at least one processor 410 according to the fourth mode.

For example, the at least one processor 410 may change the frame interval from the first frame interval to a second frame interval longer than the first frame interval. For example, the at least one processor 410 may generate (or obtain) (or determine) information 1102 on the second frame interval, by using the second program 492. For example, the information 1102 may be transmitted (or provided) from the second program 492 to the first program 491 before (or immediately before) a timing 1113 (or time point 1113), according to execution of the at least one processor 410. For example, the second frame interval may correspond to a length of a time period 1122. For example, the second frame interval may be indicated as a second value. For example, the second frame interval may correspond to the second value. For example, the second value may indicate the length of the time period 1122. As a non-limiting example, the second value may correspond to ¼₈ (s), which is the length of the time period 1122. For example, when the length of the time period 1190 is indicated as a 1 step, the second value may be 5 steps. For example, the information 802 may indicate 5 steps.

For example, the at least one processor 410 may use the first program 491 to generate (or obtain) (or determine) a command 1103 according to the information 1102. For example, the command 1103 may be generated according to a difference between the first frame interval and the second frame interval. For example, the command 1103 may be generated according to the second frame interval. For example, the command 1103 may be generated to reduce the afterimage and/or the flickering. For example, the command 1103 may be generated to change a state of a signal 1100 according to the second frame interval. For example, the command 1103 may be generated to indicate to request an image C according to the second frame interval. For example, the at least one processor 410 may transmit the command 1103 from the at least one processor 410 to the display driving circuitry 431, by using the first program 491. For example, the command 1103 may be transmitted to the display driving circuitry 431, in order to indicate the change from the first frame interval to the second frame interval to the display driving circuitry 431. For example, the command 1103 may be transmitted to the display driving circuitry 431, in order to change a state of the signal 1100 according to the second frame interval. For example, the command 1103 may be transmitted to the display driving circuitry 431 to indicate to request the image C according to the second frame interval.

For example, the at least one processor 410 may control the display driving circuitry 431 to operate as described below, by transmitting the command 1103. For example, the at least one processor 410 may perform image transmission (e.g., image transmission from the at least one processor 410 executed through the interface 440 to the display driving circuitry 431) from the timing 1113 within a time period 1122-1, according to the information 1102. For example, the image transmission from the timing 1113 may be executed according to the fourth mode. For example, the display driving circuitry 431 may receive the image C from the at least one processor 410 according to the image transmission from the timing 1113, and display the image C on the display panel 110 as shown in a state 1133, by scanning the image C received from the at least one processor 410 according to the fourth mode.

For example, the display driving circuitry 431 may change the state of the signal 1100 as shown in a state 1181, in order to receive the image C at a timing 1114 corresponding to the second frame interval, according to the command 1103. For example, a change in the state of the signal 1100 as shown in the state 1181 may be executed within the time period 1122-1. The change in the state of the signal 1100 as shown in the state 1181 may be performed before the timing 1114 corresponding to the second frame interval. As a non-limiting example, the change in the state of the signal 1100 as shown in the state 1181 may be performed before N steps from the timing 1114 (herein, N is a natural number greater than or equal to 1 and less than or equal to 4). For example, the signal 1100 may be referred to as a tearing effect (TE) signal. For example, the at least one processor 410 may perform image transmission from the timing 1114, according to the information 1102 (or the second frame interval) and the change in the state of the signal 1100 as shown in the state 1181. As a non-limiting example, the at least one processor 410 may execute the image transmission from the timing 1114 corresponding to a multiple of the second frame interval. For example, the display driving circuitry 431 may receive the image C through the image transmission from the timing 1114. For example, the display driving circuitry 431 may perform repeated display of the image C on the display panel 110 as shown in a state 1134, by scanning the image C received from the at least one processor 431. For example, a refresh rate on the display panel 110 may be changed from a first refresh rate (e.g., 120 (Hz)) to a second refresh rate (e.g., 48 (Hz)), according to the repeated display of the image C as shown in the state 1134.

For example, the display driving circuitry 431 may change the state of the signal 1100 as shown in a state 1182, in order to receive the image C at a timing 1115 corresponding to the second frame interval, according to the command 1103. For example, a change in the state of the signal 1100 as shown in the state 1182 may be executed within the time period 1122-2. The change in the state of the signal 1100 as shown in the state 1182 may be performed before the timing 1115 corresponding to the second frame interval. As a non-limiting example, the change in the state of the signal 1100 as shown in the state 1182 may be performed before N steps from the timing 1115. For example, the at least one processor 410 may perform image transmission from the timing 1115, according to the information 1102 (or the second frame interval) and the change in the state of the signal 1100 as shown in the state 1182. As a non-limiting example, the at least one processor 410 may execute the image transmission from the timing 1115 corresponding to a multiple of the second frame interval. For example, the display driving circuitry 431 may receive the image C through the image transmission from the timing 1115. For example, the display driving circuitry 431 may perform repeated display of the image C on the display panel 110 as shown in a state 1135, by scanning the image C received from the at least one processor 431. For example, the refresh rate on the display panel 110 may be maintained as the second refresh rate according to the repeated display of the image C as shown in the state 1135.

For example, the display driving circuitry 431 may change the state of the signal 1100 as shown in a state 1183, in order to receive the image C at a timing 1116 corresponding to the second frame interval, according to the command 1103. For example, a change in the state of the signal 1100 as shown in the state 1183 may be executed within a time period 1122-3. The change in the state of the signal 1100 as shown in the state 1183 may be performed before the timing 1116 corresponding to the second frame interval. As a non-limiting example, the change in the state of the signal 1100 as shown in the state 1183 may be performed before N steps from the timing 1116. For example, the at least one processor 410 may refrain from image transmission from the timing 1116, in order to reduce the refresh rate on the display panel 110. For example, since the second frame interval indicates a shortest time interval between image transmissions, the at least one processor 410 may not execute the image transmission from the timing 1116 according to the second frame interval (or the information 1102). For example, since the second frame interval merely indicates that image transmission is not executed within the time period 1122-3 except for the timing 1115 and does not indicate that the image transmission from the timing 1116 is necessarily executed, the at least one processor 410 may refrain from the image transmission from the timing 1116. For example, the refresh rate on the display panel 110 may be changed from the second refresh rate to a third refresh rate (e.g., 24 (Hz)) lower than the second refresh rate (e.g., 48 (Hz)), according to refraining from the image transmission from the timing 1116.

For example, the display driving circuitry 431 may change the state of the signal 1100 as shown in a state 1184, in order to receive the image C at a timing 1117 corresponding to the second frame interval, according to the command 1103. For example, the change in the state of the signal 1100 as shown in the state 1184 may be executed within a time period 1122-4. The change in the state of the signal 1100 as shown in the state 1184 may be performed before a timing (not shown) corresponding to the second frame interval. As a non-limiting example, the change in the state of the signal 1100 as shown in the state 1184 may be performed before N steps from the timing 1117. For example, the at least one processor 410 may execute image transmission from the timing 1117, according to the information 1102 (or the second frame interval) and the change in the state of the signal 1100 as shown in the state 1184. As a non-limiting example, the at least one processor 410 may execute the image transmission from the timing 1117 corresponding to a multiple of the second frame interval. For example, the display driving circuitry 431 may receive the image C through the image transmission from the timing 1117. For example, the display driving circuitry 431 may perform repeated display of the image C on the display panel 110 as shown in a state 1136, by scanning the image C received from the at least one processor 431. For example, the refresh rate on the display panel 110 may be changed from the second refresh rate to the third refresh rate (e.g., 24 (Hz)), according to the repeated display of the image C as shown in the state 1136. For example, the image transmission from the timing 1117 may be executed to reduce the flickering. For example, the image transmission from the timing 1117 may be completed before an end time of a time period 1122-5.

Although not illustrated in FIG. 11, the at least one processor 410 may adjust (or change) a timing of image transmission from the at least one processor 410 to the display driving circuitry 431 when a timing of the change in the state of the signal 1100 as shown in the state 1181, the state 1182, the state 1183, and the state 1184 is different from a timing corresponding to the second frame interval.

As described above, the electronic device 100 may use the command 1103 to reduce the flickering caused by a change in the frame interval (e.g., a change from the first frame interval to the second frame interval).

Referring back to FIG. 4, a brightness level of the display panel 110 may be changed. For example, the change in the brightness level may be gradually executed to enhance visual quality. For example, a change from a first brightness level to a second brightness level may be executed by changing the brightness level from the first brightness level to the second brightness level through one or more third brightness levels between the first brightness level and the second brightness level. For example, the change in the brightness level may be executed according to the frame interval. Gradually changing the brightness level according to the frame interval is illustrated in a description below. In this document, changing the brightness level is merely exemplary. For example, gradually changing the brightness level according to the frame interval may be applied to a gradual change in a pixel control parameter related to image processing.

For example, the at least one processor 410 may generate a command (or signal) to change a brightness level of the display panel 110 to the second brightness level while displaying an image on the display panel 110 set according to the first brightness level.

For example, the command may indicate a brightness change period (e.g., a dimming period when the second brightness level is lower than the first brightness level). For example, the brightness change period may indicate a time allocated for a change from the first brightness level to the second brightness level. For example, the brightness change period may include a plurality of time periods. As a non-limiting example, the brightness change period may be set as the number of steps (e.g., it may vary according to the frame interval). As a non-limiting example, the brightness change period may be set to a fixed time (e.g., it is fixed regardless of the frame interval).

For example, the command may indicate the second brightness level. For example, the second brightness level may be determined (or identified) (or obtained) by the CPU 411. For example, the second brightness level may be determined based on the second program 492 executed by the CPU 411. For example, the second brightness level may be determined based on the first program 491 executed by the CPU 411.

For example, in order to control the display driving circuitry 431 to change the brightness level from the first brightness level to the second brightness level by using a plurality of time periods within the brightness change period based on the command, the at least one processor 410 may allocate the plurality of time periods, so that a first frame interval corresponding to a first value (e.g., 2N steps) divided by a value (e.g., N steps) (herein, N is a natural number greater than or equal to 1) corresponding to a length of each of the plurality of time periods does not include one or more blank periods that are not used for the gradual change, and a second frame interval corresponding to a second value (e.g., 2N+1 steps) not divided by the value includes the one or more blank periods. For example, when the one or more blank periods included in the second frame interval are plural, the one or more blank periods may be separated within the second frame interval according to the allocation. For example, when the one or more blank periods included in the second frame interval are plural, the one or more blank periods may be uniformly distributed within the second frame interval according to the allocation.

As a non-limiting example, the allocation may be executed by the CPU 411 using the first program 491. As a non-limiting example, the allocation may be executed by the DPU 412. As a non-limiting example, the allocation may be executed by the display driving circuitry 431.

For example, one or more third brightness levels between the first brightness level and the second brightness level, which are used for the gradual change, may be determined (or obtained) (or identified) by using the first program 491 executed by the CPU 411. For example, the one or more third brightness levels may be determined by the DPU 412. For example, the one or more third brightness levels may be determined by the display driving circuitry 431.

Figure 12:
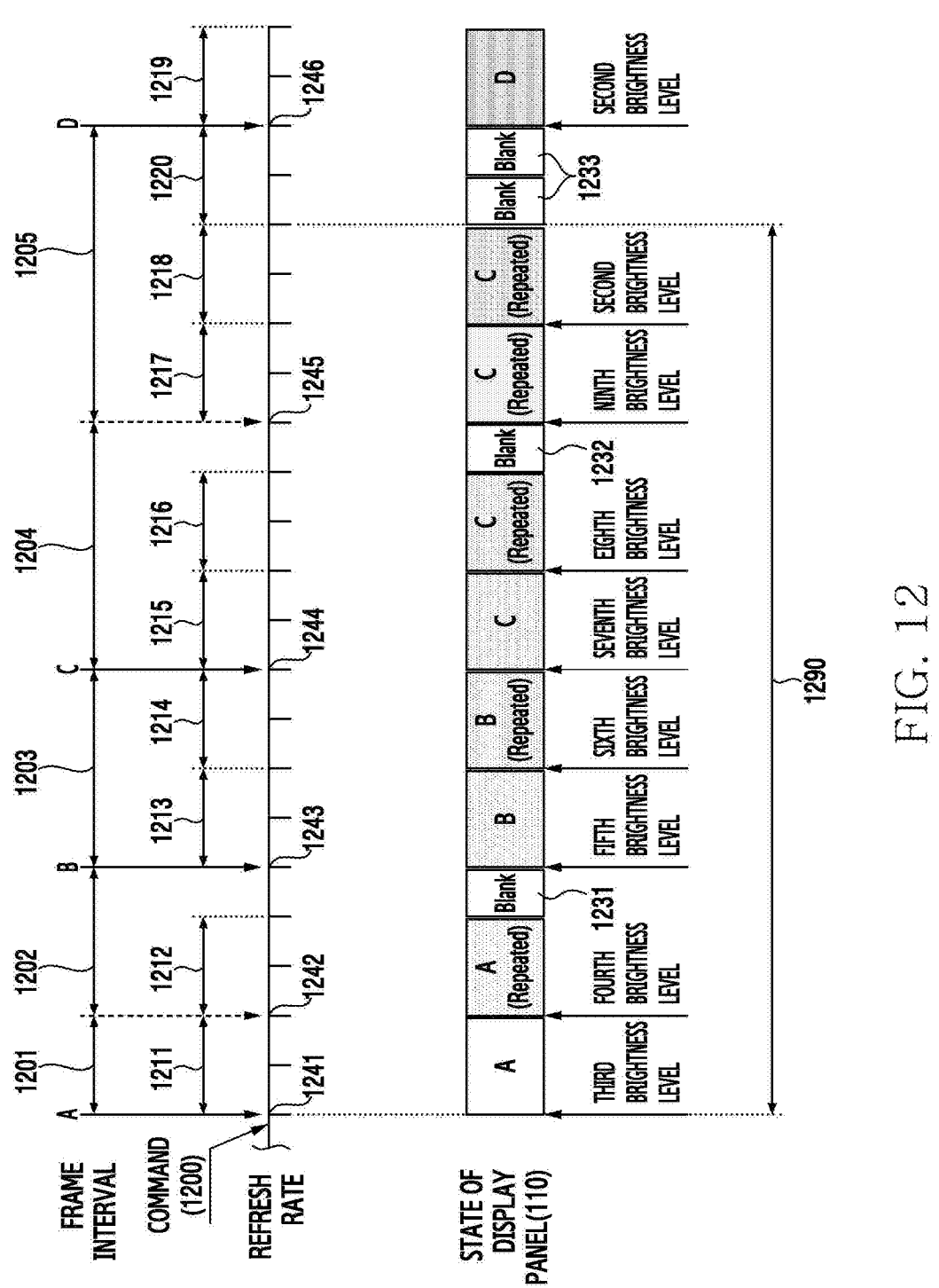
FIGS. 12 to 14 illustrate an exemplary method of gradually changing from a first brightness level to a second brightness level according to a frame interval during a brightness change period.
Figure 13:
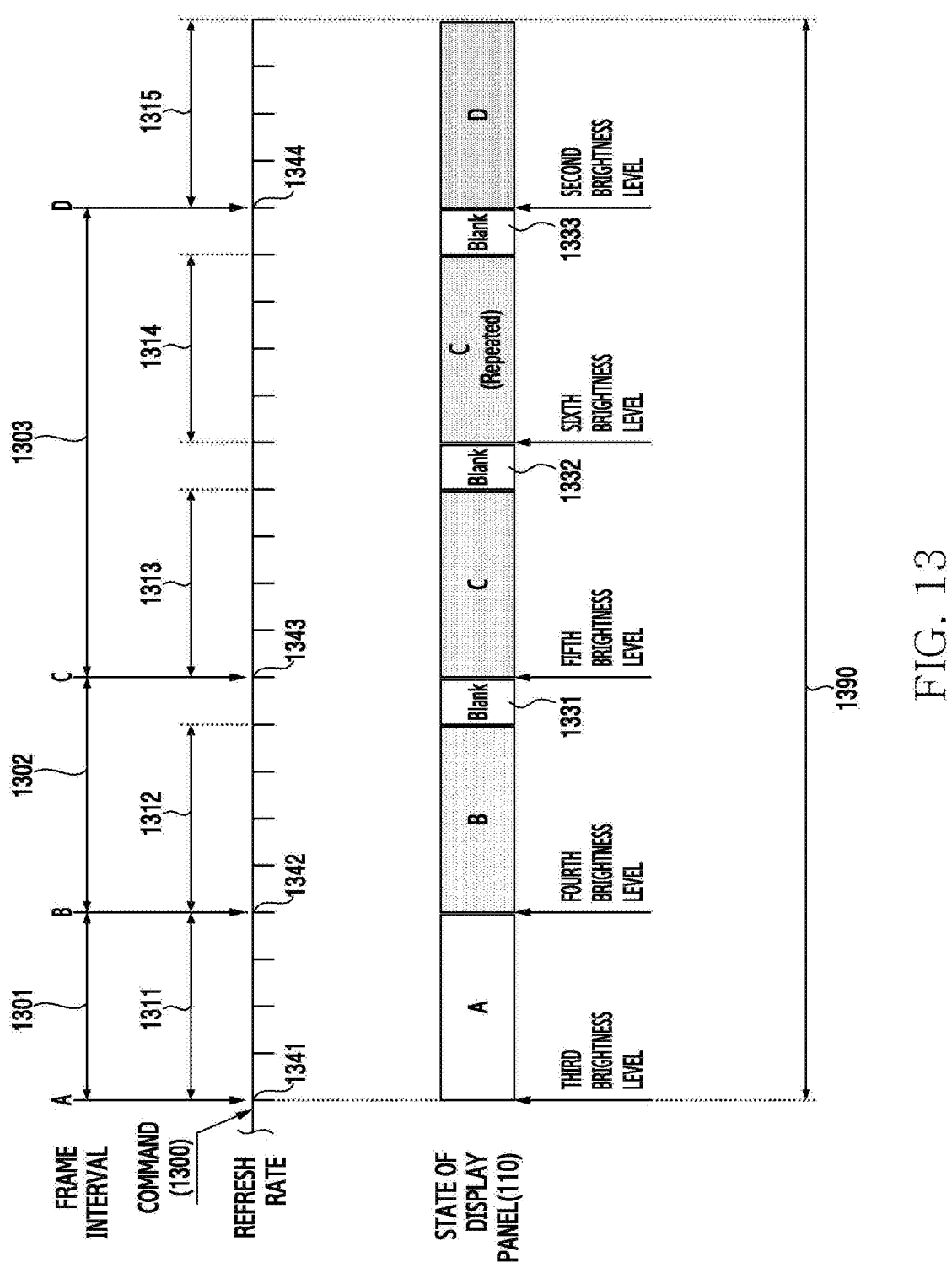
Figure 14:
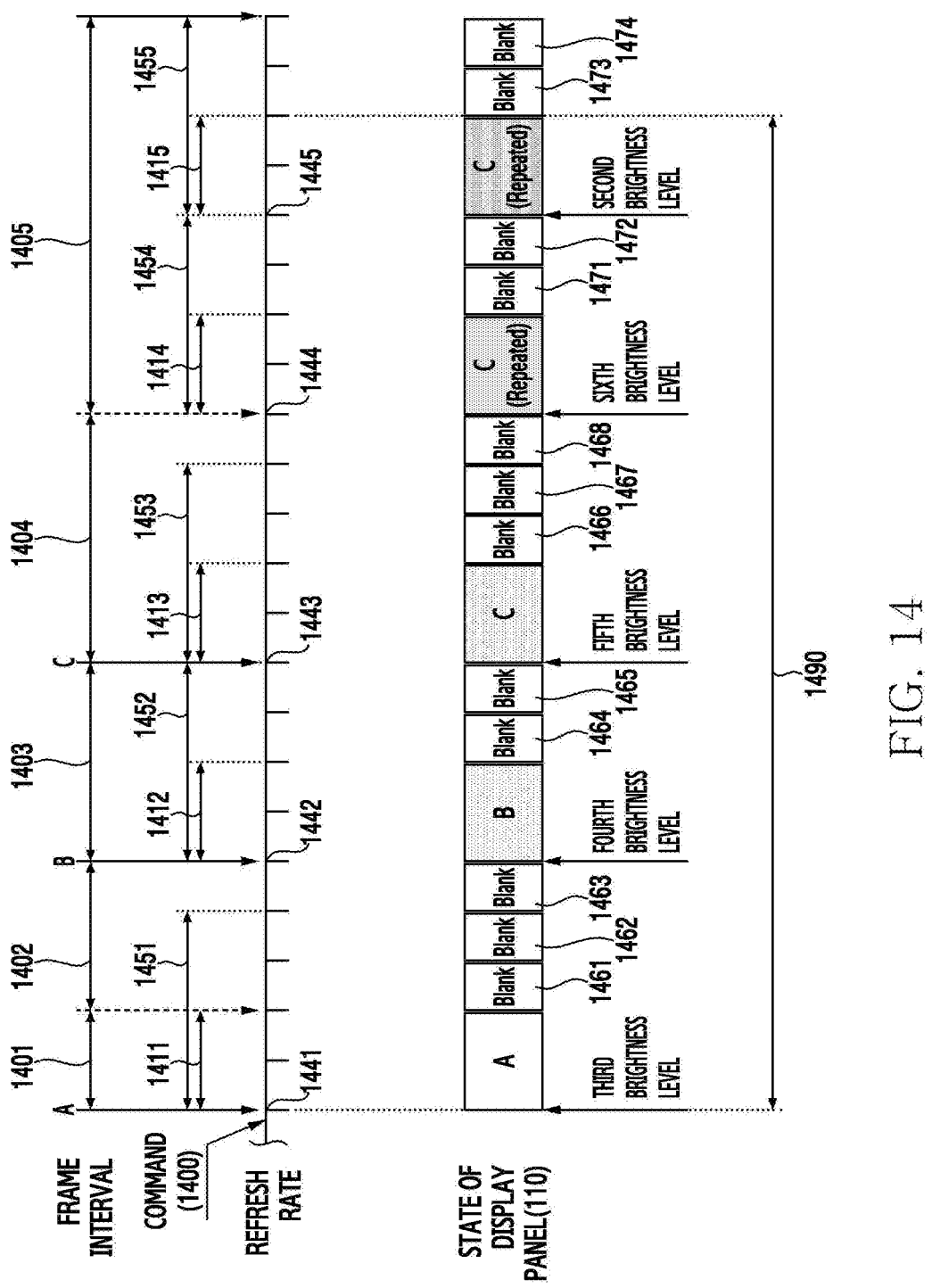

The above operations are illustrated in descriptions of FIGS. 12 to 14.

FIGS. 12 to 14 illustrate an exemplary method of gradually changing from a first brightness level to a second brightness level according to a frame interval during a brightness change period.

Referring to FIG. 12, at least one processor 410 may generate a command 1200. For example, the command 1200 may indicate a brightness change period 1290. For example, the command 1200 may indicate changing a brightness level of a display panel 110 through 8 steps. For example, the command 1200 may indicate a second brightness level as a target brightness level. For example, the command 1200 may indicate that the brightness level of the display panel 110 set to a first brightness level is changed to a second brightness level lower than the first brightness level. For example, the second brightness level may be determined (or identified) (or obtained) by the CPU 411. For example, the second brightness level may be determined based on the second program 492 executed by the CPU 411. For example, the second brightness level may be determined based on the first program 491 executed by the CPU 411.

For example, the command 1200 may be transmitted from the CPU 411 to the DPU 412. For example, the command 1200 may be transmitted from the at least one processor 410 to the display driving circuitry 431. For example, the command 1200 may be transmitted from the CPU 411 to the display driving circuitry 431 through the DPU 412.

For example, a plurality of time periods (e.g., a time period 1211, a time period 1212, a time period 1213, a time period 1214, a time period 1215, a time period 1216, a time period 1217, and a time period 1218) within the brightness change period 1290 may be allocated according to the frame interval. As a non-limiting example, the allocation may be executed by the CPU 411 using the first program 491. As a non-limiting example, the allocation may be executed by the DPU 412. As a non-limiting example, the allocation may be executed by the display driving circuitry 431. The following descriptions describe an example in which the at least one processor 410 (e.g., the CPU 411 or the DPU 412) allocates the plurality of time periods, but it is merely exemplary. Allocating the plurality of time periods may be executed by the display driving circuitry 431.

For example, a unit (e.g., a value corresponding to a length of each of the plurality of time periods) of time for a gradual change from the first brightness level to the second brightness level according to command 1200 may be 2 steps (e.g., corresponding to a length of each of the time periods 1211, the time period 1212, the time period 1213, the time period 1214, the time period 1215, the time period 1216, the time period 1217, and the time period 1218).

For example, a frame interval 1201 (e.g., 2 steps) may be the first frame interval corresponding to the first value divided by the unit (e.g., 2 steps). For example, since the frame interval 1201 (e.g., 2 steps) is divided by the unit (e.g., 2 steps), the at least one processor 410 may allocate a time period 1211 to the frame interval 1201 without a blank period (e.g., a blank period 1231).

For example, the at least one processor 410 may transmit an image A to the display driving circuitry 431 at a timing 1241. For example, the transmission of the image A may be performed to display the image A within the time period 1211 according to the brightness level of the display panel 110 set to a third brightness level lower than the first brightness level and higher than the second brightness level. For example, the third brightness level may be determined (or identified) (or obtained) by the CPU 411. For example, the third brightness level may be determined based on the second program 492 executed by the CPU 411. For example, the third brightness level may be determined based on the first program 491 executed by the CPU 411. For example, the third brightness level may be determined by the DPU 412. For example, the third brightness level may be determined by the display driving circuitry 431.

For example, a frame interval 1202 (e.g., 3 steps) changed from the frame interval 1201 may be the second frame interval corresponding to the second value not divided by the unit (e.g., 2 steps). For example, since the frame interval 1202 (e.g., 3 steps) is not divided by the unit (e.g., 2 steps), the at least one processor 410 may allocate the blank period 1231 and the time period 1212 to the frame interval 1202.

For example, an image (e.g., image B) following the image A may not be generated (or obtained) by the CPU 411 until a timing 1242. For example, although the image following the image A is not generated by the CPU 411, the display driving circuitry 431 may perform repeated display of the image A within the time period 1212 according to the brightness level of the display panel 110 set to a fourth brightness level lower than the third brightness level and higher than the second brightness level. For example, the fourth brightness level may be determined (or identified) (or obtained) by the CPU 411. For example, the fourth brightness level may be determined based on the second program 492 executed by the CPU 411. For example, the fourth brightness level may be determined based on the first program 491 executed by the CPU 411. For example, the fourth brightness level may be determined by the DPU 412. For example, the fourth brightness level may be determined by the display driving circuitry 431. For example, a scan for the repeated display of the image A may be performed using the image A in the memory 420 (or the GRAM in the display driving circuitry 431).

For example, a frame interval 1203 (e.g., 4 steps) changed from the frame interval 1202 may be the first frame interval divided by the unit (e.g., 2 steps). For example, since the frame interval 1203 (e.g., 4 steps) is divided by the unit (e.g., 2 steps), the at least one processor 410 may allocate the time period 1213 and the time period 1214 to the frame interval 1203 without a blank period.

For example, the at least one processor 410 may transmit an image B to the display driving circuitry 431 at a timing 1243. For example, the transmission of the image B may be executed to display the image B within the time period 1213, according to the brightness level of the display panel 110 set to a fifth brightness level lower than the fourth brightness level and higher than the second brightness level. For example, the fifth brightness level may be determined (or identified) (or obtained) by the CPU 411. For example, the fifth brightness level may be determined based on the second program 492 executed by the CPU 411. For example, the fifth brightness level may be determined based on the first program 491 executed by the CPU 411. For example, the fifth brightness level may be determined by the DPU 412. For example, the fifth brightness level may be determined by the display driving circuitry 431.

For example, the display driving circuitry 431 may display the image B again within the time period 1214, according to the brightness level of the display panel 110 set to a sixth brightness level lower than the fifth brightness level and higher than the second brightness level. For example, the sixth brightness level may be determined (or identified) (or obtained) by the CPU 411. For example, the sixth brightness level may be determined based on the second program 492 executed by the CPU 411. For example, the sixth brightness level may be determined based on the first program 491 executed by the CPU 411. For example, the sixth brightness level may be determined by the DPU 412. For example, the sixth brightness level may be determined by the display driving circuitry 431. For example, a scan for repeated display of the image B performed within the time period 1214 may be performed using the image B in the memory 420 (or the GRAM).

For example, a frame interval 1204 (e.g., 5 steps) changed from the frame interval 1203 may be the second frame interval not divided by the unit (e.g., 2 steps). For example, the frame interval 1204 (e.g., 5 steps) is not divided by the unit (e.g., 2 steps), the at least one processor 410 may allocate a blank period 1232, the time period 1215, and the time period 1216 to the frame interval 1204.

For example, the at least one processor 410 may transmit an image C to the display driving circuitry 431 at a timing 1244. For example, the transmission of the image C may be executed to display the image C within a time period 1215 according to the brightness level of display panel 110 set to a seventh brightness level lower than the sixth brightness level and higher than the second brightness level. For example, the seventh brightness level may be determined (or identified) (or obtained) by the CPU 411. For example, the seventh brightness level may be determined based on the second program 492 executed by the CPU 411. For example, the seventh brightness level may be determined based on the first program 491 executed by the CPU 411. For example, the seventh brightness level may be determined by the DPU 412. For example, the seventh brightness level may be determined by the display driving circuitry 431.

For example, the display driving circuitry 431 may display the image C again within the time period 1216 according to the brightness level of the display panel 110 set to an eighth brightness level lower than the seventh brightness level and higher than the second brightness level. For example, the eighth brightness level may be determined (or identified) (or obtained) by the CPU 411. For example, the eighth brightness level may be determined based on the second program 492 executed by the CPU 411. For example, the eighth brightness level may be determined based on the first program 491 executed by the CPU 411. For example, the eighth brightness level may be determined by the DPU 412. For example, the eighth brightness level may be determined by the display driving circuitry 431. For example, a scan for repeated display of the image C performed within the time period 1216 may be performed using the image C in the memory 420 (or the GRAM).

For example, a frame interval 1205 (e.g., 6 steps) changed from the frame interval 1204 may be the first frame interval divided by the unit (e.g., 2 steps). For example, although the frame interval 1205 (e.g., 6 steps) may be divided by the unit (e.g., 2 steps), since the brightness change period 1290 is 8 steps, the at least one processor 410 may allocate a blank period 1233, the time period 1217, and the time period 1218 to the frame interval 1205.

For example, an image (e.g., image D) following the image C may not be generated (or obtained) by the CPU 411 until a timing 1245. For example, although the image following the image C is not generated by the CPU 411, the display driving circuitry 431 may perform repeated display of the image C within the time period 1217 according to the brightness level of the display panel 110 set to a ninth brightness level lower than the eighth brightness level and higher than the second brightness level. For example, the ninth brightness level may be determined (or identified) (or obtained) by the CPU 411. For example, the ninth brightness level may be determined based on the second program 492 executed by the CPU 411. For example, the ninth brightness level may be determined based on the first program 491 executed by the CPU 411. For example, the ninth brightness level may be determined by the DPU 412. For example, the ninth brightness level may be determined by the display driving circuitry 431. For example, a scan for the repeated display of the image C may be performed by using the image C in the memory 420 (or the GRAM).

For example, the display driving circuitry 431 may display the image C again within the time period 1218 according to the brightness level of the display panel 110 set to the second brightness level lower than the ninth brightness level. For example, a scan for repeated display of the image C performed within the time period 1218 may be performed by using the image C in the memory 420 (or the GRAM). For example, the gradual change from the first brightness level to the second brightness level may be completed by displaying the image C according to the brightness level of the display panel 110 set to the second brightness level within the time period 1218.

As a non-limiting example, the at least one processor 410 may display the image C again according to the brightness level of the display panel 110 set to the second brightness level within a time period 1220, instead of the blank period 1233. For example, a scan for repeated display of the image C performed within the time period 1220 may be performed by using the image C in the memory 420 (or the GRAM).

For example, the at least one processor 410 may transmit an image D to the display driving circuitry 431 at a timing 1246. For example, the image D may be displayed within a time period 1219 according to the brightness level of the display panel 110 set to the second brightness level.

As described above, the electronic device 100 may adaptively schedule the plurality of time periods and the one or more blank periods, according to a length of the frame interval.

For example, referring to FIG. 13, the at least one processor 410 may generate a command 1300. For example, the command 1300 may indicate a brightness change period 1390. For example, the command 1300 may indicate changing a brightness level of the display panel 110 through 5 steps. For example, the command 1300 may indicate a second brightness level as a target brightness level. For example, the command 1300 may indicate changing the brightness level of the display panel 110 set to the first brightness level to the second brightness level lower than the first brightness level. For example, the second brightness level may be determined (or identified) (or obtained) by the CPU 411. For example, the second brightness level may be determined based on the second program 492 executed by the CPU 411. For example, the second brightness level may be determined based on the first program 491 executed by the CPU 411.

For example, the command 1300 may be transmitted from the CPU 411 to the DPU 412. For example, the command 1300 may be transmitted from the at least one processor 410 to the display driving circuitry 431. For example, the command 1300 may be transmitted from the CPU 411 to the display driving circuitry 431 through the DPU 412.

For example, a plurality of time periods (e.g., a time period 1311, a time period 1312, a time period 1313, a time period 1314, and a time period 1315) within the brightness change period 1390 may be allocated according to the frame interval. As a non-limiting example, the allocation may be executed by the CPU 411 using the first program 491. As a non-limiting example, the allocation may be executed by the DPU 412. As a non-limiting example, the allocation may be executed by the display driving circuitry 431. The following descriptions describe an example in which the at least one processor 410 (e.g., the CPU 411 or the DPU 412) allocates the plurality of time periods, but it is merely exemplary. Allocating the plurality of times may be executed by the display driving circuitry 431.

For example, a unit (e.g., a value corresponding to a length of each of the plurality of time periods) of time for a gradual change from the first brightness level to the second brightness level according to the command 1300 may be 4 steps (e.g., corresponding to a length of each of the time period 1311, the time period 1312, the time period 1313, the time period 1314, and the time period 1315).

For example, a frame interval 1301 (e.g., 4 steps) may be the first frame interval corresponding to the first value divided by the unit (e.g., 4 steps). For example, since the frame interval 1301 (e.g., 4 steps) is divided by the unit (e.g., 4 steps), the at least one processor 410 may allocate the time period 1311 to the frame interval 1301 without a blank period (e.g., a blank period 1331).

For example, the at least one processor 410 may transmit an image A to the display driving circuitry 431 at a timing 1341. For example, the transmission of the image A may be executed to display the image A within the time period 1311 according to the brightness level of display panel 110 set to a third brightness level lower than the first brightness level and higher than the second brightness level. For example, the third brightness level may be determined (or identified) (or obtained) by the CPU 411. For example, the third brightness level may be determined based on the second program 492 executed by the CPU 411. For example, the third brightness level may be determined based on the first program 491 executed by the CPU 411. For example, the third brightness level may be determined by the DPU 412. For example, the third brightness level may be determined by the display driving circuitry 431.

For example, a frame interval 1302 (e.g., 5 steps) changed from the frame interval 1301 may be the second frame interval corresponding to the second value not divided by the unit (e.g., 4 steps). For example, since the frame interval 1302 (e.g., 5 steps) is not divided by the unit (e.g., 4 steps), the at least one processor 410 may allocate the blank period 1331 and the time period 1312 to the frame interval 1302.

For example, the at least one processor 410 may transmit an image B to the display driving circuitry 431 at a timing

1342. For example, the transmission of the image B may be executed to display the image B within the time period 1312 according to the brightness level of the display panel 110 set to a fourth brightness level lower than the third brightness level and higher than the second brightness level. For example, the fourth brightness level may be determined (or identified) (or obtained) by the CPU 411. For example, the fourth brightness level may be determined based on the second program 492 executed by the CPU 411. For example, the fourth brightness level may be determined based on the first program 491 executed by the CPU 411. For example, the fourth brightness level may be determined by the DPU 412. For example, the fourth brightness level may be determined by the display driving circuitry 431.

For example, a frame interval 1303 (e.g., 10 steps) changed from the frame interval 1302 may be the second frame interval not divided by the unit (e.g., 4 steps). For example, since the frame interval 1303 (e.g., 10 steps) is not divided by the unit (e.g., 4 steps), the at least one processor 410 may allocate a blank period 1332, a blank period 1333, the time period 1313, and the time period 1314 to the frame interval 1303. For example, since the number of blank periods allocated within the frame interval 1303 is plural, the at least one processor 410 may allocate the blank period 1332 and the blank period 1333, so that the blank period 1332 and the blank period 1333 are separated from each other (or the blank period 1332 and blank period 1333 are distributed within the frame interval 1303). For example, continuously allocating the blank period 1332 and the blank period 1333 may cause a decrease in visual quality, the at least one processor 410 may allocate the blank period 1332 to a position following the time period 1313, and may allocate the blank period 1333 to a position following the blank period 1314 following the time period 1332.

For example, the at least one processor 410 may transmit the image C to the display driving circuitry 431 at a timing 1343. For example, the transmission of the image C may be executed to display the image C within the time period 1313, according to the brightness level of the display panel 110 set to a fifth brightness level lower than the fourth brightness level and higher than the second brightness level. For example, the fifth brightness level may be determined (or identified) (or obtained) by the CPU 411. For example, the fifth brightness level may be determined based on the second program 492 executed by the CPU 411. For example, the fifth brightness level may be determined based on the first program 491 executed by the CPU 411. For example, the fifth brightness level may be determined by the DPU 412. For example, the fifth brightness level may be determined by the display driving circuitry 431.

For example, the display driving circuitry 431 may display the image C again within the time period 1314 according to the brightness level of the display panel 110 set to a sixth brightness level lower than the fifth brightness level and higher than the second brightness level. For example, the sixth brightness level may be determined (or identified) (or obtained) by the CPU 411. For example, the sixth brightness level may be determined based on the second program 492 executed by the CPU 411. For example, the sixth brightness level may be determined based on the first program 491 executed by the CPU 411. For example, the sixth brightness level may be determined by the DPU 412. For example, the sixth brightness level may be determined by the display driving circuitry 431. For example, a scan for repeated display of the image C performed within the time period 1314 may be performed using the image C in the memory 420 (or the GRAM in the display driving circuitry 431).

For example, the at least one processor 410 may transmit an image D to the display driving circuitry 431 at a timing 1344. For example, the display driving circuitry 431 may display the image D within the time period 1315 according to the brightness level of the display panel 110 set to the second brightness level lower than the sixth brightness level. For example, the gradual change from the first brightness level to the second brightness level may be completed by displaying the image D according to the brightness level of the display panel 110 set to the second brightness level within the time period 1315.

As described above, the electronic device 100 may adaptively schedule the plurality of time periods and the one or more blank periods according to a length of the frame interval.

For example, the plurality of time periods may be allocated according to a length of a minimum time interval as well as the frame interval. For example, the minimum time interval may indicate an interval between time periods for changing the brightness of the display panel 110. The operations related to the minimum time interval are illustrated in a description of FIG. 14.

For example, referring to FIG. 14, the at least one processor 410 may generate a command 1400. For example, the command 1400 may indicate a brightness change period 1490. For example, the command 1400 may indicate changing a brightness level of the display panel 110 through 5 steps. For example, the command 1400 may indicate a second brightness level as a target brightness level. For example, the command 1400 may indicate changing the brightness level of the display panel 110 set to the first brightness level to the second brightness level lower than the first brightness level. For example, the second brightness level may be determined (or identified) (or obtained) by the CPU 411. For example, the second brightness level may be determined based on the second program 492 executed by the CPU 411. For example, the second brightness level may be determined based on the first program 491 executed by the CPU 411.

For example, the command 1400 may be transmitted from the CPU 411 to the DPU 412. For example, the command 1400 may be transmitted from the at least one processor 410 to the display driving circuitry 431. For example, the command 1400 may be transmitted from the CPU 411 to the display driving circuitry 431 through the DPU 412.

For example, a plurality of time periods (e.g., a time period 1411, a time period 1412, a time period 1413, a time period 1414, and a time period 1415) within the brightness change period 1490 may be allocated according to the frame interval and the minimum time interval. For example, the minimum time interval may indicate a minimum interval between the plurality of time periods. For example, the minimum time interval may be 4 steps. For example, the minimum time interval may be defined from a start timing of the time period 1411, such as a minimum time interval 1451, a minimum time interval 1452, a minimum time interval 1453, a minimum time interval 1454, and a minimum time interval 1455. As a non-limiting example, the allocation may be executed by the CPU 411 using the first program 491. As a non-limiting example, the allocation may be executed by the DPU 412. As a non-limiting example, the allocation may be executed by the display driving circuitry 431. The following descriptions describe an example in which the at least one processor 410 (e.g., the CPU 411 or the DPU 412) allocates the plurality of time periods, but it is merely exemplary. Allocating the plurality of times may be executed by the display driving circuitry 431.

For example, a unit (e.g., a value corresponding to a length of each of the plurality of time periods) of time for a gradual change from the first brightness level to the second brightness level according to command 1400 may be 2 steps (e.g., corresponding to a length of each of the time period 1411, the time period 1412, the time period 1413, the time period 1414, and the time period 1415).

For example, the frame interval 1401 may be 2 steps. For example, since the frame interval 1401 is 2 steps equal to a length of the time period 1411, the at least one processor 410 may allocate the time period 1411 to the frame interval 1401 without a blank period (e.g., a blank period 1461).

For example, the at least one processor 410 may transmit an image A to the display driving circuitry 431 at a timing 1441. For example, the transmission of the image A may be executed to display the image A within the time period 1411 according to the brightness level of the display panel 110 set to a third brightness level lower than the first brightness level and higher than the second brightness level. For example, the third brightness level may be determined (or identified) (or obtained) by the CPU 411. For example, the third brightness level may be determined based on the second program 492 executed by the CPU 411. For example, the third brightness level may be determined based on the first program 491 executed by the CPU 411. For example, the third brightness level may be determined by the DPU 412. For example, the third brightness level may be determined by the display driving circuitry 431.

For example, the frame interval 1402 changed from the frame interval 1401 may be 3 steps. For example, the at least one processor 410 may allocate a blank period 1461, a blank period 1462, and a blank period 1463 to the frame interval 1402, based on the minimum time interval 1451 defined from a start timing (e.g., the timing 1441) of the time period 1411 in which the image A is displayed according to the brightness level of the display panel 110 set to the third brightness level. For example, although the blank period 1463 is outside the minimum time interval 1451, since a length (e.g., the unit) of each of the plurality of time periods is 2 steps, the at least one processor 410 may allocate the blank period 1463 to the frame interval 1402.

For example, the frame interval 1403 changed from the frame interval 1402 may be 4 steps. For example, since the frame interval 1403 is outside the minimum time interval 1451, the at least one processor 410 may allocate the time period 1412, a blank period 1464, and a blank period 1465 to the frame interval 1403.

For example, the at least one processor 410 may transmit an image B to the display driving circuitry 431 at a timing 1442. For example, the transmission of the image B may be executed to display the image B within the time period 1412 according to the brightness level of the display panel 110 set to a fourth brightness level lower than the third brightness level and higher than the second brightness level. For example, the fourth brightness level may be determined (or identified) (or obtained) by the CPU 411. For example, the fourth brightness level may be determined based on the second program 492 executed by the CPU 411. For example, the fourth brightness level may be determined based on the first program 491 executed by the CPU 411. For example, the fourth brightness level may be determined by the DPU 412. For example, the fourth brightness level may be determined by the display driving circuitry 431.

For example, a frame interval 1404 changed from the frame interval 1403 may be 5 steps. For example, the at least one processor 410 may allocate the time period 1413, a blank period 1466, a blank period 1467, and a blank period 1468 to the frame interval 1404, based on the minimum time interval 1452 defined from a start timing (e.g., the timing 1442) of the time period 1412 for displaying the image B according to the brightness level of the display panel 110 set to the fourth brightness level. For example, although the blank period 1468 is outside a minimum time interval 1453 defined from a start timing (e.g., time point 1443) of the time period 1413, since a length (e.g., the unit) of each of the plurality of time periods is 2 steps, the at least one processor 410 may allocate the blank period 1468 to the frame interval 1404.

For example, the at least one processor 410 may transmit the image C to the display driving circuitry 431 at the timing 1443. For example, the transmission of the image C may be executed to display the image C within the time period 1413 according to the brightness level of the display panel 110 set to a fifth brightness level lower than the fourth brightness level and higher than the second brightness level. For example, the fifth brightness level may be determined (or identified) (or obtained) by the CPU 411. For example, fifth brightness level may be determined based on the second program 492 executed by the CPU 411. For example, the fifth brightness level may be determined based on the first program 491 executed by the CPU 411. For example, the fifth brightness level may be determined by the DPU 412. For example, the fifth brightness level may be determined by the display driving circuitry 431.

For example, a frame interval 1405 changed from the frame interval 1404 may be 8 steps. For example, since the frame interval 1405 is outside the minimum time interval 1453 defined from a start timing (e.g., the timing 1443) of the time period 1413 of displaying the image C according to the brightness level of the display panel 110 set to the fifth brightness level, the at least one processor 410 may allocate the time period 1414, the time period 1415, a blank period 1471, a blank period 1472, a blank period 1473, and a blank period 1474 to the frame interval 1405. For example, the time period 1415 may be allocated outside the minimum time interval 1454 defined from a start timing (e.g., a timing 1444) of the time period 1414. For example, the minimum time interval 1455 may be defined from a start timing (e.g., a timing 1445) of the time period 1415. For example, the at least one processor 410 may allocate the blank period 1473 and the blank period 1474 to the frame interval 1405 according to the minimum time interval 1455.

For example, an image following the image C may not be generated (or obtained) by the CPU 411 until the timing 1444. For example, although the image following the image C is not generated by the CPU 411, the display driving circuitry 431 may perform repeated display of the image C within the time period 1414, according to the brightness level of the display panel 110 set to a sixth brightness level lower than the fifth brightness level and higher than the second brightness level. For example, the sixth brightness level may be determined (or identified) (or obtained) by the CPU 411. For example, the sixth brightness level may be determined based on the second program 492 executed by the CPU 411. For example, the sixth brightness level may be determined based on the first program 491 executed by the CPU 411. For example, the sixth brightness level may be determined by the DPU 412. For example, the sixth brightness level may be determined by the display driving circuitry 431. For example, the scan for the repeated display of the image C may be performed using an image C in the memory 420 (or the GRAM in the display driving circuitry 431).

For example, the display driving circuitry 431 may display the image C again within the time period 1415, according to the brightness level of the display panel 110 set to the second brightness level lower than the sixth brightness level. For example, the gradual change from the first brightness level to the second brightness level may be completed by performing repeated display of the image C according to the brightness level of the display panel 110 set to the second brightness level within the time period 1415.

As described above, the electronic device 100 may adaptively schedule the plurality of time periods and the one or more blank periods, according to a length of the frame interval and the minimum time interval.

The operations exemplified above may be executed in an electronic device exemplified in a description below.

FIG. 15 is a block diagram illustrating an electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or at least one of an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one of the components (e.g., the connecting terminal 1578) may be omitted from the electronic device 1501, or one or more other components may be added in the electronic device 1501. In some embodiments, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to an embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, an HDMI connector, a USB connector, an SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to an embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520

(e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the millimeter wave (mmWave) band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 gigabits per second (Gbps) or more) for implementing eMBB, loss coverage (e.g., 1564 dB or less) for implementing mMTC, or U-plane latency (e.g., 0.5 milliseconds (ms) or less for each of downlink (DL) and uplink (UL), or a round trip of 15 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In another embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or health-care) based on 5G communication technology or IoT-related technology.

FIG. 16 is a block diagram 1600 illustrating the display module 1560 according to various embodiments. Referring to FIG. 16, the display module 1560 may include a display 1610 and a display driver integrated circuit (DDI) 1630 to control the display 1610. The DDI 1630 may include an interface module 1631, memory 1633 (e.g., buffer memory), an image processing module 1635, or a mapping module 1637. The DDI 1630 may receive image information that contains image data or an image control signal corresponding to a command to control the image data from another component of the electronic device 1501 via the interface module 1631. For example, according to an embodiment, the image information may be received from the processor 1520 (e.g., the main processor 1521 (e.g., an application processor)) or the auxiliary processor 1523 (e.g., a graphics processing unit) operated independently from the function of the main processor 1521. The DDI 1630 may communicate, for example, with touch circuitry 1650 or the sensor module 1576 via the interface module 1631. The DDI 1630 may also store at least part of the received image information in the memory 1633, for example, on a frame by frame basis. The image processing module 1635 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1610. The mapping module 1637 may generate a voltage value or a current value corresponding to the image data pre-processed or post-processed by the image processing module 1635. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1610 may be driven, for example, based at least in part on the voltage value or the current value such that visual information (e.g., a text, an image, or an icon) corresponding to the image data may be displayed via the display 1610.

According to an embodiment, the display module 1560 may further include the touch circuitry 1650. The touch circuitry 1650 may include a touch sensor 1651 and a touch sensor IC 1653 to control the touch sensor 1651. The touch sensor IC 1653 may control the touch sensor 1651 to sense a touch input or a hovering input with respect to a certain position on the display 1610. To achieve this, for example, the touch sensor 1651 may detect (e.g., measure) a change in a signal (e.g., a voltage, a quantity of light, a resistance, or a quantity of one or more electric charges) corresponding to the certain position on the display 1610. The touch circuitry 1650 may provide input information (e.g., a position, an area, a pressure, or a time) indicative of the touch input or the hovering input detected via the touch sensor 1651 to the processor 1520. According to an embodiment, at least part (e.g., the touch sensor IC 1653) of the touch circuitry 1650 may be formed as part of the display 1610 or the DDI 1630, or as part of another component (e.g., the auxiliary processor 1523) disposed outside the display module 1560.

According to an embodiment, the display module 1560 may further include at least one sensor (e.g., a fingerprint sensor, an iris sensor, a pressure sensor, or an illuminance sensor) of the sensor module 1576 or a control circuit for the at least one sensor. In such a case, the at least one sensor or the control circuit for the at least one sensor may be embedded in one portion of a component (e.g., the display 1610, the DDI 1630, or the touch circuitry 1650)) of the display module 1560. For example, when the sensor module 1576 embedded in the display module 1560 includes a biometric sensor (e.g., a fingerprint sensor), the biometric sensor may obtain biometric information (e.g., a fingerprint image) corresponding to a touch input received via a portion of the display 1610. As another example, when the sensor module 1576 embedded in the display module 1560 includes a pressure sensor, the pressure sensor may obtain pressure information corresponding to a touch input received via a partial or whole area of the display 1610. According to an embodiment, the touch sensor 1651 or the sensor module 1576 may be disposed between pixels in a pixel layer of the display 1610, or over or under the pixel layer.

The technical problems to be achieved in this document are not limited to those described above, and other technical problems not mentioned herein will be clearly understood by those having ordinary knowledge in the art to which the disclosure belongs, from the following description.

As described above, an electronic device (e.g., the electronic device 100) may comprise memory (e.g., the memory 420) comprising one or more storage mediums and storing instructions, at least one processor (e.g., the at least one processor 410) comprising processing circuitry, and a display (e.g., the display 430) including display driving circuitry (e.g., the display driving circuitry 431) and a display panel (e.g., the display panel 110). The at least one processor may be configured to execute individually or collectively the instructions to change, from a first frame interval to a second frame interval longer than the first frame interval, a frame interval indicating a shortest time interval between image transmissions from the at least one processor to the display driving circuitry, the image transmissions being to be executed for changing an image displayed on the display panel, control the display driving circuitry to perform display of a first image on the display panel by executing a first image transmission from the at least one processor to the display driving circuitry, and control the display driving circuitry to complete, before a start timing of a second image transmission from the at least one processor to the display driving circuitry to be executed according to the second frame interval to perform display of a second image, one or more scans for repeated display of the first image performed on the display panel based on the change from the first frame interval to the second frame interval.

The at least one processor may be configured to execute individually or collectively the instructions to control the display driving circuitry to complete, before the start timing, the one or more scans by generating a command for completing the one or more scans before the start timing, based on changing the frame interval from the first frame interval to the second frame interval and transmitting the command to the display driving circuitry.

The memory may store a first program, including a portion of the instructions, included in a hardware abstraction layer (HAL) to control the display, and a second program, including another portion of the instructions, included in a framework layer to control the display. Each of the first frame interval and the second frame interval may be determined using the second program executed by the at least one processor, and changing the frame interval from the first frame interval to the second frame interval may be performed using the second program executed by the at least one processor, and information indicating the second frame interval changed from the first frame interval may be provided from the second program to the first program.

The at least one processor may be configured to execute individually or collectively the instructions to generate, using the first program that obtains the information provided from the second program, the command, and transmit, using the first program, the command to the display driving circuitry.

The at least one processor may include a central processing unit (CPU) comprising processing circuitry, and a display processing unit (DPU) comprising processing circuitry. The first program and the second program may be executed by the CPU from among the CPU and the DPU. The at least one processor may be configured to execute individually or collectively the instructions to generate, using the DPU from among the CPU and the DPU, the command in accordance with the second frame interval indicated by the information, and transmit, using the DPU from among the CPU and the DPU, the command to the display driving circuitry.

The at least one processor may be configured to execute individually or collectively the instructions to control the display driving circuitry to complete the one or more scans before the start timing by transmitting to the display driving circuitry the command indicating the second frame interval to complete the one or more scans before the start timing. The display driving circuitry may be configured to complete the one or more scans before the start timing according to the second frame interval indicated by the command.

The frame interval may be indicated as the number of one or more emission periods usable to provide time capable of executing an image transmission.

The display driving circuitry may be configured to complete the one or more scans before the start timing by performing, based on the command, the one or more scans at a timing corresponding to a divisor of the second frame interval.

The first image transmission and the second image transmission may be executed in accordance with a video mode of mobile industry processor interface (MIPI) display serial interface (DSI).

The first image transmission and the second image transmission may be executed in accordance with an adaptive refresh panel (ARP) of mobile industry processor interface (MIPI) display serial interface (DSI).

The first image transmission and the second image transmission may be executed in accordance with a command mode of mobile industry processor interface (MIPI) display serial interface (DSI).

The first image transmission and the second image transmission may be executed in accordance with a video hybrid mode of mobile industry processor interface (MIPI) display serial interface (DSI).

The display driving circuitry may include a graphic random access memory (GRAM). The display driving circuitry may be configured to store in the GRAM the first image received from the at least one processor through the first image transmission, and complete, before the start timing, the one or more scans performed by using the first image maintained in the memory after performing the display of the first image on the display panel.

The at least one processor may be configured to execute individually or collectively the instructions to identify a type of a content provided in accordance with display of the first image, control the display driving circuitry to refrain from performing the one or more scans based on the type of the content corresponding to video, and control the display driving circuitry to complete, before the start timing, the one or more scans, based on the type of the content different from video.

As described above, a method may be executed in an electronic device (e.g., the electronic device 100) with a display (e.g., the display 430) that includes display driving circuitry (e.g., the display driving circuitry 431) and a display panel (e.g., the display panel 110). The method may comprise changing, from a first frame interval to a second frame interval longer than the first frame interval, a frame interval indicating a shortest time interval between image transmissions from at least one processor (e.g., at least one processor 410) of the electronic device to the display driving circuitry, the image transmissions being to be executed for changing an image displayed on the display panel, controlling the display driving circuitry to perform display of a first image on the display panel by executing a first image transmission from the at least one processor to the display driving circuitry, and controlling the display driving circuitry to complete, before a start timing of a second image transmission from the at least one processor to the display driving circuitry to be executed according to the second frame interval to perform display of a second image, one or more scans for repeated display of the first image performed on the display panel based on the change from the first frame interval to the second frame interval.

The controlling the display driving circuitry to complete the one or more scans before the start timing may comprise controlling the display driving circuitry to complete the one or more scans before the start timing by generating a command for completing the one or more scans before the start timing, based on changing the frame interval from the first frame interval to the second frame interval and transmitting the command to the display driving circuitry.

The controlling the display driving circuitry to complete the one or more scans before the start timing may comprise controlling the display driving circuitry to complete the one or more scans before the start timing by transmitting to the display driving circuitry the command indicating the second frame interval to complete the one or more scans before the start timing.

As described above, an electronic device (e.g., the electronic device 100) may comprise memory (e.g., the memory 420) comprising one or more storage mediums and storing instructions, at least one processor (e.g., the at least one processor 410) comprising processing circuitry, and a display (e.g., the display 430) including display driving circuitry (e.g., the display driving circuitry 431) and a display panel (e.g., the display panel 110). The at least one processor may be configured to execute individually or collectively the instructions to, while displaying an image on the display panel set according to a first brightness level, generate a command to change a brightness level of the display panel to a second brightness level, and based on the command, allocate, for controlling the display driving circuitry to gradually change the brightness level from the first brightness to the second brightness level using a plurality of time intervals within a brightness change period, the plurality of time intervals such that a first frame interval does not includes one or more blank periods not used for the gradual change and a second frame interval includes the one or more blank periods, the first frame interval corresponding to a first value divided by a value corresponding to length of each of the plurality of time intervals, the second frame interval corresponding to a second value not divided by the value. Each of the first frame interval and the second frame interval may indicate a shortest time interval between image transmissions, from the at least one processor to the display driving circuitry, executed to change an image displayed on the display panel.

The one or more blank periods may be, when the one or more blank periods included in the second frame interval are multiple, separated within the second frame interval in accordance with the allocation.

One or more third brightness levels between the first brightness level and the second brightness level may be obtained using a portion of the instructions included in a program that is included in a hardware abstraction layer (HAL) to control the display, the one or more third brightness levels being used for the gradual change.

The at least one processor may include a central processing unit (CPU) comprising processing circuitry, and a display processing unit (DPU) comprising processing circuitry. The CPU from among the CPU and the DPU may be configured to determine the second brightness level. The DPU from among the CPU and the DPU may be configured to determine one or more third brightness levels, between the first brightness level and the second brightness level, used for the gradual change.

The effects that can be obtained from the disclosure are not limited to those described above, and any other effects not mentioned herein will be clearly understood by those having ordinary knowledge in the art to which the disclosure belongs, from the following description.

A method according to an embodiment may be implemented in the form of program instructions capable of being executed through various computer means and recorded in a computer-readable medium. In this case, the medium may be a medium for continuously storing a computer-executable programs or temporarily storing the computer-executable programs for execution or downloading. Furthermore, the medium may be a variety of recording means or storage means in which a single or multiple hardware are combined, and is not limited to a medium directly connected to a computer system, but may be distributed on a network. As an example, the medium may include a magnetic medium such as hard disk, floppy disk, and magnetic tape, an optical recording medium such as compact disc read only memory (CD-ROM) and digital versatile disc (DVD), a magneto-optical medium such as floppy disk, and read only memory (ROM), random access memory (RAM), flash memory, and the like, which are configured to store program instructions. In addition, as another example, the medium may include app stores distributing applications, sites supplying or distributing various software, and a recording medium or storage medium managed by servers.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

memory, comprising one or more storage mediums, storing instructions;

at least one processor comprising processing circuitry; and a display including:

display driving circuitry; and a display panel, wherein the instructions, when executed by the at least one processor individually or collectively, cause the electronic device to:

change a frame interval from a first frame interval to a second frame interval longer than the first frame interval;

control the display driving circuitry to perform display of a first image on the display panel by executing a first image transmission from the at least one processor to the display driving circuitry; and control the display driving circuitry to, before a start timing of a second image transmission from the at least one processor to the display driving circuitry to be executed according to the second frame interval to perform display of a second image, complete one or more scans for repeated display of the first image performed on the display panel based on the change from the first frame interval to the second frame interval, and wherein the frame interval is usable for configuring a shortest time interval allowed between the two successive image transmissions from the at least one processor to the display driving circuitry.

2. The electronic device of claim 1, wherein the instructions, when executed by the at least one processor individually or collectively, cause the electronic device to:

control the display driving circuitry to complete, before the start timing, the one or more scans by:

generating a command for completing the one or more scans before the start timing, based on changing the frame interval from the first frame interval to the second frame interval; and transmitting the command to the display driving circuitry.

3. The electronic device of claim 2, wherein the memory stores:

a first program, including a portion of the instructions, included in a hardware abstraction layer (HAL) to control the display; and a second program, including another portion of the instructions, included in a framework layer to control the display, wherein the first frame interval and the second frame interval are determined using the second program executed by the at least one processor, wherein changing the frame interval from the first frame interval to the second frame interval is performed using the second program executed by the at least one processor, and wherein information indicating the second frame interval changed from the first frame interval is provided from the second program to the first program.

4. The electronic device of claim 3, wherein the instructions, when executed by the at least one processor individually or collectively, cause the electronic device to:

generate, using the first program that obtains the information provided from the second program, the command; and transmit, using the first program, the command to the display driving circuitry.

5. The electronic device of claim 3, wherein the at least one processor includes:

a central processing unit (CPU) comprising processing circuitry; and a display processing unit (DPU) comprising processing circuitry, wherein the first program and the second program are executed by the CPU from among the CPU and the DPU, and wherein the instructions, when executed by the at least one processor individually or collectively, cause the electronic device to:

generate, using the DPU from among the CPU and the DPU, the command in accordance with the second frame interval indicated by the information; and transmit, using the DPU from among the CPU and the DPU, the command to the display driving circuitry.

6. The electronic device of claim 1, wherein the frame interval is indicated as a number of one or more emission periods usable to provide time capable of executing an image transmission.

7. The electronic device of claim 2, wherein the display driving circuitry is configured to complete the one or more scans before the start timing by performing, based on the command, the one or more scans at a timing corresponding to a divisor of the second frame interval.

8. The electronic device of claim 1, wherein the first image transmission and the second image transmission are executed in accordance with a video mode of mobile industry processor interface (MIPI) display serial interface (DSI).

9. The electronic device of claim 1, wherein the first image transmission and the second image transmission are executed in accordance with an adaptive refresh panel (ARP) of mobile industry processor interface (MIPI) display serial interface (DSI).

10. The electronic device of claim 1, wherein the first image transmission and the second image transmission are executed in accordance with a command mode of mobile industry processor interface (MIPI) display serial interface (DSI).

11. The electronic device of claim 1, wherein the first image transmission and the second image transmission are executed in accordance with a video hybrid mode of mobile industry processor interface (MIPI) display serial interface (DSI).

12. The electronic device of claim 11, wherein the display driving circuitry includes a graphic random access memory (GRAM), and wherein the display driving circuitry is configured to:

store in the GRAM the first image received from the at least one processor through the first image transmission; and complete, before the start timing, the one or more scans performed by using the first image maintained in the memory after performing the display of the first image on the display panel.

13. The electronic device of claim 1, wherein the instructions, when executed by the at least one processor individually or collectively, cause the electronic device to:
identify a type of a content provided in accordance with display of the first image;
control the display driving circuitry to refrain from performing the one or more scans based on the type of the content corresponding to video; and
control the display driving circuitry to complete, before the start timing, the one or more scans, based on the type of the content different from video.

14. A method executed in an electronic device comprising at least one processor and a display including display driving circuitry and a display panel, the method comprising:
changing a frame interval from a first frame interval to a second frame interval longer than the first frame interval;
controlling the display driving circuitry to perform display of a first image on the display panel by executing a first image transmission from the at least one processor to the display driving circuitry; and
controlling the display driving circuitry to, before a start timing of a second image transmission from the at least one processor to the display driving circuitry to be executed according to the second frame interval to perform display of a second image, complete one or more scans for repeated display of the first image performed on the display panel based on the change from the first frame interval to the second frame interval,
wherein the frame interval is usable for configuring a shortest time interval allowed between the two successive image transmissions from the at least one processor to the display driving circuitry.

15. The method of claim 14, wherein controlling the display driving circuitry to complete the one or more scans before the start timing comprises controlling the display driving circuitry to complete the one or more scans before the start timing by:
generating a command for completing the one or more scans before the start timing, based on changing the frame interval from the first frame interval to the second frame interval; and
transmitting the command to the display driving circuitry.

16. The method of claim 14, wherein controlling the display driving circuitry to complete the one or more scans before the start timing comprises controlling the display driving circuitry to complete the one or more scans before the start timing by transmitting to the display driving circuitry a command indicating the second frame interval.

17. An electronic device comprising:
memory comprising one or more storage mediums storing instructions;

at least one processor comprising processing circuitry; and
a display including:
display driving circuitry; and
a display panel,
wherein the instructions, when executed by the at least one processor individually or collectively, cause the electronic device to:
while displaying an image on the display panel set according to a first brightness level, generate a command to change a brightness level of the display panel to a second brightness level; and
based on the command, allocate, for controlling the display driving circuitry to gradually change the brightness level from the first brightness level to the second brightness level using a plurality of time intervals within a brightness change period, the plurality of time intervals such that a first frame interval does not includes one or more blank periods and a second frame interval includes the one or more blank periods,
wherein the first frame interval corresponds to a first value divided by a value corresponding to length of each of the plurality of time intervals,
wherein the second frame interval corresponds to a second value not divided by the value, and
wherein the first frame interval and the second frame interval are used for configuring a shortest time interval between two successive image transmissions from the at least one processor to the display driving circuitry.

18. The electronic device of claim 17, wherein the one or more blank periods are, when the one or more blank periods included in the second frame interval are multiple, separated from each other within the second frame interval in accordance with the allocation.

19. The electronic device of claim 17, wherein one or more third brightness levels between the first brightness level and the second brightness level are obtained using a portion of the instructions included in a program that is included in a hardware abstraction layer (HAL) to control the display, the one or more third brightness levels being used for the gradual change.

20. The electronic device of claim 17,
wherein the at least one processor includes:
a central processing unit (CPU) comprising processing circuitry; and
a display processing unit (DPU) comprising processing circuitry,
wherein the CPU from among the CPU and the DPU is configured to determine the second brightness level, and
wherein the DPU from among the CPU and the DPU is configured to determine one or more third brightness levels, between the first brightness level and the second brightness level, used for the gradual change.

* * * * *